(12) United States Patent
Dannoux et al.

(10) Patent No.: US 12,379,551 B2
(45) Date of Patent: *Aug. 5, 2025

(54) MULTIPORTS HAVING CONNECTION PORTS FORMED IN THE SHELL AND ASSOCIATED SECURING FEATURES

(71) Applicant: CORNING OPTICAL COMMUNICATIONS LLC, Charlotte, NC (US)

(72) Inventors: Thierry Luc Alain Dannoux, Avon (FR); Felice Scotta, Savigny le Temple (FR)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,667

(22) Filed: Jan. 31, 2024

(65) Prior Publication Data

US 2024/0168242 A1 May 23, 2024

Related U.S. Application Data

(63) Continuation of application No. 17/737,547, filed on May 5, 2022, now Pat. No. 11,966,089, which is a (Continued)

(51) Int. Cl.
*G02B 6/38* (2006.01)
*G02B 6/42* (2006.01)
*G02B 6/44* (2006.01)

(52) U.S. Cl.
CPC ......... *G02B 6/3879* (2013.01); *G02B 6/3825* (2013.01); *G02B 6/3826* (2013.01);
(Continued)

(58) Field of Classification Search
CPC .. G02B 6/3879; G02B 6/3825; G02B 6/3849; G02B 6/3851; G02B 6/3871;
(Continued)

(56) References Cited

U.S. PATENT DOCUMENTS 3,074,107 A 1/1963 Kiyoshi et al.
3,532,783 A 10/1970 Pusey et al.
(Continued)

FOREIGN PATENT DOCUMENTS

AU 2006232206 A1 10/2006
CN 1060911 A 5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.
(Continued)

*Primary Examiner* — Tina Wong
(74) *Attorney, Agent, or Firm* — Michael E. Carroll, Jr.

(57) ABSTRACT

Multiports having connection ports formed in the shell and associated securing features are disclosed. One aspect of the disclosure is directed to a multiport for providing an optical connection comprising a shell comprising a first portion, at least one connection port comprising an optical connector opening, and a connection port passageway formed in the first portion of the shell, where the at least one securing feature is associated with the at least one connection port.

24 Claims, 64 Drawing Sheets

Related U.S. Application Data continuation of application No. 16/661,991, filed on Oct. 23, 2019, now Pat. No. 11,327,247, which is a continuation of application No. PCT/US2017/064093, filed on Nov. 30, 2017.

(60) Provisional application No. 62/526,018, filed on Jun. 28, 2017, provisional application No. 62/526,195, filed on Jun. 28, 2017, provisional application No. 62/526,011, filed on Jun. 28, 2017.

(52) U.S. Cl.
CPC ......... *G02B 6/3831* (2013.01); *G02B 6/3851* (2013.01); *G02B 6/3869* (2013.01); *G02B 6/387* (2013.01); *G02B 6/3873* (2013.01); *G02B 6/3885* (2013.01); *G02B 6/3897* (2013.01); *G02B 6/44515* (2023.05); *G02B 6/381* (2013.01); *G02B 6/3821* (2013.01); *G02B 6/3837* (2013.01); *G02B 6/3841* (2013.01); *G02B 6/3843* (2013.01); *G02B 6/3849* (2013.01); *G02B 6/3871* (2013.01); *G02B 6/3887* (2013.01); *G02B 6/3889* (2013.01); *G02B 6/389* (2013.01); *G02B 6/3893* (2013.01); *G02B 6/3895* (2013.01); *G02B 6/4262* (2013.01); *G02B 6/4401* (2013.01); *G02B 6/4471* (2013.01); *G02B 6/4472* (2013.01); *G02B 6/4479* (2013.01)

(58) Field of Classification Search
CPC .. G02B 6/3893; G02B 6/3897; G02B 6/4446; G02B 6/4471
See application file for complete search history.

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,226,832 A | 7/1993 | Dejardin et al. |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,315,679 A | 5/1994 | Baldwin et al. |
| 5,317,663 A | 5/1994 | Beard et al. |
| 5,321,917 A | 6/1994 | Franklin et al. |
| 5,329,603 A | 7/1994 | Watanabe et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,390,272 A | 2/1995 | Repta et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,778,122 A | 7/1998 | Giebel et al. |
| 5,781,681 A | 7/1998 | Manning |
| 5,781,686 A | 7/1998 | Robinson et al. |
| 5,782,892 A | 7/1998 | Castle et al. |
| 5,789,701 A | 8/1998 | Wettengel et al. |

(56) References Cited

U.S. PATENT DOCUMENTS

| | | |
|---|---|---|
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,876,071 A | 3/1999 | Aldridge |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,224,270 B1 | 5/2001 | Nakajima et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,269,214 B1 | 7/2001 | Naudin et al. |
| 6,287,016 B1 | 9/2001 | Weigel |
| 6,293,710 B1 | 9/2001 | Lampert et al. |
| 6,298,190 B2 | 10/2001 | Waldron et al. |
| 6,304,698 B1 | 10/2001 | Morris |
| 6,305,849 B1 | 10/2001 | Roehrs et al. |
| 6,321,013 B1 | 11/2001 | Hardwick et al. |
| 6,340,249 B1 | 1/2002 | Hayes et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,402,388 B1 | 6/2002 | Imazu et al. |
| 6,404,962 B1 | 6/2002 | Hardwick et al. |
| 6,409,391 B1 | 6/2002 | Chang |
| D460,043 S | 7/2002 | Fan Wong |
| 6,422,764 B1 | 7/2002 | Marrs et al. |
| 6,427,035 B1 | 7/2002 | Mahony |
| 6,428,215 B1 | 8/2002 | Nault |
| 6,439,780 B1 | 8/2002 | Mudd et al. |
| 6,443,626 B1 | 9/2002 | Foster |
| 6,466,725 B2 | 10/2002 | Battey et al. |
| 6,487,344 B1 | 11/2002 | Naudin et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,533,468 B2 | 3/2003 | Nakajima et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,652 B1 | 4/2003 | Mahony |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,815,612 B2 * | 11/2004 | Bloodworth .............. H02G 3/14 174/58 |
| 6,841,729 B2 | 1/2005 | Sakabe et al. |
| 6,848,838 B2 | 2/2005 | Doss et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,899,467 B2 | 5/2005 | McDonald et al. |
| 6,908,233 B2 | 6/2005 | Nakajima et al. |
| 6,909,821 B2 | 6/2005 | Ravasio et al. |
| 6,916,120 B2 | 7/2005 | Zimmel et al. |
| 6,918,704 B2 | 7/2005 | Marrs et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,001,081 B2 | 2/2006 | Cox et al. |
| 7,011,454 B2 | 3/2006 | Caveney et al. |
| 7,013,074 B2 | 3/2006 | Battey et al. |
| 7,025,507 B2 | 4/2006 | de Marchi |
| 7,033,191 B1 | 4/2006 | Cao |
| 7,044,650 B1 | 5/2006 | Tran et al. |
| 7,052,185 B2 | 5/2006 | Rubino et al. |
| 7,079,734 B2 | 7/2006 | Seddon et al. |
| 7,085,468 B2 | 8/2006 | Forrester |
| 7,088,899 B2 | 8/2006 | Reagan et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,103,255 B2 | 9/2006 | Reagan et al. |
| 7,103,257 B2 | 9/2006 | Donaldson et al. |
| 7,104,702 B2 | 9/2006 | Barnes et al. |
| 7,111,990 B2 | 9/2006 | Melton et al. |
| 7,113,679 B2 | 9/2006 | Melton et al. |

(56) References Cited

U.S. PATENT DOCUMENTS

| | | |
|---|---|---|
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,137,742 B2 | 11/2006 | Theuerkorn et al. |
| 7,146,089 B2 | 12/2006 | Reagan et al. |
| 7,146,090 B2 | 12/2006 | Vo et al. |
| 7,150,567 B1 | 12/2006 | Luther et al. |
| 7,165,893 B2 | 1/2007 | Schmitz |
| 7,171,102 B2 | 1/2007 | Reagan et al. |
| 7,178,990 B2 | 2/2007 | Caveney et al. |
| 7,184,634 B2 | 2/2007 | Hurley et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,579 B2 | 4/2008 | Feldner |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| D574,775 S | 8/2008 | Amidon |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,580,607 B2 | 8/2009 | Jones et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,641,398 B2 | 1/2010 | O'Riorden et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,812 B2 | 3/2010 | Castagna et al. |
| 7,677,814 B2 | 3/2010 | Lu et al. |
| 7,680,388 B2 | 3/2010 | Reagan et al. |
| 7,695,197 B2 | 4/2010 | Gurreri |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| RE41,743 E | 9/2010 | Naudin et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,811,006 B2 | 10/2010 | Milette et al. |
| 7,820,090 B2 | 10/2010 | Morrow et al. |
| D626,506 S | 11/2010 | Giefers et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,180,191 B2 | 5/2012 | Blackwell et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |

(56) References Cited

U.S. PATENT DOCUMENTS

| | | |
|---|---|---|
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,556,645 B2 | 10/2013 | Crain |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,634,688 B2 | 1/2014 | Bryon et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,768,133 B2 | 7/2014 | Bryon et al. |
| 8,770,861 B2 | 7/2014 | Smith et al. |
| 8,770,862 B2 | 7/2014 | Lu et al. |
| D711,320 S | 8/2014 | Yang et al. |
| 8,798,430 B2 | 8/2014 | Bryon et al. |
| D712,360 S | 9/2014 | Su et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,944,703 B2 | 2/2015 | Song et al. |
| 8,974,124 B2 | 3/2015 | Chang |
| 8,985,862 B2 | 3/2015 | Cote et al. |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,057,862 B2 | 6/2015 | Strasser et al. |
| 9,075,205 B2 | 7/2015 | Pepe et al. |
| 9,081,154 B2 | 7/2015 | Zimmel et al. |
| 9,146,364 B2 | 9/2015 | Chen et al. |
| D741,803 S | 10/2015 | Davidson, Jr. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| D749,519 S | 2/2016 | Su et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Power et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,429,732 B2 | 8/2016 | Ahmed et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,595,786 B1 | 3/2017 | Takano et al. |
| D783,618 S | 4/2017 | Wu et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,224 B2 | 3/2018 | Liu et al. |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |

(56) References Cited

U.S. PATENT DOCUMENTS

| | | |
|---|---|---|
| 9,977,194 B2 | 5/2018 | Waldron et al. |
| 9,977,198 B2 | 5/2018 | Bund et al. |
| 9,983,374 B2 | 5/2018 | Li et al. |
| 9,989,711 B2 | 6/2018 | Ott et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,061,091 B2 | 8/2018 | Kempeneers et al. |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,133,019 B2 | 11/2018 | Kowalczyk et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,288,821 B2 | 5/2019 | Isenhour |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,379,308 B2 | 8/2019 | Coate |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,545,298 B2 | 1/2020 | Bauco et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| D880,423 S | 4/2020 | Obata et al. |
| 10,613,278 B2 | 4/2020 | Kempeneers et al. |
| 10,620,388 B2 | 4/2020 | Isenhour et al. |
| 10,641,967 B1 | 5/2020 | Cote et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,768,382 B2 | 9/2020 | Cote et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,921,530 B2 | 2/2021 | Wong et al. |
| 10,921,531 B2 | 2/2021 | Wong et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,073,664 B2 | 7/2021 | Chang et al. |
| 11,105,986 B2 | 8/2021 | Coenegracht et al. |
| 11,112,567 B2 | 9/2021 | Higley et al. |
| 11,161,603 B2 | 11/2021 | Vallart et al. |
| 11,262,509 B2 | 3/2022 | Rosson |
| 11,290,188 B2 | 3/2022 | Tuccio et al. |
| 11,327,247 B2 * | 5/2022 | Dannoux ............. G02B 6/3885 |
| 11,487,073 B2 | 11/2022 | Ripumaree et al. |
| 11,493,700 B2 | 11/2022 | Rosson |
| D982,519 S | 4/2023 | Gaidosch |
| 11,966,089 B2 * | 4/2024 | Dannoux ............. G02B 6/3851 |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2002/0181893 A1 | 12/2002 | White et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240807 A1 | 12/2004 | Frohlich et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |

(56) References Cited

U.S. PATENT DOCUMENTS

| | | |
|---|---|---|
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213897 A1 | 9/2005 | Palmer et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0025665 A1 | 2/2007 | Dean et al. |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0025670 A1 | 1/2008 | Castagna et al. |
| 2008/0044137 A1 | 2/2008 | Luther et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175546 A1 | 7/2008 | Lu et al. |
| 2008/0175548 A1 | 7/2008 | Knecht et al. |
| 2008/0175550 A1* | 7/2008 | Coburn ............... G02B 6/3897 385/134 |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2008/0310796 A1 | 12/2008 | Lu |
| 2008/0317415 A1 | 12/2008 | Hendrickson et al. |
| 2009/0003772 A1 | 1/2009 | Lu et al. |
| 2009/0003777 A1 | 1/2009 | Feldner |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0136184 A1 | 5/2009 | Abernathy et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |

(56) References Cited

U.S. PATENT DOCUMENTS

| | | |
|---|---|---|
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303416 A1 | 12/2010 | Danley et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0033157 A1 | 2/2011 | Drouard |
| 2011/0044588 A1 | 2/2011 | Larson et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0097050 A1 | 4/2011 | Blackwell et al. |
| 2011/0108719 A1 | 5/2011 | Ford et al. |
| 2011/0116749 A1 | 5/2011 | Kuffel et al. |
| 2011/0123157 A1 | 5/2011 | Belsan et al. |
| 2011/0123166 A1 | 5/2011 | Reagan et al. |
| 2011/0129185 A1 | 6/2011 | Lewallen et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0229098 A1 | 9/2011 | Abernathy et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0057830 A1 | 3/2012 | Taira et al. |
| 2012/0063724 A1 | 3/2012 | Kuffel et al. |
| 2012/0063729 A1 | 3/2012 | Fujiwara et al. |
| 2012/0106912 A1 | 5/2012 | Mcgranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0257858 A1 | 10/2012 | Nhep |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0022317 A1 | 1/2013 | Norris et al. |
| 2013/0034333 A1 | 2/2013 | Holmberg et al. |
| 2013/0051734 A1 | 2/2013 | Shen et al. |
| 2013/0064506 A1* | 3/2013 | Eberle, Jr. ............ G02B 6/3608 385/49 |
| 2013/0094821 A1 | 4/2013 | Logan |
| 2013/0100900 A1 | 4/2013 | Lee et al. |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1* | 1/2014 | Pepe ..................... H01R 13/62 403/376 |
| 2014/0021962 A1 | 1/2014 | Barnaby et al. |
| 2014/0029897 A1 | 1/2014 | Shimazu et al. |
| 2014/0044397 A1 | 2/2014 | Hikosaka et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0226945 A1 | 8/2014 | Claessens et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0100555 A1 | 4/2015 | Tremblay et al. |
| 2015/0110451 A1 | 4/2015 | Blazer et al. |
| 2015/0115545 A1 | 4/2015 | Kempeneers et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0260936 A1 | 9/2015 | Newbury et al. |
| 2015/0268423 A1 | 9/2015 | Burkholder et al. |
| 2015/0268434 A1 | 9/2015 | Barnette et al. |
| 2015/0270626 A1 | 9/2015 | Bishop |
| 2015/0286011 A1 | 10/2015 | Nhep |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0018605 A1 | 1/2016 | Ott et al. |
| 2016/0041346 A1 | 2/2016 | Barnette et al. |
| 2016/0041356 A1 | 2/2016 | Wang et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0209605 A1 | 7/2016 | Lu et al. |

(56) References Cited

U.S. PATENT DOCUMENTS

| | | |
|---|---|---|
| 2016/0216468 A1 | 7/2016 | Gimblet et al. |
| 2016/0223759 A1 | 8/2016 | Marcouiller et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2016/0349458 A1 | 12/2016 | Murray et al. |
| 2016/0356963 A1 | 12/2016 | Liu et al. |
| 2016/0359266 A1 | 12/2016 | Wang et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0212313 A1 | 7/2017 | Elenabaas et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0307828 A1 | 10/2017 | Elenbaas |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0003902 A1 | 1/2018 | Rosson et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267243 A1 | 9/2018 | Nhep et al. |
| 2018/0267265 A1 | 9/2018 | Zhang et al. |
| 2018/0321448 A1 | 11/2018 | Wu et al. |
| 2018/0329149 A1 | 11/2018 | Mullaney et al. |
| 2018/0329153 A1 | 11/2018 | Verheyden |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0014987 A1 | 1/2019 | Sasaki et al. |
| 2019/0018210 A1 | 1/2019 | Coan et al. |
| 2019/0033531 A1 | 1/2019 | Taira et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0258010 A1 | 8/2019 | Anderson et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0339475 A1 | 11/2019 | Takano et al. |
| 2019/0361177 A1 | 11/2019 | Aoshima et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0003963 A1 | 1/2020 | Iizumi et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0112354 A1 | 4/2020 | Chigusa et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116955 A1 | 4/2020 | Ho et al. |
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Dannoux et al. |
| 2020/0132939 A1 | 4/2020 | Coenegracht et al. |
| 2020/0132941 A1 | 4/2020 | Otsuka et al. |
| 2020/0150356 A1 | 5/2020 | Lu |
| 2020/0174201 A1 | 6/2020 | Cote et al. |
| 2020/0174214 A1 | 6/2020 | Alves et al. |
| 2020/0183097 A1 | 6/2020 | Chang et al. |
| 2020/0192042 A1 | 6/2020 | Coan et al. |
| 2020/0209479 A1 | 7/2020 | Zhang et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0301090 A1 | 9/2020 | Petersen et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0132302 A1 | 5/2021 | Wong et al. |
| 2021/0149124 A1 | 5/2021 | Higley et al. |
| 2021/0149140 A1 | 5/2021 | Jensen |
| 2021/0278607 A1 | 9/2021 | Cote et al. |
| 2021/0278687 A1 | 9/2021 | Tsuchiya |
| 2021/0288609 A1 | 9/2021 | Yan et al. |
| 2021/0318499 A1 | 10/2021 | Cote et al. |
| 2022/0236497 A1 | 7/2022 | Calvin et al. |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |

(56) References Cited

FOREIGN PATENT DOCUMENTS

| | | | |
|---|---|---|---|
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105492946 A | 4/2016 |
| CN | 105683795 A | 6/2016 |
| CN | 106716205 A | 5/2017 |
| CN | 106873086 A | 6/2017 |
| CN | 110608208 A | 12/2019 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0978746 A1 | 2/2000 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3207223 A1 | 8/2017 |
| EP | 3234672 A1 | 10/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| EP | 3403125 B1 | 7/2021 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| GB | 6192781 | 2/2022 |
| GB | 6192782 | 2/2022 |
| GB | 6192783 | 2/2022 |
| GB | 6192784 | 2/2022 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-106765 A | 4/1993 |
| JP | 05-142439 A | 6/1993 |
| JP | 05-297246 A | 11/1993 |
| JP | 06-320111 A | 11/1994 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 3296698 B2 | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |

(56) References Cited

FOREIGN PATENT DOCUMENTS

| | | |
|---|---|---|
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-018003 A | 1/2011 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| RU | 2402794 C1 | 10/2010 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2005/066674 A2 | 7/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/029072 A1 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/126411 A1 | 10/2009 |
| WO | 2009/148797 A1 | 12/2009 |
| WO | 2009/154990 A2 | 12/2009 |
| WO | 2010/092009 A1 | 8/2010 |
| WO | 2010/093794 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/074688 A2 | 6/2012 |
| WO | 2012/163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2013/177016 A1 | 11/2013 |
| WO | 2014/123940 A1 | 8/2014 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/009435 A1 | 1/2015 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/138297 A1 | 9/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/005789 A1 | 1/2019 |
| WO | 2019/006121 A1 | 1/2019 |
| WO | 2019/006176 A1 | 1/2019 |
| WO | 2019/006191 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |
| WO | 2020/242847 A1 | 12/2020 |
| WO | 2022/115271 A1 | 6/2022 |

OTHER PUBLICATIONS

Clearfield, "Fieldshield Optical Fiber Protection System: Installation Manual." for part No. 016164. Last Updated Dec. 2014. 37 pgs.
Clearfield, "FieldShield SC and LC Pushable Connectors," Last Updated Jun. 1, 2018, 2 pgs.
Clearfield, "FieldShield SmarTerminal: Hardened Pushable Connectors" Last Updated Jun. 29, 2018, 2 pgs.
Coaxum, L., et al., U.S. Appl. No. 62/341,947, "Fiber Optic Multiport Having Different Types of Ports for Multi-Use," filed May 26, 2016.
CoolShirt fittings, https://www.amazon.com/Cool-Shirt-5014-0001-Release-Connectors/dp/B01LXBXYJ9, Sep. 23, 2016 (Year: 2016).
Corning Cable Systems, "SST Figure-8 Drop Cables 1-12 Fibers", Preliminary Product Specifications, 11 pgs. (2002).
Corning Cable Systems, "SST-Drop (armor) Cables 1-12 Fibers", Product Specifications, 2 pgs. (2002).
Corning Cable Systems, "SST-Drop (Dielectric) Cables 1-12 Fibers", Product Specifications, 2 pgs. (2002).
Digital Optical Audio Cable Toslink Cable. Date: Jun. 27, 2019 [online], [Site visited Mar. 2, 2021], Available from Internet URL: https://www.amazon.com/dp/B07TJMP4TP/ (Year: 2019).
Faulkner et al. "Optical networks for local lopp applications, J. Lightwave Technol.0733-8724 7(11), 17411751 (1989)."

(56) References Cited

OTHER PUBLICATIONS

Fiber Systems International: Fiber Optic Solutions, data, "TFOCA-11 4-Channel Fiber Optic Connector" sheet. 2003, 2 pgs.
Gold Plated Toslink. Date: Feb. 5, 2015. [online], [Site visited Mar. 2, 2021], Available from Internet URL: https://www.amazon.com/dp/B00T8HWV62/ (Year: 2015).
Liu et al., "Variable optical power splitters create new apps", Retrieved from: https://www.lightwaveonline.com/fttx/pon-systems/article/16648432/variable-optical-power-splitters-create-new-apps, 2005, 14 pages.
Infolite—Design and Data Specifications, 1 pg. Retrieved Feb. 21, 2019.
Nawata, "Multimode and Single-Mode Fiber Connectors Technology"; IEEE Journal of Quantum Electronics, vol. QE-16, No. 6 Published Jun. 1980.
Notice of Allowance for U.S. Appl. No. 16/018,997, filed Oct. 4, 2018.
Office Action for U.S. Appl. No. 16/018,988, filed Oct. 31, 2018.
Office Action pertaining to U.S. Appl. No. 16/018,918 dated Sep. 28, 2018.
Office Action pertaining to U.S. Appl. No. 16/019,008 dated Oct. 31, 2018.
Optical connector. (Design—(Copyrights) Questel) orbit.com. [Online PDF compilation of references selected by 3 [examiner] 20 pgs. Print Dates Range Mar. 9, 2003-May 25, 2015. [Retrieved Feb. 3, 2021] https://www.orbit.com/export/UCZAH96B/pdf4/81c7766a-d250-4555-a8f1-3bdf9dc 1 bd6c-185304.pdf (Year: 2021).
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Schneier, Bruce; "Applied Cryptography: Protocols, Algorithms, and Source Code in C," Book. 1995 SEC. 10.3, 12.2, 165 Pgs.
Stratos: Lightwave., "Innovation Brought to Light", Hybrid HMA Series, Hybrid Multi Application, 2002, 2 pgs.
UPC Optic Fiber Quick Connector. Date: May 13, 2016 [online], [Site visited Mar. 2, 2021], Available from Internet URL: https://www.amazon.com/dp/B01FLUV5DE/ (Year: 2016).
Wang et al. "Opto-VLSI-based dynamic optical splitter," Electron. Lett.0013-5194 10.1049/el:20046715 40(22), 14451446 (2004).
Xiao et al. "1 xN wavelength selective adaptive optical power splitter for wavelength-division-multiplexed passive optical networks," Optics & Laser Technology 68, pp. 160-164, May 2015.

\* cited by examiner

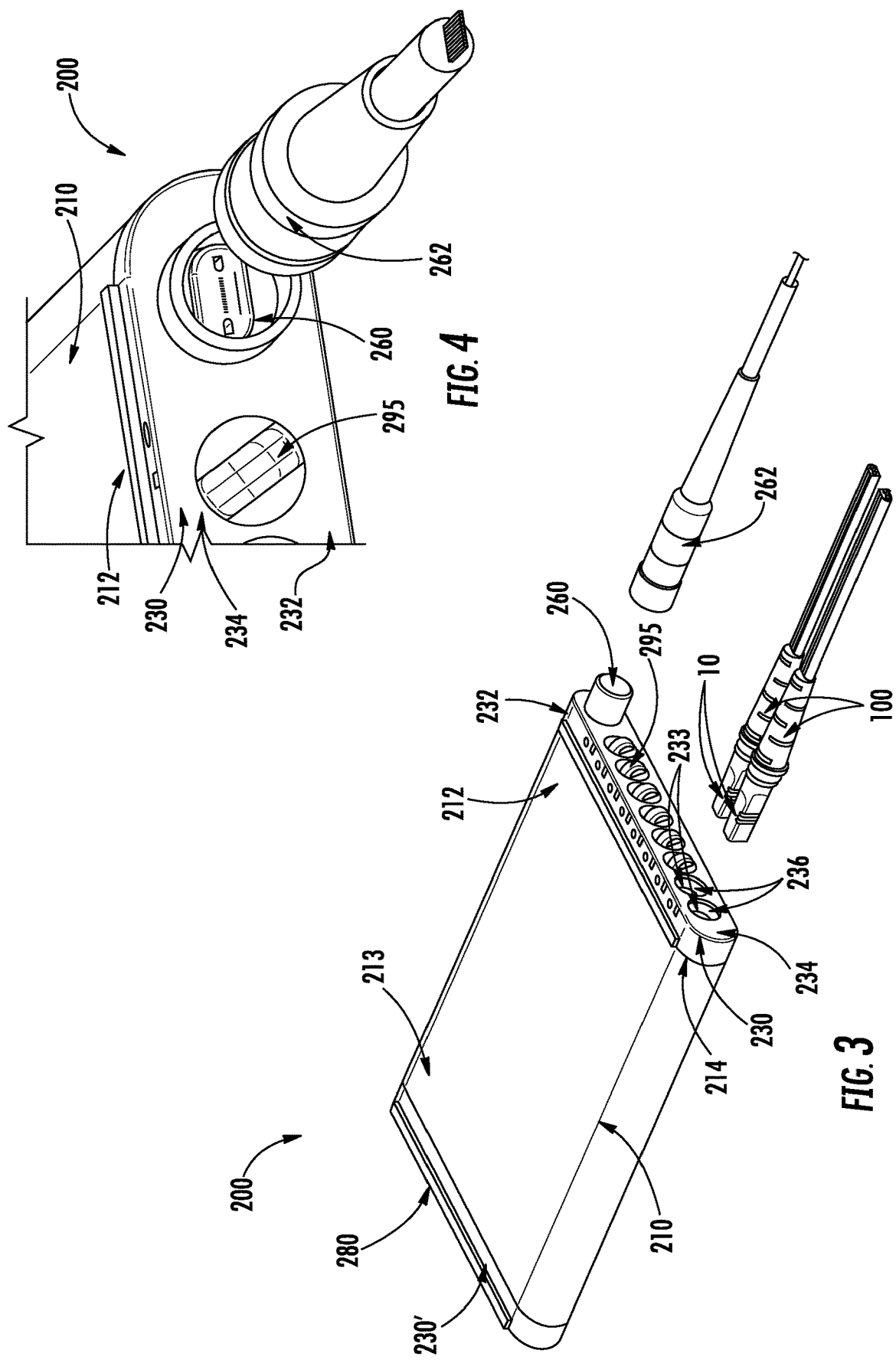

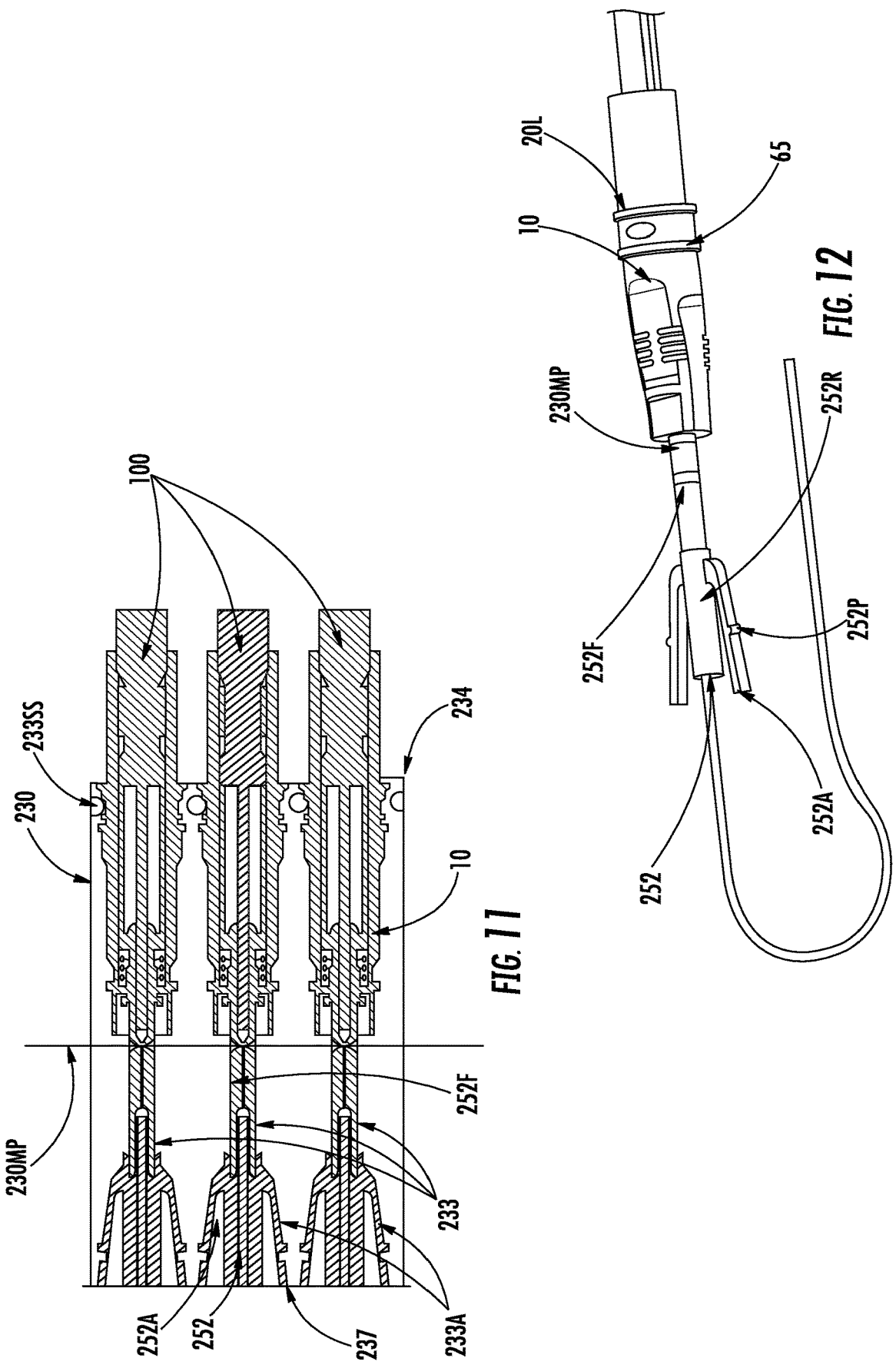

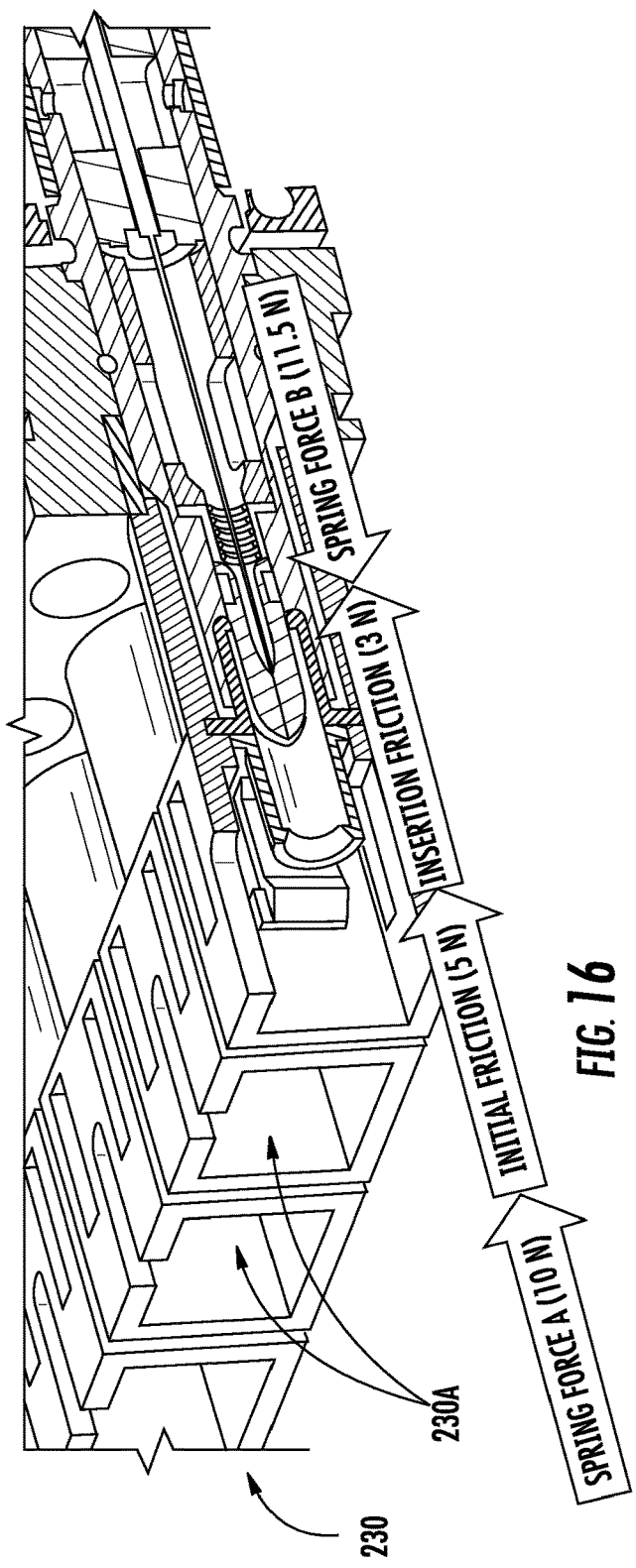
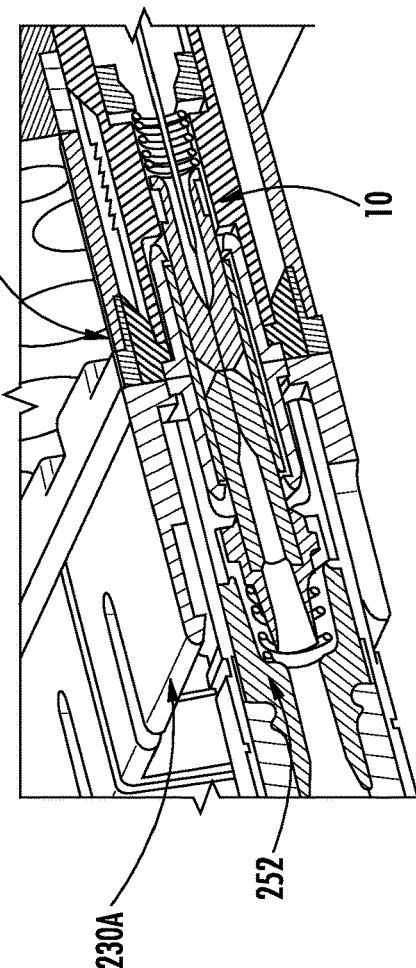
FIG. 16
FIG. 16A

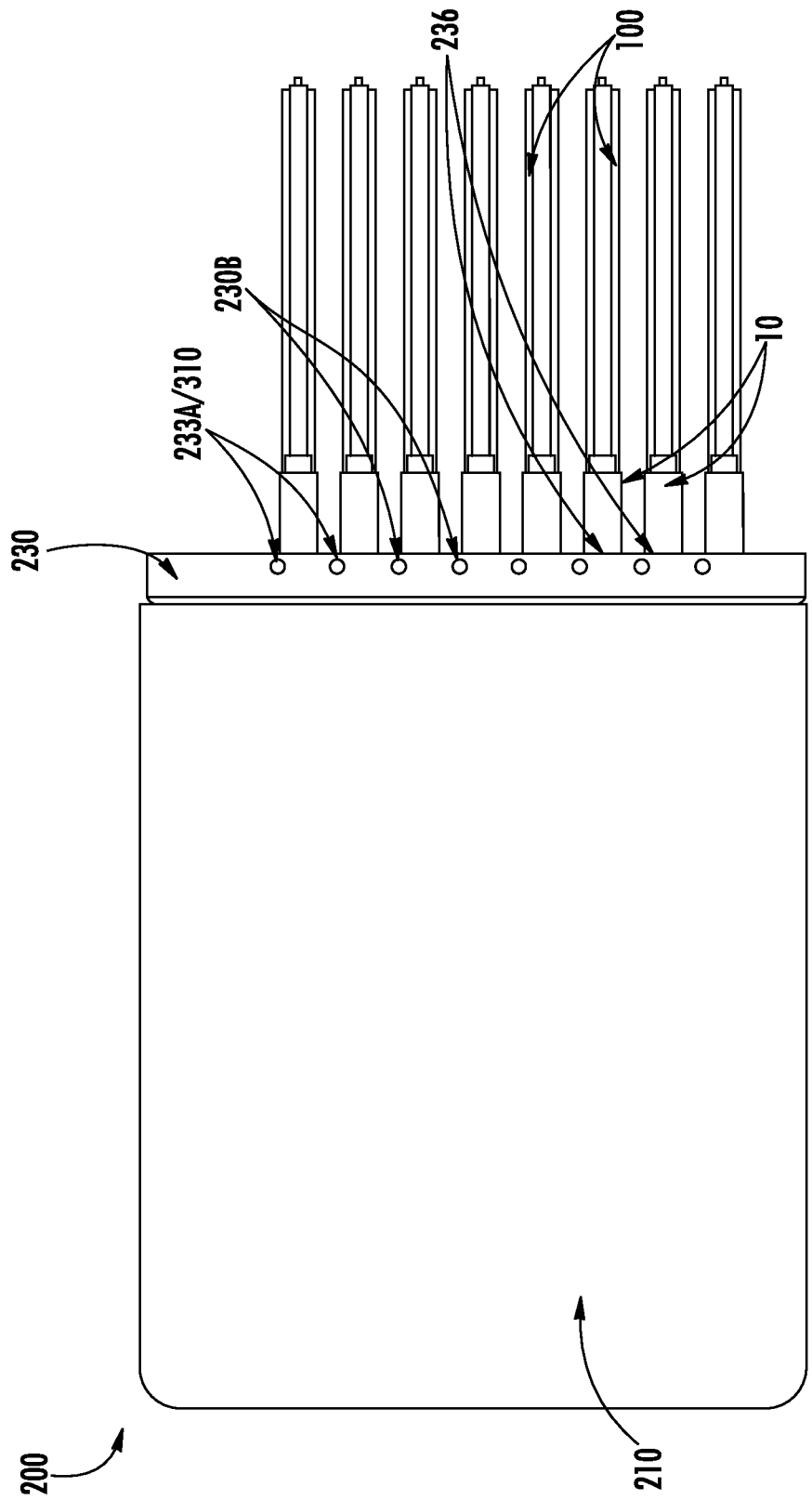

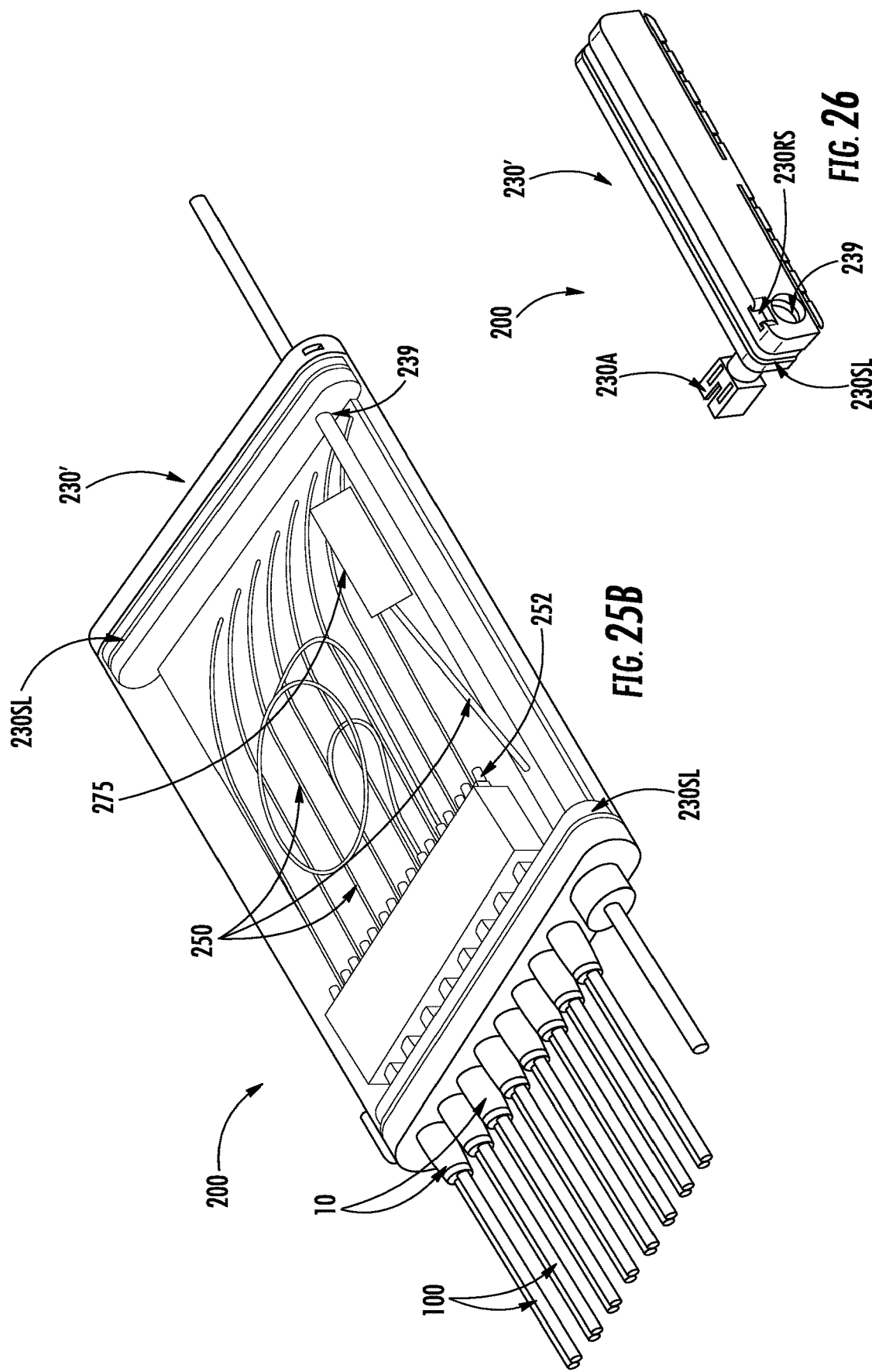

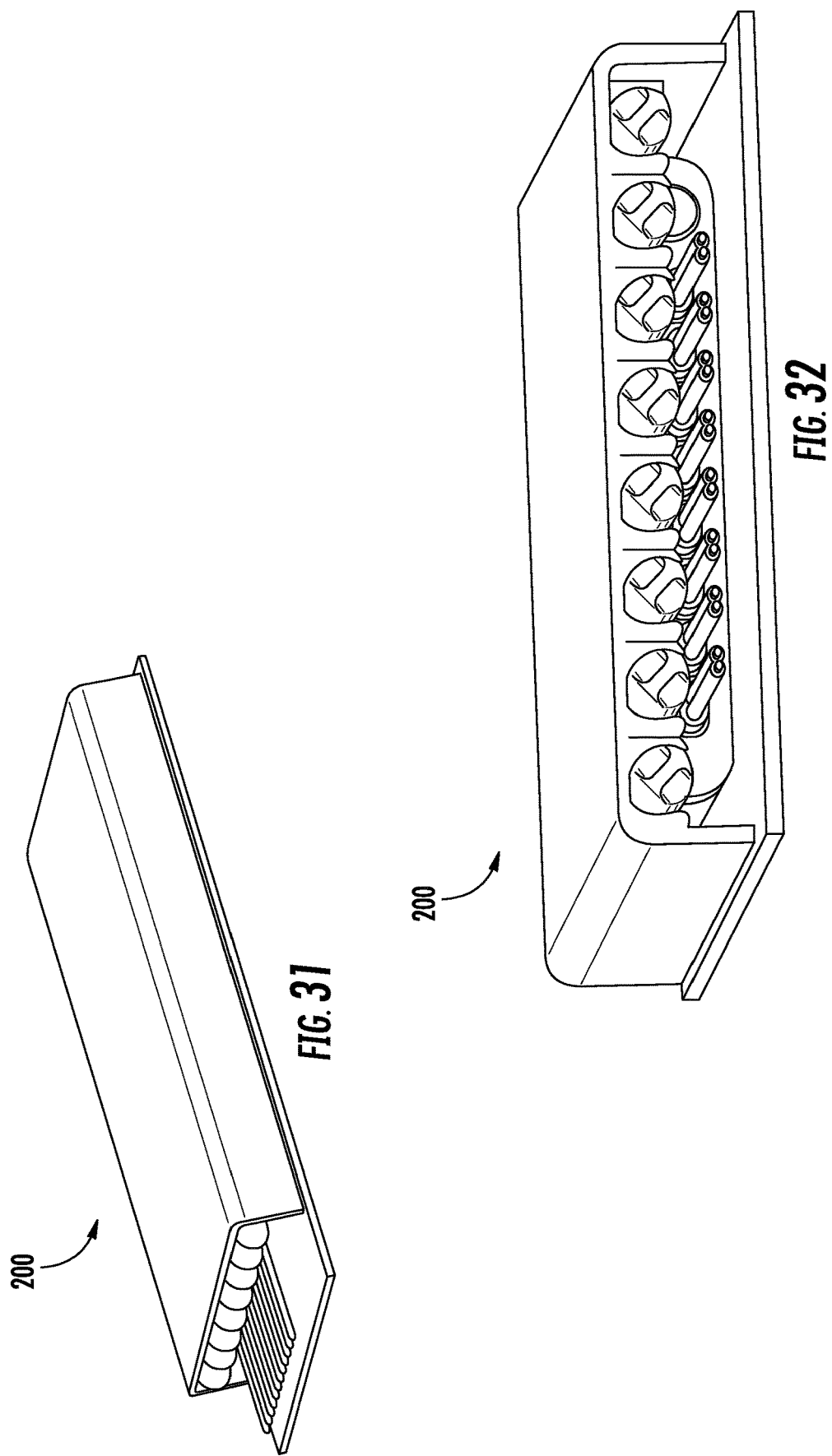

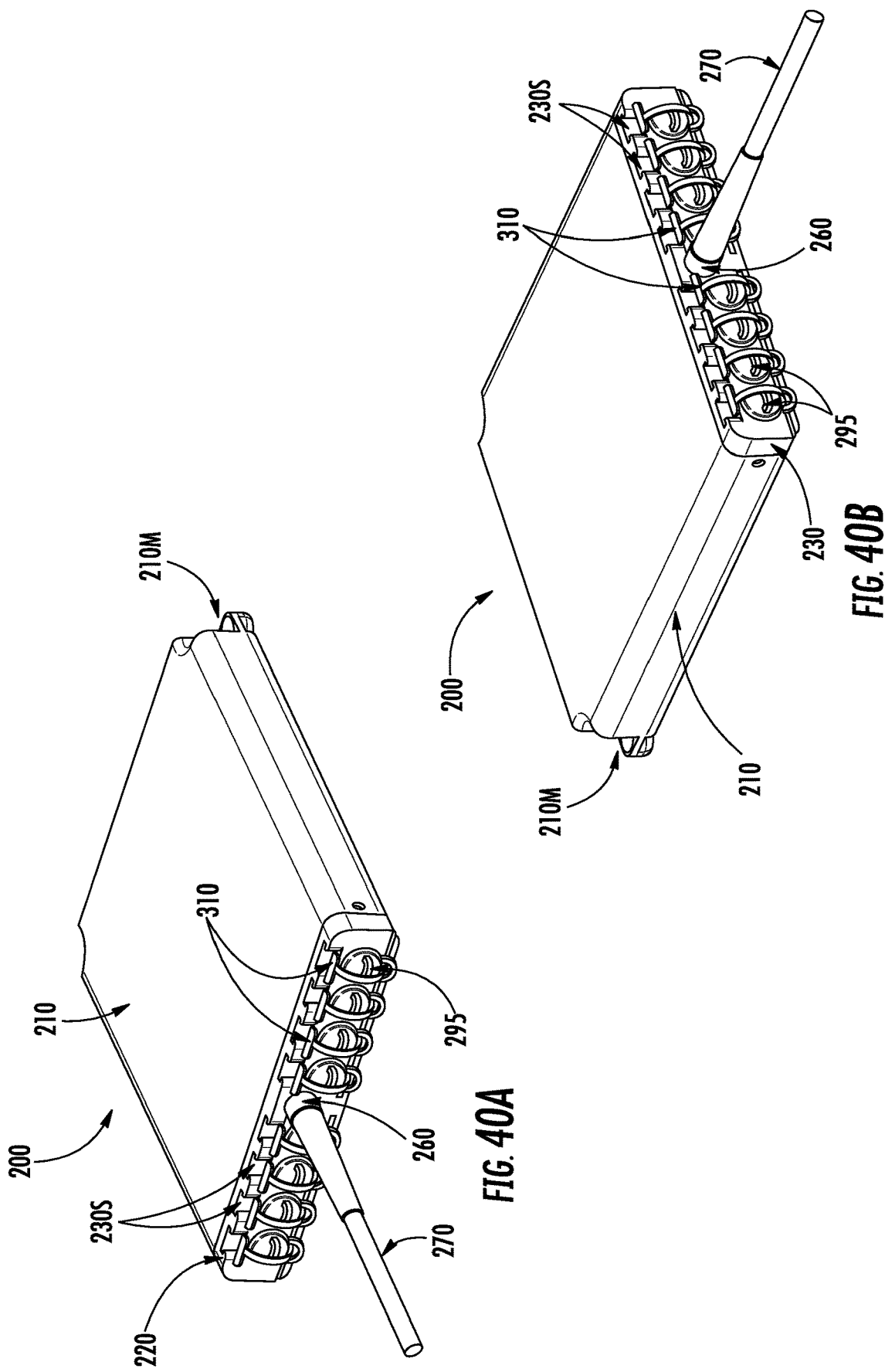

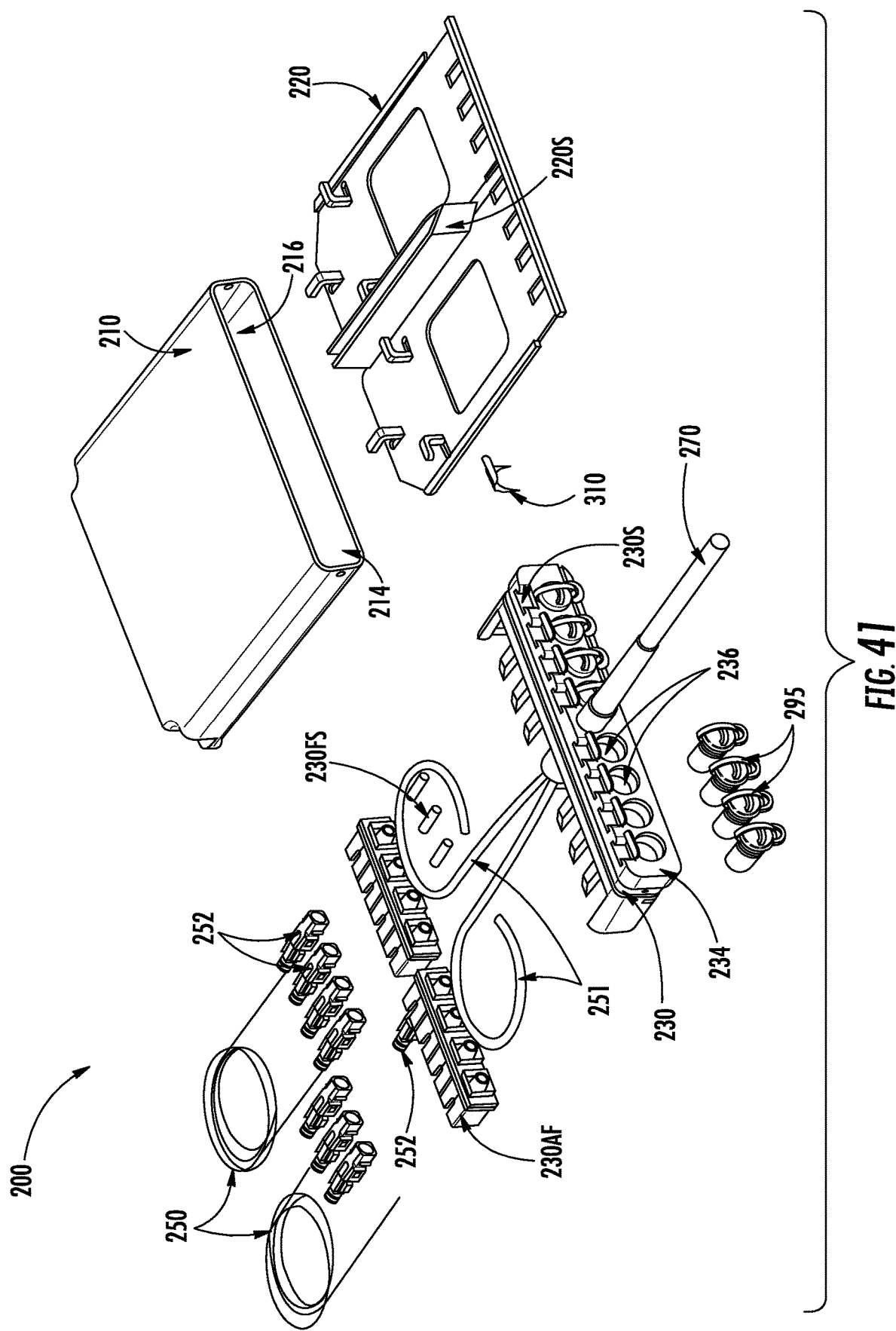

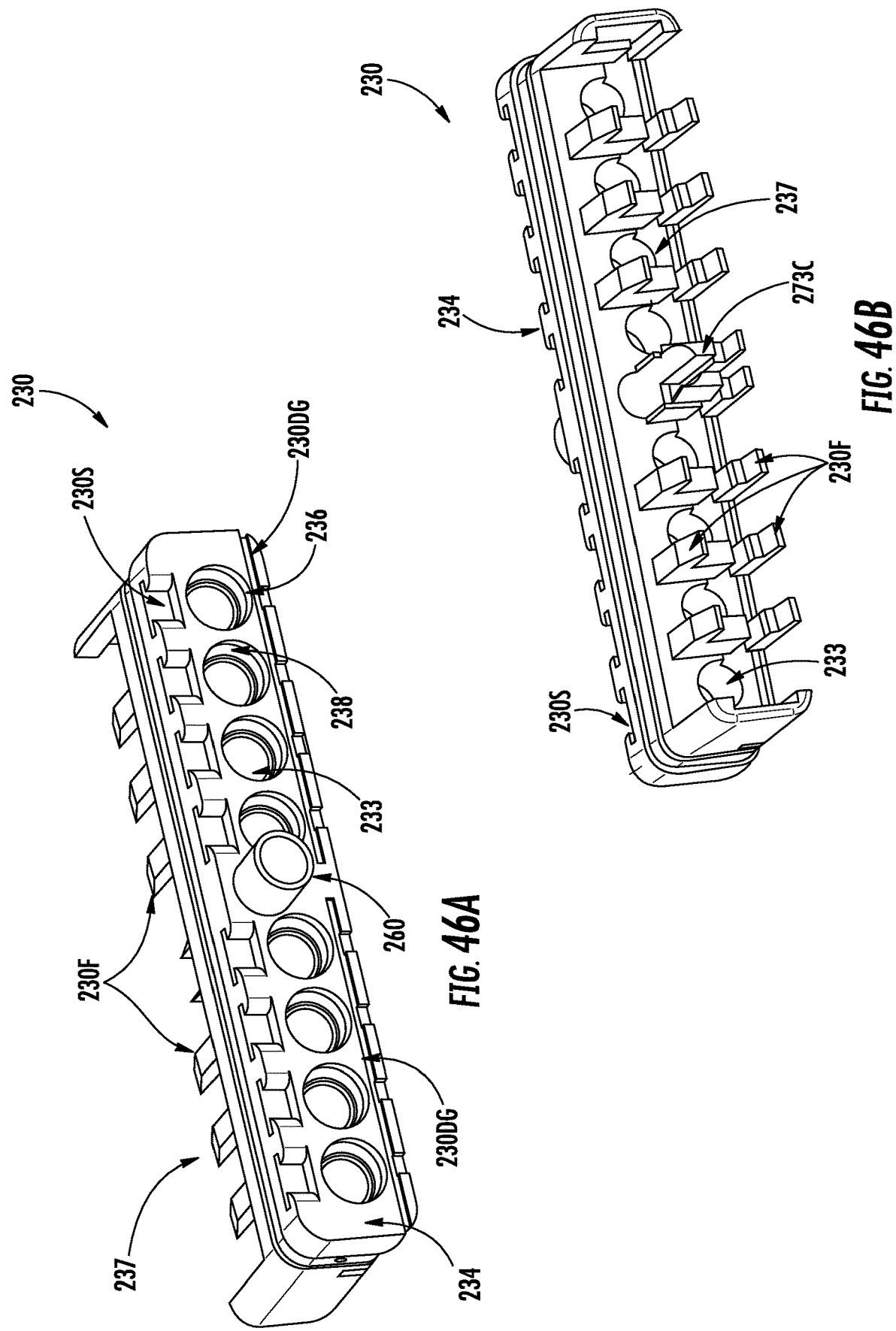

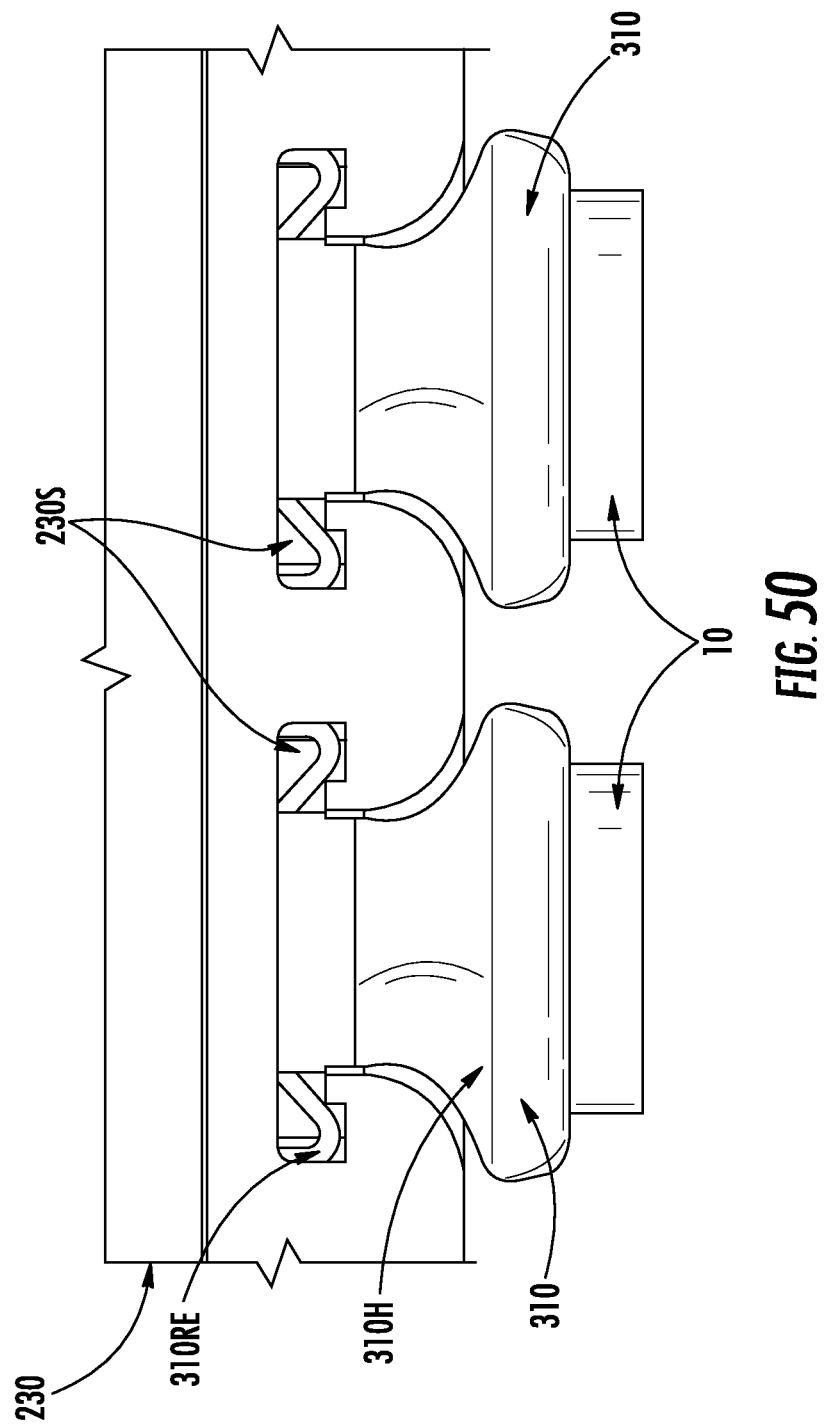

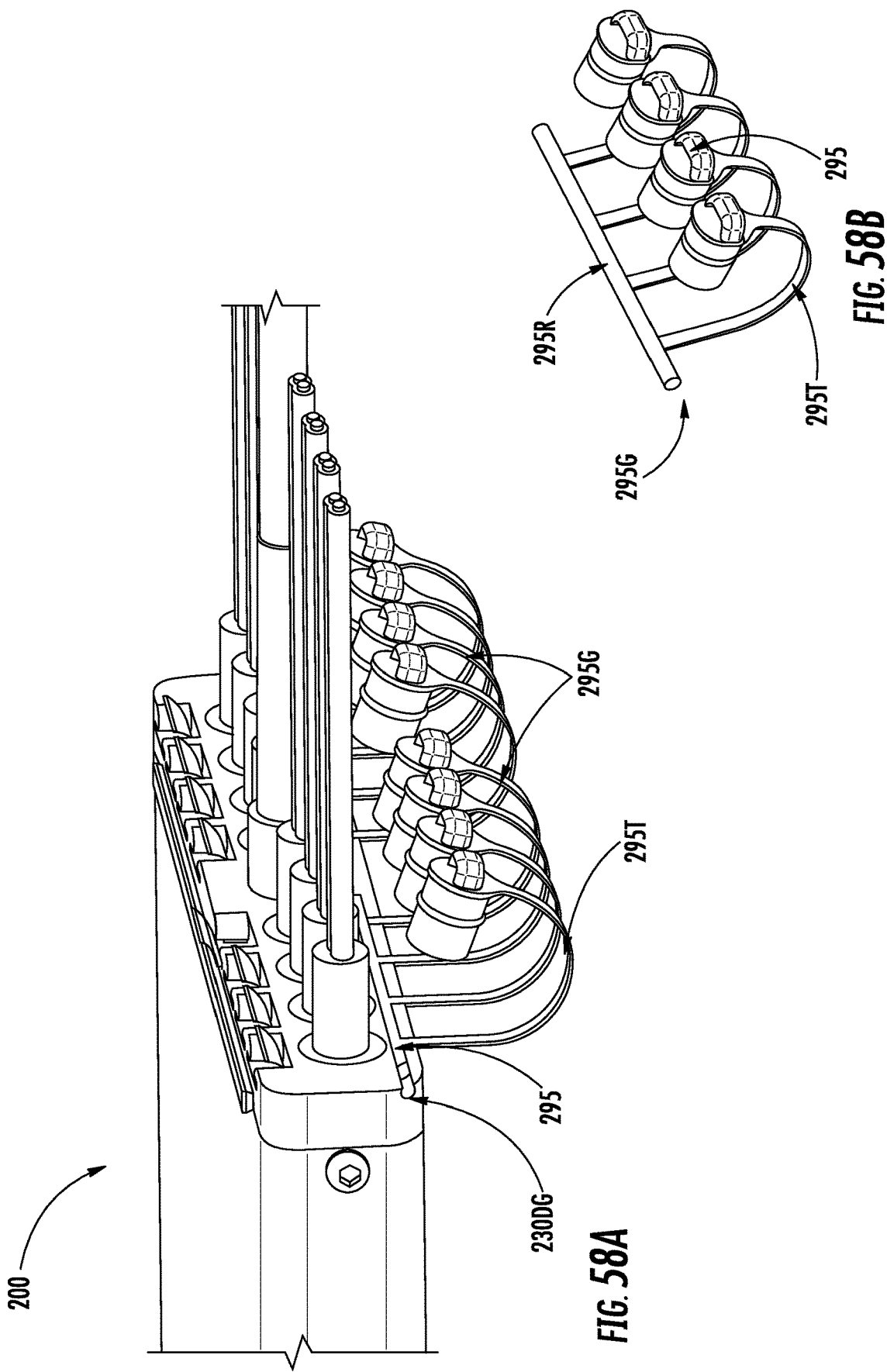

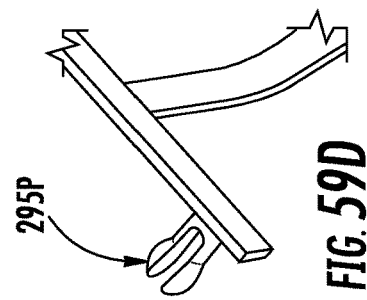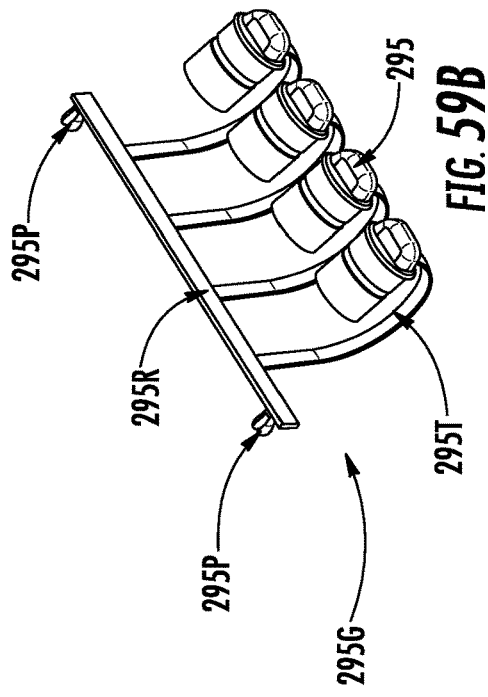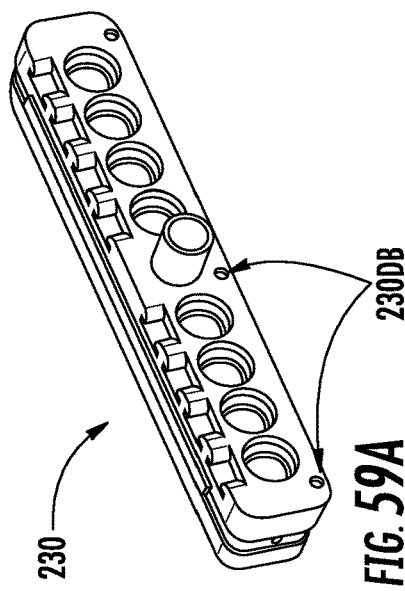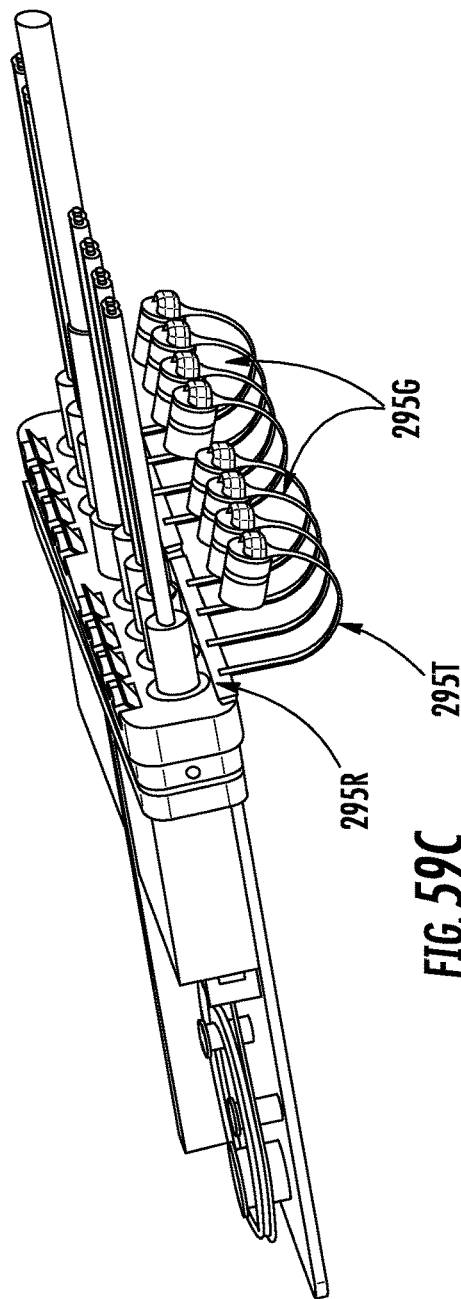

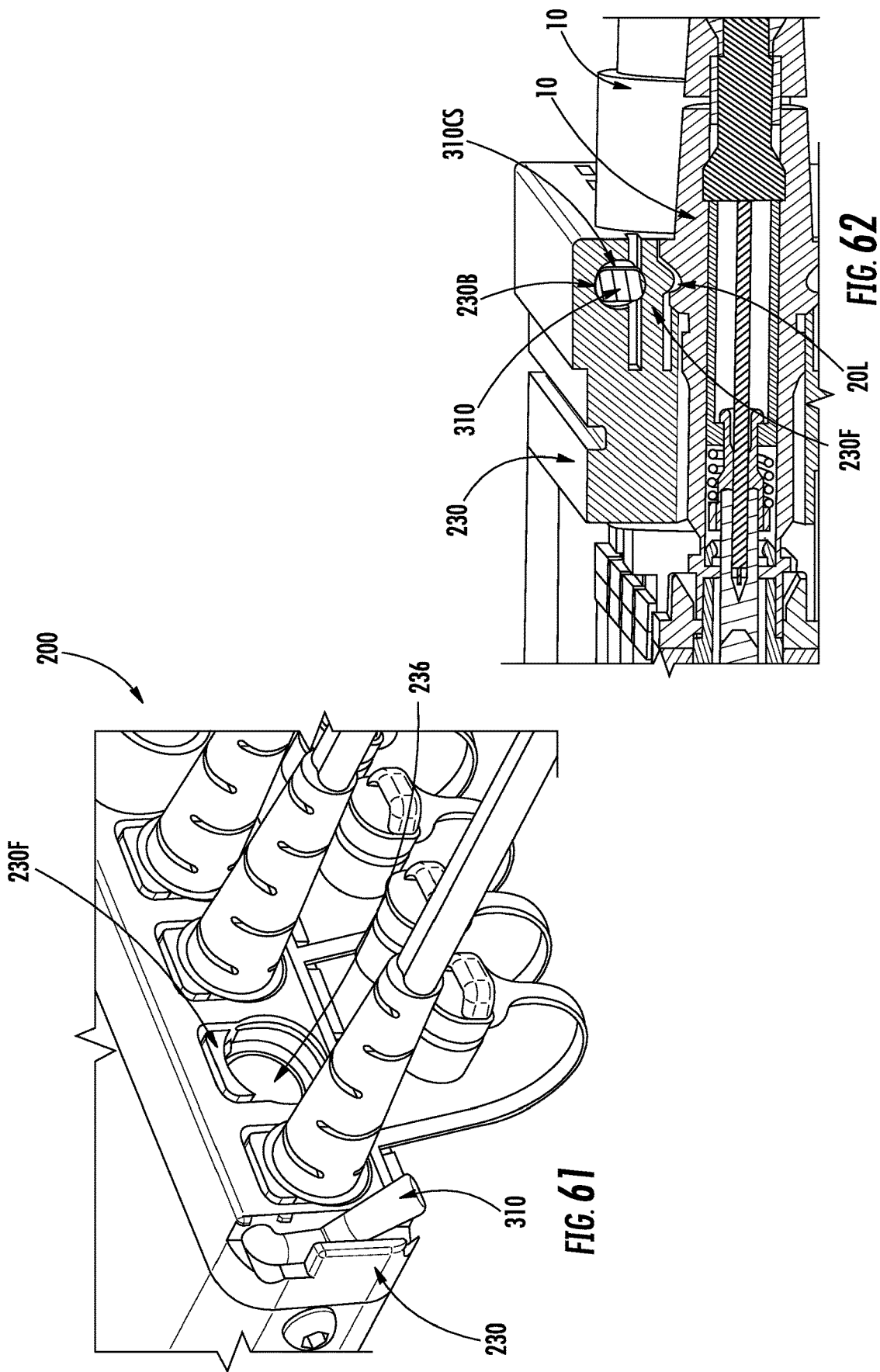

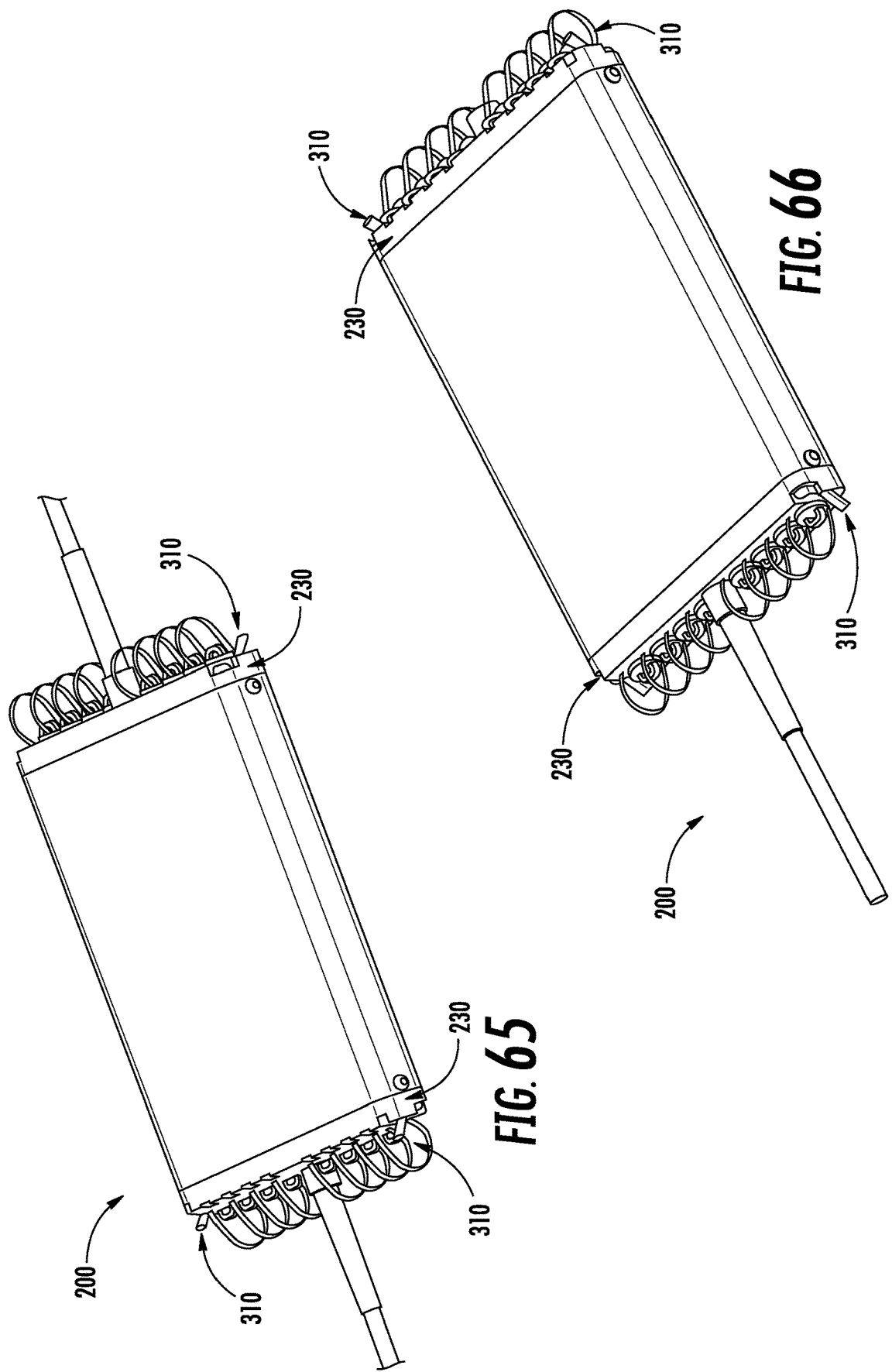

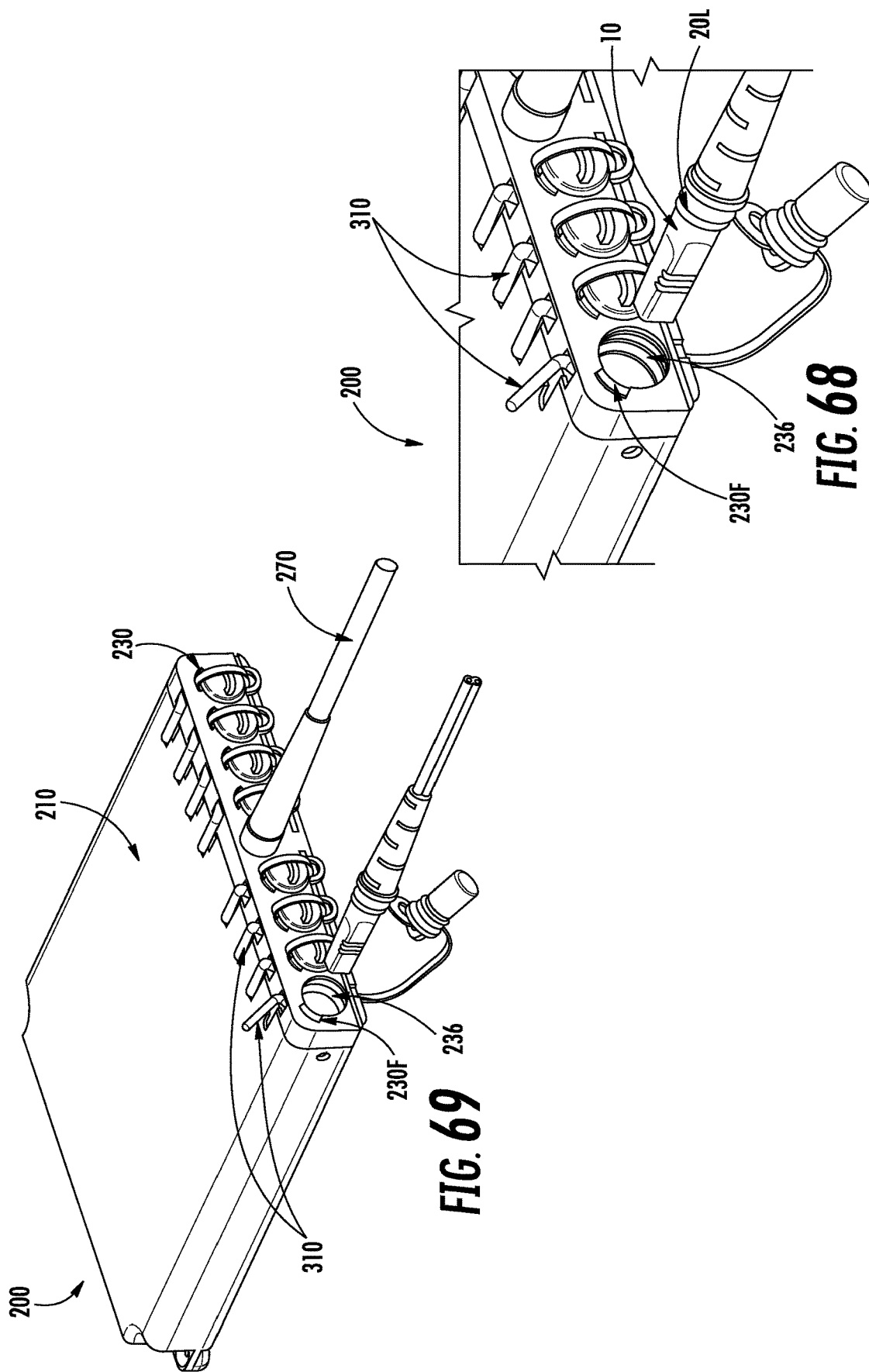

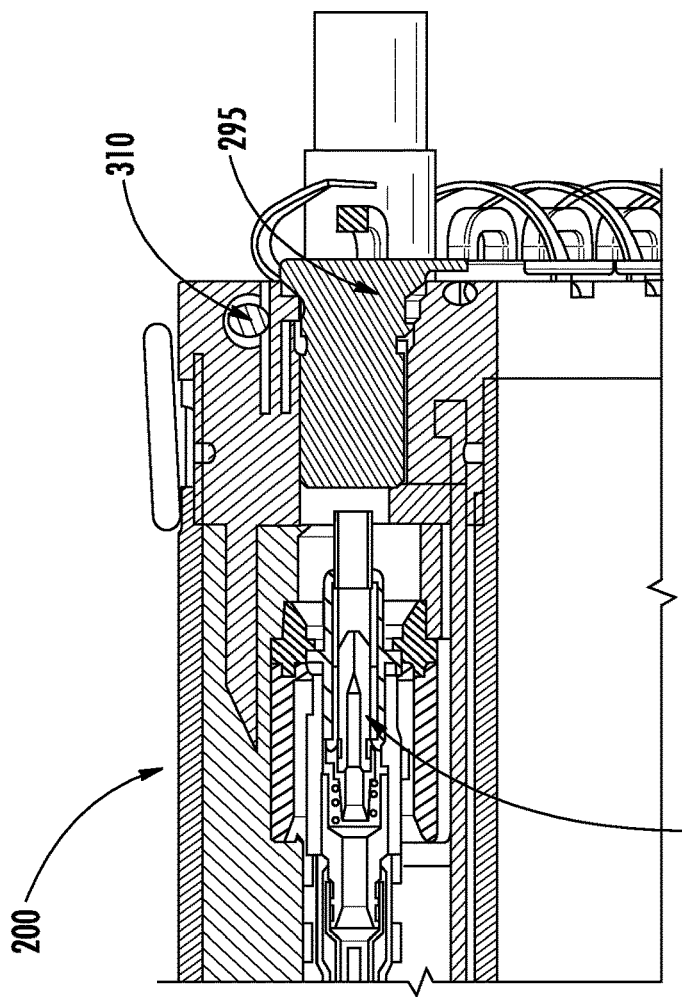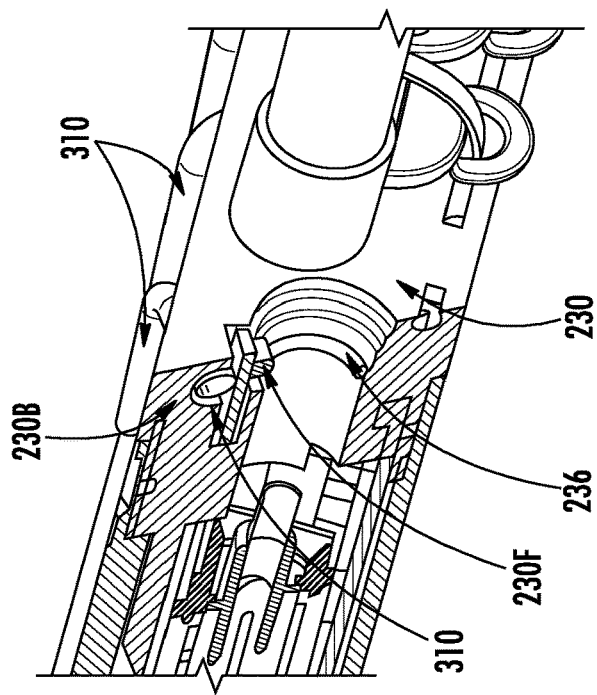

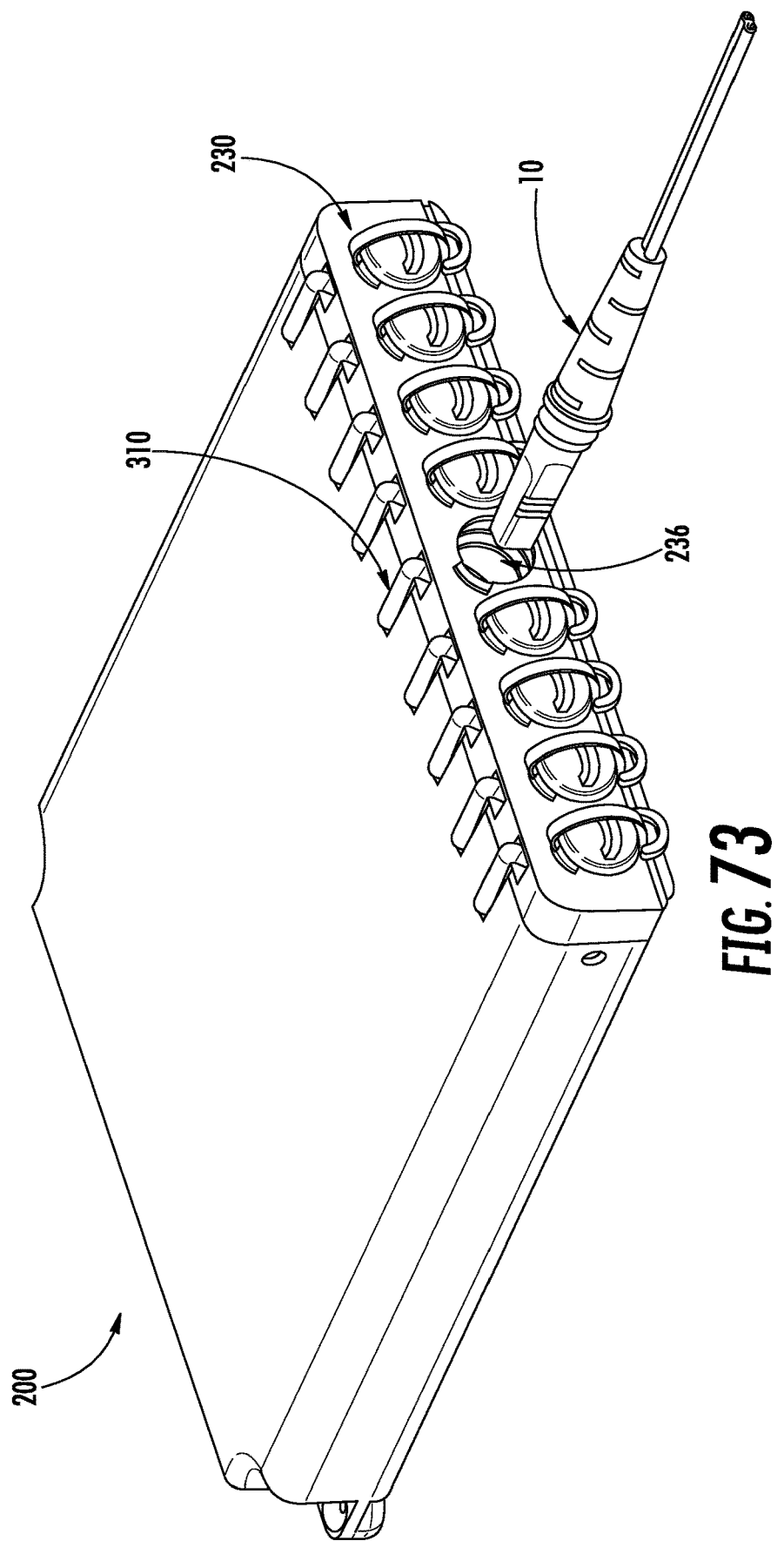

MULTIPORTS HAVING CONNECTION PORTS FORMED IN THE SHELL AND ASSOCIATED SECURING FEATURES

CROSS-REFERENCE TO RELATED APPLICATIONS

This application is a continuation of U.S. application Ser. No. 17/737,547, filed on May 5, 2022, which is a continuation of U.S. application Ser. No. 16/661,991 filed on Oct. 23, 2019, which is a continuation of International Application No. PCT/US2017/064093 filed Nov. 30, 2017, which claims the benefit of priority to U.S. Application No. 62/526,011 filed on Jun. 28, 2017, U.S. Application No. 62/526,018 filed on Jun. 28, 2017, and U.S. Application No. 62/526,195 filed on Jun. 28, 2017, the content of which is relied upon and incorporated herein by reference in entirety.

BACKGROUND

The disclosure is directed to devices for providing optical connections in a communications network along with methods for making the same. More specifically, the disclosure is directed to devices having a compact form-factor and simplified design along with an along with methods of making the same.

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communications networks the need for making robust optical connections in outdoor applications in a quick and easy manner was apparent. To address this need for making quick, reliable, and robust optical connections in communication networks for the outside the plant environment hardened fiber optic connectors such as the OptiTap® plug connector were developed.

Multiports were also developed for making an optical connection with hardened connectors such as the OptiTap. Prior art multiports have a plurality of receptacles mounted through a wall of the housing for protecting an indoor connector inside the housing that makes an optical connection to the external hardened connector of the branch or drop cable.

Illustratively, FIG. 1 shows a conventional fiber optic multiport 1 having an input fiber optic cable 4 carrying one or more optical fibers to indoor-type connectors inside a housing 3. The multiport 1 receives the optical fibers into a housing 3 and distributes the optical fibers to receptacles 7 for connection with a hardened connector. The receptacles 7 are separate assemblies attached through a wall of housing 3 of multiport 1. The receptacles 7 allow mating with hardened connectors attached to drop or branching cables (not shown) such as drop cables for "fiber-to-the-home" applications. During use, optical signals pass through the branch cables, to and from the fiber optic cable 4 by way of the optical connections at the receptacles 7 of multiport 1. Fiber optic cable 4 may also be terminated with a fiber optic connector 5. Multiports allowed quick and easy deployment for optical networks.

Although, the housing 3 of the prior art multiport 1 is rugged and weatherable for outdoor deployments, the housings 3 of multiport 1 are relatively bulky for mounting multiple receptacles 7 for the hardened connector on the housing 3. Receptacles 7 allow an optical connection between the hardened connector such as the OptiTap male plug connector on the branch cable with a non-hardened connector such as the SC connector disposed within the housing 3, which provides a suitable transition from an outdoor space to an protected space inside the housing 3.

Receptacle 7 for the OptiTap connector is described in further detail in U.S. Pat. No. 6,579,014. As depicted in U.S. Pat. No. 6,579,014, the receptacle includes a receptacle housing and an adapter sleeve disposed therein. Thus, the receptacles for the hardened connector are large and bulky and require a great deal of surface array when arranged in an array on the housing 3 such as shown with multiport 1. Further, conventional hardened connectors use a separate threaded or bayonet coupling that requires rotation about the longitudinal axis of the connector and room for grabbing and rotating the coupling by hand when mounted in an array on the housing 3.

Consequently, the housing 3 of the multiport 1 is excessively bulky. For example, the multiport 1 may be too boxy and inflexible to effectively operate in smaller storage spaces, such as the underground pits or vaults that may already be crowded. Furthermore, having all of the receptacles 7 on the housing 3, as shown in FIG. 1, requires sufficient room for the drop or branch cables attached to the hardened connectors attached to the multiport 1. While pits can be widened and larger storage containers can be used, such solutions tend to be costly and time-consuming. Network operators may desire other deployment applications for multiports 1 such as aerial, in a pedestal or mounted on a façade of a building that are not ideal for the prior art multiports 1 for numerous reasons such as congested poles or spaces or for aesthetic concerns.

Other multiports designs have been commercialized to address the drawbacks of the prior art multiports depicted in FIG. 1. By way of explanation, US 2015/0268434 discloses multiports 1' having one or more connection ports 9 positioned on the end of extensions 8 that project from the housing of the multiport 1' such as depicted in FIG. 2. Connection ports 9 of multiport 1' are configured for mating directly with a hardened connector (not shown) such as an OptiTap without the need to protect the receptacle 7 within a housing like the prior art multiport 1 of FIG. 1.

Although, these types of multiport designs such as shown in FIG. 2 and disclosed in US 2015/0268434 allow the device to have smaller footprints for the housing 3', these designs still have concerns such as the space consumed by the relatively large ports 9 and associated space requirements of optical connections between the ports and hardened connector of the drop cables along with organizational challenges. Simply stated, the ports 9 on the extensions 8 of the multiport 1' and the optical connections between ports 9 and hardened connector occupy significant space at a location a short distance away from the multiport housing 3' such as within a buried vault or disposed on a pole. In other words, a cluster of optical ports 9 of multiport 1' are bulky or occupy limited space. The conventional hardened connectors used with multiport 1' also use a separate threaded or bayonet coupling that requires rotation about the longitudinal axis of the connector along with sufficient space for grabbing and rotating the coupling means by hand. Further, there are aesthetic concerns with the prior art multiports 1' as well.

Consequently, there exists an unresolved need for multiports that allow flexibility for the network operators to quickly and easily make optical connections in their optical network while also addressing concerns related to limited space, organization, or aesthetics.

SUMMARY

The disclosure is directed to multiport and methods of making multiports as disclosed herein and recited in the claims.

One aspect of the disclosure is directed to a multiport for providing an optical connection comprising a shell comprising a first portion, at least one connection port comprising an optical connector opening, and a connection port passageway formed in the first portion of the shell, where the at least one securing feature is associated with the at least one connection port.

One aspect of the disclosure is directed to a multiport for providing an optical connection comprising a shell comprising a first portion, at least one connection port comprising an optical connector opening and a connection port passageway formed in the first portion of the shell, at least one optical fiber routed form the at least one connection port toward an input connection port within the shell, and at least one securing feature associated with the at least one connection port.

Another aspect of the disclosure is directed to a multiport for providing an optical connection comprising a shell comprising a first portion, at least one connection port comprising an optical connector opening and a connection port passageway formed in the first portion of the shell, at least one optical fiber routed form the at least one connection port toward an input connection port within the shell, at least one rear connector in communication with the connection port passageway, where the at least one rear connector is associated with the at least one optical fiber, and at least one securing feature associated with the at least one connection port.

Still another aspect of the disclosure is directed to a multiport for providing an optical connection comprising a shell comprising a first portion and a second portion, at least one connection port comprising an optical connector opening and a connection port passageway formed in the first portion of the shell, at least one optical fiber routed form the at least one connection port toward an input connection port within the shell, at least one rear connector in communication with the connection port passageway, where the at least one rear connector is associated with the at least one optical fiber, and at least one securing feature associated with the at least one connection port.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 3 and 4 respectively depict perspective and detail views of a multiport having a connection port insert with a plurality of connection ports and an input connection port;

FIGS. 11 and 12 respectively are a sectional view of the optical connections of FIG. 10 and an isolated perspective view of the optical connection between a rear connector and a fiber optic connector of the fiber optic cable assembly;

FIGS. 16 and 16A are rear perspective sectional views of a representative force diagram for the force interactions between the mating optical connections;

FIG. 20 is a top view of a multiport having fiber optic cable assemblies removably secured using retention features or securing features;

FIGS. 25A and 25B depict perspective views of multiports having a second insert with at least one pass-through port;

FIG. 26 depicts a perspective view of an alternative second insert having a pass-through port with and integrated adapter for receiving a fiber optic connector;

FIGS. 31-38 are various views of multiports and designs associated with mounting structures for the multiport;

FIGS. 40A-40C are various perspective views of multiports similar to the multiports of FIGS. 39A-39C having at least one securing feature associated with one or more of the connection ports and a connection port insert having an input tether;

FIG. 41 is a front partially exploded view of the multiport of FIGS. 40A-40C;

FIGS. 46A and 46B are front and rear perspective views of the connection port insert of the multiport of FIGS. 40A-40C;

FIGS. 50 and 51 respectively are a top view and a detailed perspective view of the connector port insert and the securing feature cooperating for securing the fiber optic connector in a multiport;

FIGS. 58A-58B are perspective views of another multiport similar to FIGS. 40A-40C showing another dust cap configuration for storage;

FIGS. 59A-59D are perspective views of still another multiport similar to FIGS. 40A-40C showing yet another dust cap configuration;

FIGS. 59A-59C are perspective views of still another multiport similar to FIGS. 40A-40C showing yet another dust cap configuration;

FIGS. 60-64 are perspective and sectional views of still another multiport having at least one rotating securing feature associated with a plurality of connection ports and the connection port insert having at least one flexure associated with at least one of the connection ports;

FIGS. 65-66 are perspective views of still others multiports similar to the multiport of FIGS. 61-64 having at least one rotating securing feature associated with a plurality of connection ports and the connection port insert having at least one flexure associated with at least one of the connection ports along with a second insert;

FIGS. 67-69 are perspective views of still another multiport having a dedicated rotating securing feature associated with each connection port and the connection port insert having a flexure associated with each of the connection ports;

FIGS. 70 and 71 are sectional views of the multiport of FIGS. 67-69 showing details of the dedicated rotating securing feature associated with each connection port and flexure;

FIG. 73 is a perspective view of still another multiport similar to the multiport of FIGS. 67-69 and having a dedicated rotating securing feature associated with the input connection port similar to the other connection ports;

DETAILED DESCRIPTION

Figure 1:
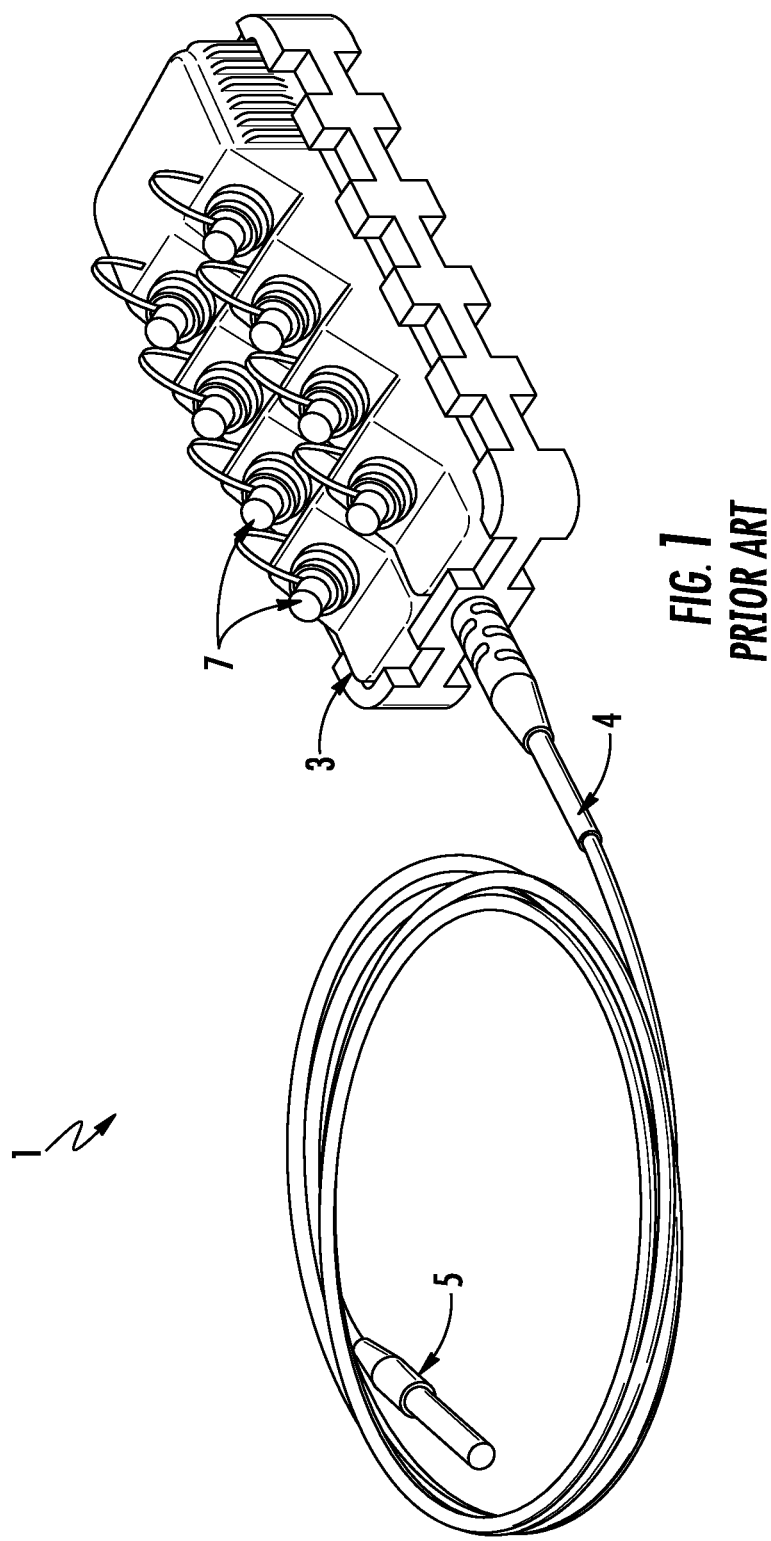
FIGS. 1 and 2 are prior art depictions showing various conventional multiports.
Figure 2:
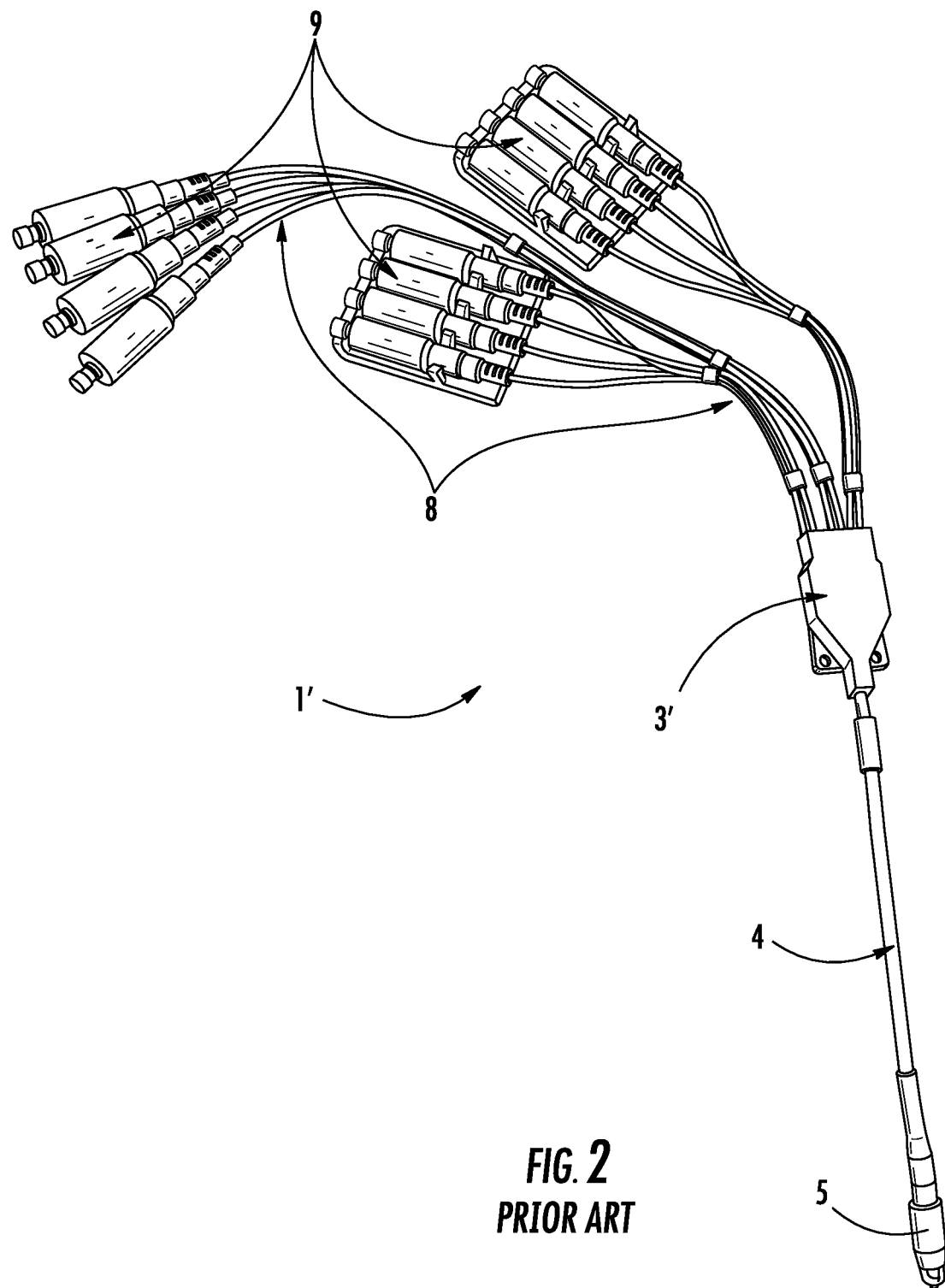

Reference will now be made in detail to the embodiments of the disclosure, examples of which are illustrated in the accompanying drawings. Whenever possible, like reference numbers will be used to refer to like components or parts.

The concepts for the devices disclosed herein are suitable for providing at least one optical connection to a device for indoor, outdoor or other environments as desired. Generally speaking, the devices disclosed and explained in the exemplary embodiments are multiports, but the concepts disclosed may be used with any suitable device as appropriate. As used herein, the term "multiport" means any device comprising at least one connection port for making an optical connection and a retention feature or securing feature associated with the at least one connection port. By way of example, the multiport may be any suitable device having at least one optical connection such as a passive device like an optical closure (hereinafter "closure") or an active device such as a wireless device having electronics for transmitting or receiving a signal.

The concepts disclosed advantageously allow compact form-factors for devices such as multiports comprising at least one connection port and the retention feature or securing feature associated with the connection port. The concepts are scalable to many connection ports on a device in a variety of arrangements or constructions. The compact form-factors may allow the placement of the devices in tight spaces in indoor, outdoor, buried, aerial, industrial or other applications while providing at least one connection port that is advantageous for a robust and reliable optical connection in a removable and replaceable manner. The disclosed devices may also be aesthetically pleasing and provide organization for the optical connections in manner that the prior art multiports cannot provide.

The devices disclosed are simple and elegant in their designs. The devices disclosed comprise at least one connection port and a retention feature or securing feature associated with the connection port that is suitable for retaining an external fiber optic connector received by the connection port. Unlike prior art multiports, some of the concepts disclosed advantageously allow the quick and easy connection and retention by inserting the fiber optic connectors directly into the connection port of the device without the need or space considerations for turning a threaded coupling nut or bayonet for retaining the external fiber optic connector. Generally speaking, the retention features or securing features disclosed for use with devices herein may comprise one or more components with at least one component translating for releasing or securing the external fiber optic connector to the device. As used herein, the term "securing feature" excludes threaded portions or features for securing a bayonet disposed on a connector.

Since the connector footprint used with the devices disclosed does not require the bulkiness of a coupling nut or bayonet, the fiber optic connectors used with the devices disclosed herein may be significantly smaller than conventional connectors used with prior art multiports. Moreover, the present concepts using the securing features with the connection ports on devices allows an increased density of connection ports per volume of the shell since there is no need for accessing and turning the coupling nut or bayonets by hand for securing a fiber optic connector like the prior art multiports.

The devices disclosed comprise a retention feature or securing feature for directly engaging with a suitable portion of a connector housing of the external fiber optic connector or the like for securing an optical connection with the device. Different variations of the concepts are discussed in further detail below. The structure for securing the fiber optic connectors in the devices disclosed allows much smaller footprints for both the devices and the fiber optic connectors. Devices may also have a dense spacing of connection ports if desired. The devices disclosed advantageously allow a relatively dense and organized array of connection ports in a relatively small form-factor while still being rugged for demanding environments. As optical networks increase densifications and space is at a premium, the robust and small-form factors for devices such as multiports, closures and wireless devices becomes increasingly desirable for network operators.

The concepts disclosed herein are suitable for optical distribution networks such as for Fiber-to-the-Home applications, but are equally applicable to other optical applications as well including indoor, automotive, industrial, wireless or other suitable applications. Additionally, the concepts may be used with any suitable fiber optic connector footprint that cooperates with the retention feature or securing features disclosed, but the concepts disclosed herein may be used with other fiber optic connectors as well. Various designs, constructions or features for devices are disclosed in more detail as discussed herein.

Figure 17A:
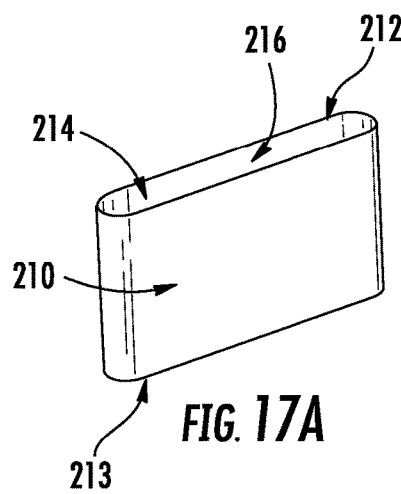
FIGS. 17A-17C are perspective views of shells for multiports having various configurations.
Figure 17B:
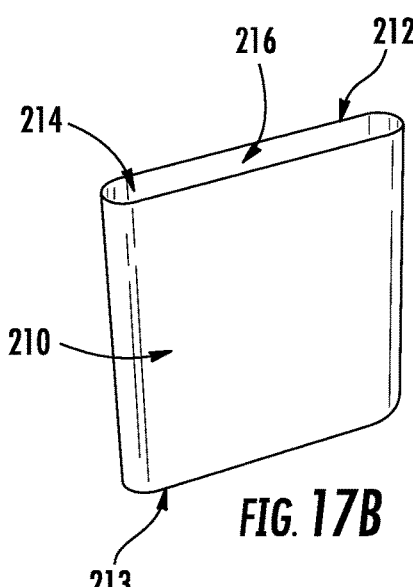
Figure 17C:
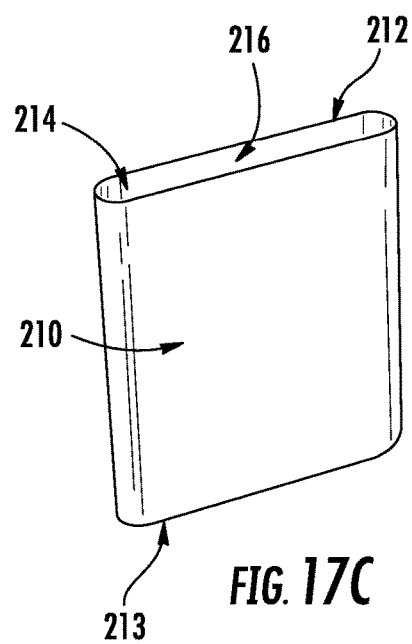
Figure 18A:
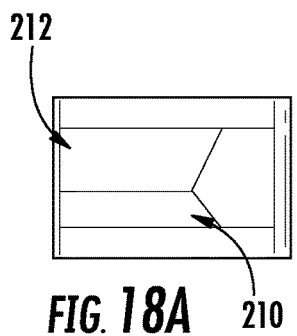
FIGS. 18A-18C are perspective views of other shells for multiports having various configurations.
Figure 18B:
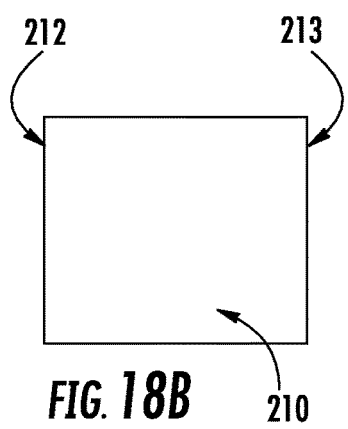
Figure 18C:
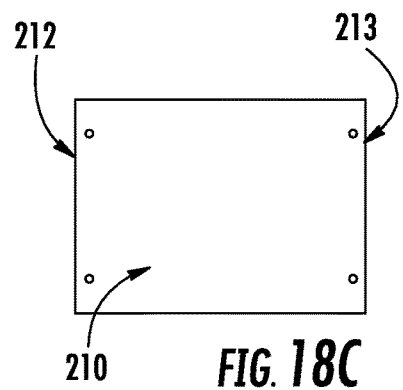

FIGS. 3 and 4 respectively depict a perspective and detail views of an explanatory multiport 200 having a shell 210 and connection port insert 230. Shell 210 comprises a first end 212 having a first opening 214 leading to a cavity 216 (see FIGS. 17A-17C). Connection port insert 230 comprises a body 232 having a front face 234 and a plurality of connection ports 236. Each connector port 236 has an optical connector opening 238 extending from the front face 234 into the connection port insert 230 with a connection port passageway 233 extending through part of the connection port insert 230 to a rear portion 237 of the connection port insert 230. Connection port insert 230 is sized so that at least a portion of the connection port insert 230 fits into the first opening 214 and the cavity 216 of the shell 210.

Multiports provide optical connections to the multiport by inserting one or more external fiber optic connectors 10 as needed. Specifically, the connection port passageway 233 is configured for receiving a suitable fiber optic connector 10 (hereinafter connector) of fiber optic cable assembly 100 (hereinafter cable assembly) as depicted in FIG. 3. Connection port passageway 233 may comprise one or more retention features 233a (see FIG. 11) for securing connector 10 as desired. The retention feature 233a may be disposed in the connection port passageway or be disposed in other locations as appropriate for retaining one of the mating connectors. By way of example, the retaining feature may be a friction fit, a detent, a protrusion, bayonet, threaded portion or the like. Connection ports 236 of multiports 200 may also comprise a keying feature (236K) for mating with an appropriate connector 10. Additionally, other multiport embodiments may have one or more securing features 310 for engaging with a suitable locking portion 20L of connector 10 or the like.

A plurality of optical fibers 250 are routed from one or more of the plurality of connection ports 236 toward an input connection port 260 for optical communication with the multiport 200. The input connection port 260 may be configured in a variety of different manners with any of the multiports disclosed herein as appropriate. For the sake of simplicity and clarity in the drawings, all of the optical fiber pathways may not be illustrated or portions of the optical fiber pathways may be removed in places so that other details of the design are visible.

Multiport 200 of FIGS. 3 and 4 has eight optical fibers 250 routed from one or more of the plurality of connection ports 236 toward an input connection port 260 for optical communication with the multiport. Input connection port 260 may be configured in several different configuration for the multiports disclosed as desired for the given application. Examples of input connection ports include being configured as a single-fiber input connection, a multi-fiber input connector, a tether input that may be a stubbed cable or terminated with a connector or even one of the connection ports 236 may function as an input connection port as desired (see FIG. 73). To make identification of the input connection port to the user, a marking indicia may be used such as color-coding of the input tether (e.g. an orange or green polymer) or physically marking the input connection port 260.

In the embodiment shown in FIGS. 3 and 4, the input connection port 260 is configured as a 8-fiber MT connection port as best shown in FIG. 4. Consequently, an input cable (not numbered) comprises a complementary 8-fiber MT connector 262 for mating with the 8-fiber MT input connection port 260 and may be attached in any suitable manner such as a threaded connection, bayonet, push-pull, etc. as desired. Thus, there is a one-to-one correspondence of input optical fibers to the connection ports 230 for this multiport; however, other variations of multiports can have other configuration such as pass-through optical fibers, splitters, or the like which may not use a one-to-one correspondence of input optical fibers to connection ports 236 of the multiport. In other words, eight optical fibers from connector 262 are routed to the rear portion of connection port insert 230 for optical communication with the eight connection ports 236.

Although not visible in FIG. 4, a plurality of rear connectors 252 (not visible in FIGS. 2-5) are sized for fitting into one or more of the respective connector port passageways 233 from the rear portion 237 of connection port insert 230, and the plurality of rear connectors 252 are associated with the plurality of optical fibers 250. Thus, each of the eight optical fibers 250 of multiport 200 of FIG. 4 comprises a respective rear connector 252 that attaches to the connector port insert 230 from the rear portion 237 similar to arrangement shown in FIG. 10. The plurality of rear connectors 252 may comprise a rear connector ferrule 252F as desired.

Multiports may also have one or more dust caps 295 for protecting the connection port 236 or input connection ports 260 from dust, dirt or debris entering the multiport or interfering with the optical performance. Thus, when the user wishes to make an optical connection to the multiport, the appropriate dust cap 295 is removed and then connector 10 of cable assembly 100 may be inserted into the respective connection port 236 for making an optical connection to the multiport 200. Shells 210 may have any suitable shape, design or configuration as desired. The shell 210 of multiport 200 shown in FIGS. 3 and 4, further comprises a second end 213 comprising a second opening 215 and a second insert 230' sized so that at least a portion of the second insert 230' fits into the second opening 215 and cavity 216 of shell 210. As shown second insert 230' is configured as an end cap 280. Second insert 230' is an end cap 280 since it does not have any connection ports, pass-throughs, adapters or the like, but simply closes off the second opening 215 of multiport 200. Still further, the connection port insert 230 or second insert 230' may be secured to the shell using a fastener or the like if desired. Other shells 210 may only have a first opening as desired.

Any of the multiports 200 disclosed herein may optionally be weatherproof by appropriately sealing the connection port insert(s) 230, 230' with the shell 210 using any suitable means such as gaskets, O-rings, adhesive, sealant, welding, overmolding or the like. Moreover, the interface between the connection ports 236 and the dust cap 295 or connector 10 may be sealed using appropriate geometry and/or a sealing element such as an o-ring or gasket. Likewise, the input connection port may be weatherproofed in a suitable manner depending on the configuration such as a gasket, or O-ring with an optical connection or a heat shrink when using a input tether. If the multiport 200 is intended for indoor applications, then the weatherproofing may not be required.

However, the devices disclosed may locate the at least one connection port 236 in other portions or components of the device other than the connection port insert 230 using the concepts as disclosed herein as desired.

By way of explanation, other embodiments using the concepts disclosed herein may have the at least one connection port 236 being formed as a portion of a shell of the device. By way of explanation, at least one connection port 236 is molded as a first portion of shell 210 and a second portion of the shell 210 is a cover used for closing the opening such as at the bottom of the two-piece shell. In other words, instead of the parting line being in a vertical direction between the components of the connection port insert 230 and the shell 210 as shown in FIG. 3, a parting line PL between components of the shell may be in a horizontal direction between a first portion 210A of the shell comprising at least one connection port 236 and a second portion 210B of the shell 210 such as depicted by a parting line PL in the devices of FIG. 5. Thus, the concepts of the connection port 236 described herein may be integrated into a portion of the shell 210, instead of being a portion of the connection port insert 230. For the sake of brevity, the concept of forming at least one connection port 236 in a portion of the shell 210 will be shown with respect to FIG. 5, but any suitable concepts disclosed herein may have the connection port 236 and construction for the retention feature or securing feature formed in a portion of the shell along with the other features or constructions disclosed.

Figure 5:
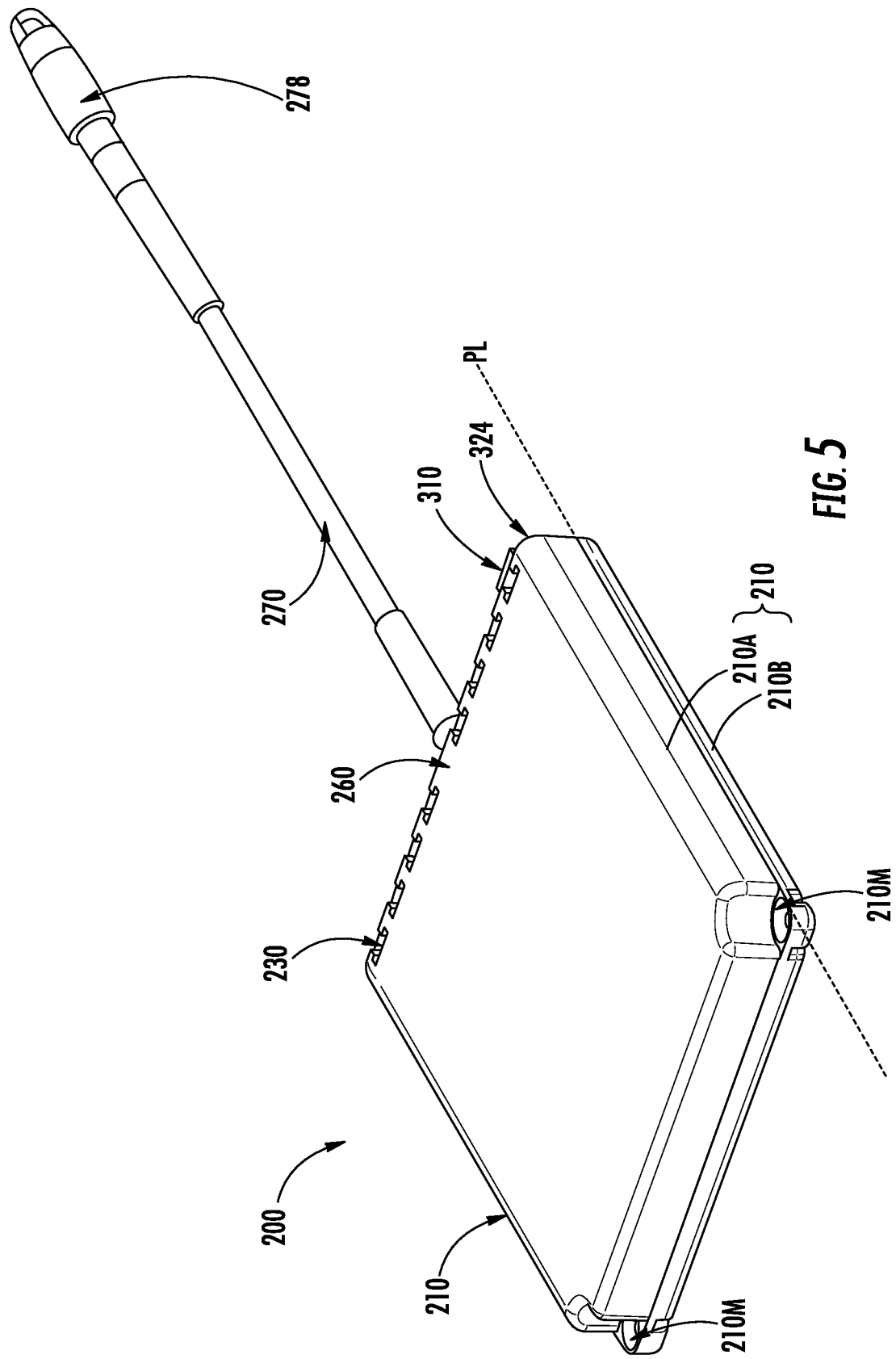
FIG. 5 depicts a perspective view of another multiport having a shell comprising more than one component with the connection port integrally formed with a portion of the shell along with an input tether terminated with an input connector.

FIG. 5 depicts a perspective view of another multiport 200 comprising shell 210 comprising a first portion 210A and a second portion 210B that is similar to the multiport 200 of FIGS. 3 and 4, but has the connection ports 236 formed with the first portion 210A of the shell instead of being formed in a connection port insert 230. Besides being formed from multiple components, this multiport 200 has a different shell 210 that further comprises integrated mounting features 210 disposed at the second portion 210B of shell 210, but mounting features 210 may be disposed at any suitable location on the shell 210 or be used with other suitable shells 210. Thus, the user may simply use a fastener and mount the multiport 200 to a wall or pole as desired. This multiport 200 also has a plurality of securing features 310 (in addition to the retention features 233a) for engaging with a suitable locking portion 20L of connector 10 or the like, which will be discussed in further detail below. Any of the other concepts disclosed herein may also be used with the connection ports 236 formed as a portion of the shell 210 as well.

Additionally, multiport 200 of FIG. 5 comprises an input tether 270 attached to the first portion 210A of the shell 210. In this case, input tether 270 is terminated with a fiber optic connector 278. An example of a suitable fiber optic connector 278 is an OptiTip® connector available from Corning Optical Communications LLC of Hickory, NC. However, other suitable single-fiber or multi-fiber connectors may be used for terminating the input tether 270 as desired. Input tether 270 may be secured to connection port insert 230 in any suitable manner such as adhesive, a collar or crimp (see FIG. 42), heat shrink or combinations of the same.

Furthermore, the input tether 270 may further comprise a furcation body 270F that has a portion that fits into a portion of the shell or the connection port insert 230 such as the bore of input connection port or that is disposed within the shell 210. The furcation body 270 is a portion of the input tether that transitions the optical fibers 250 to individual fibers for routing within the cavity 216 of the shell to the respective connector ports. As an example, a ribbon may be used for insertion into the back end of the ferrule of fiber optic connector 278 and then be routed through the input tether 270 to the furcation body 270F where the optical fibers are then separated out into individual optical fibers 250. From the furcation body 270F the optical fibers 250 may be protected with a buffer layer or not inside the cavity 216 of the multiport 200 and then terminated on a rear connector 252 (see FIG. 10) as desired.

Consequently, the input tether 270 with the furcation body 270F may be assembled with the rear connectors 252 and/or fiber optic connector 278 in a separate operation from the assembly of multiport 200. Thereafter, the rear connectors 252 may be individually threaded through a bore 260B of the input connection port 260 (see FIGS. 6 and 9) of the connection port insert 230 with the appropriate routing of the optical fiber slack and then have the rear connectors 252 attached to the appropriate structure for optical communication with the connection port passageways 233 of the connection port insert 230. The furcation body 270F may also be secured to the connection port insert in the manner desired.

Figure 6:
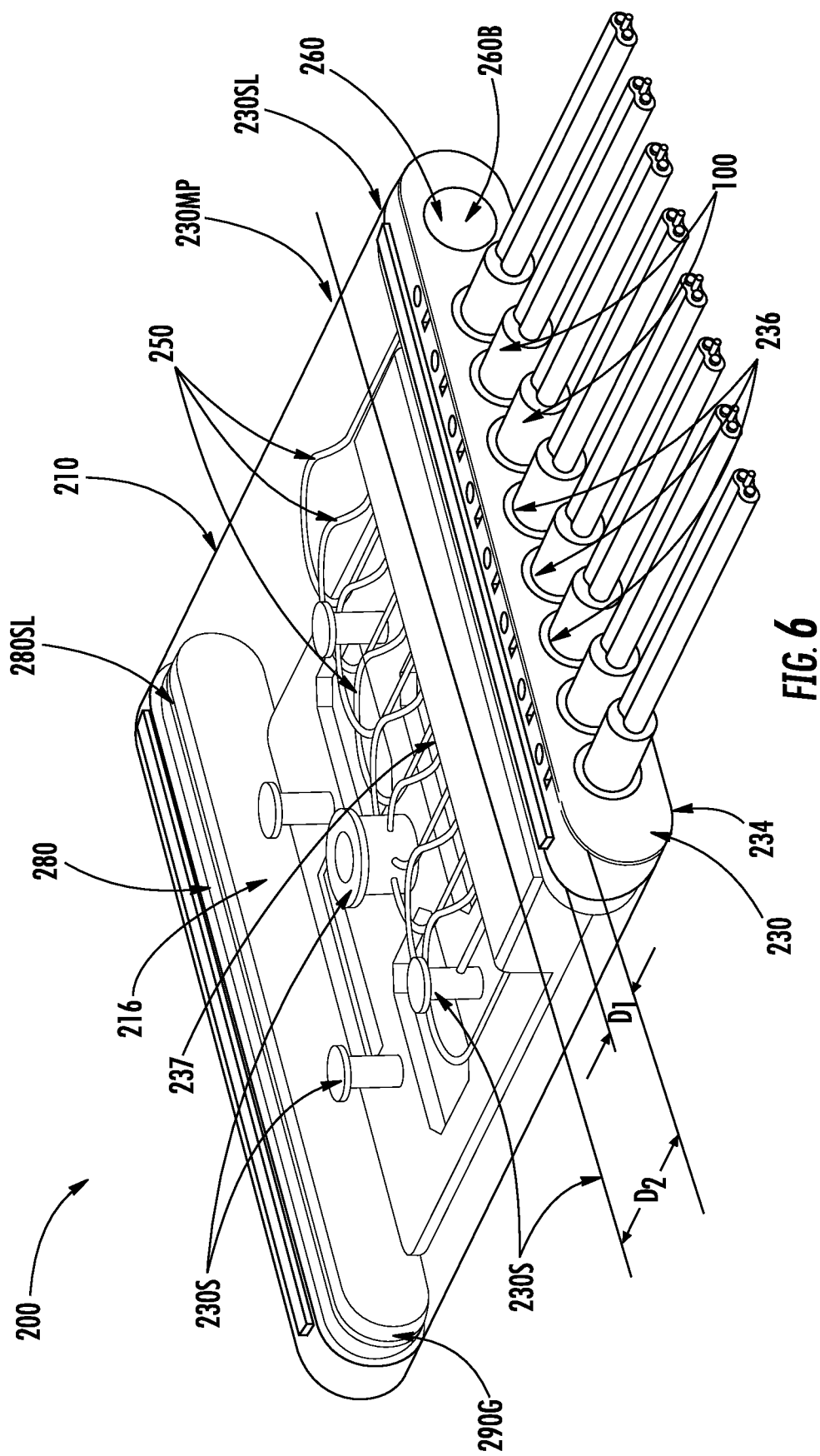
FIG. 6 is a front perspective view of another multiport having an input connection port configured for receiving a furcation body of an input tether and is visible through the shell for showing details.
Figure 7:
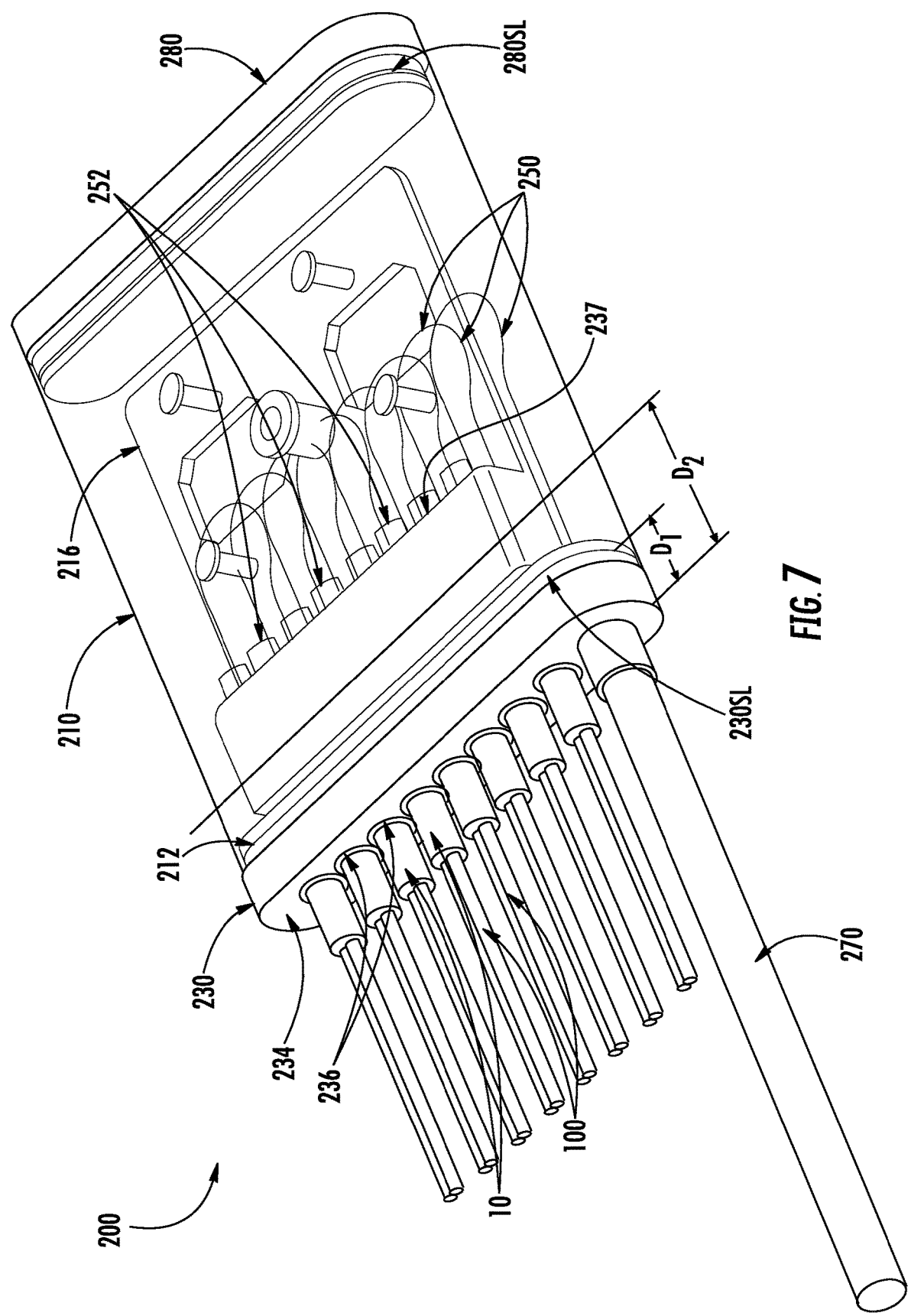
FIG. 7 is a front perspective view of another multiport similar to FIG. 6 having an input connection port having an input tether attached to the connection port insert and is visible through the shell for showing details.
Figure 8:
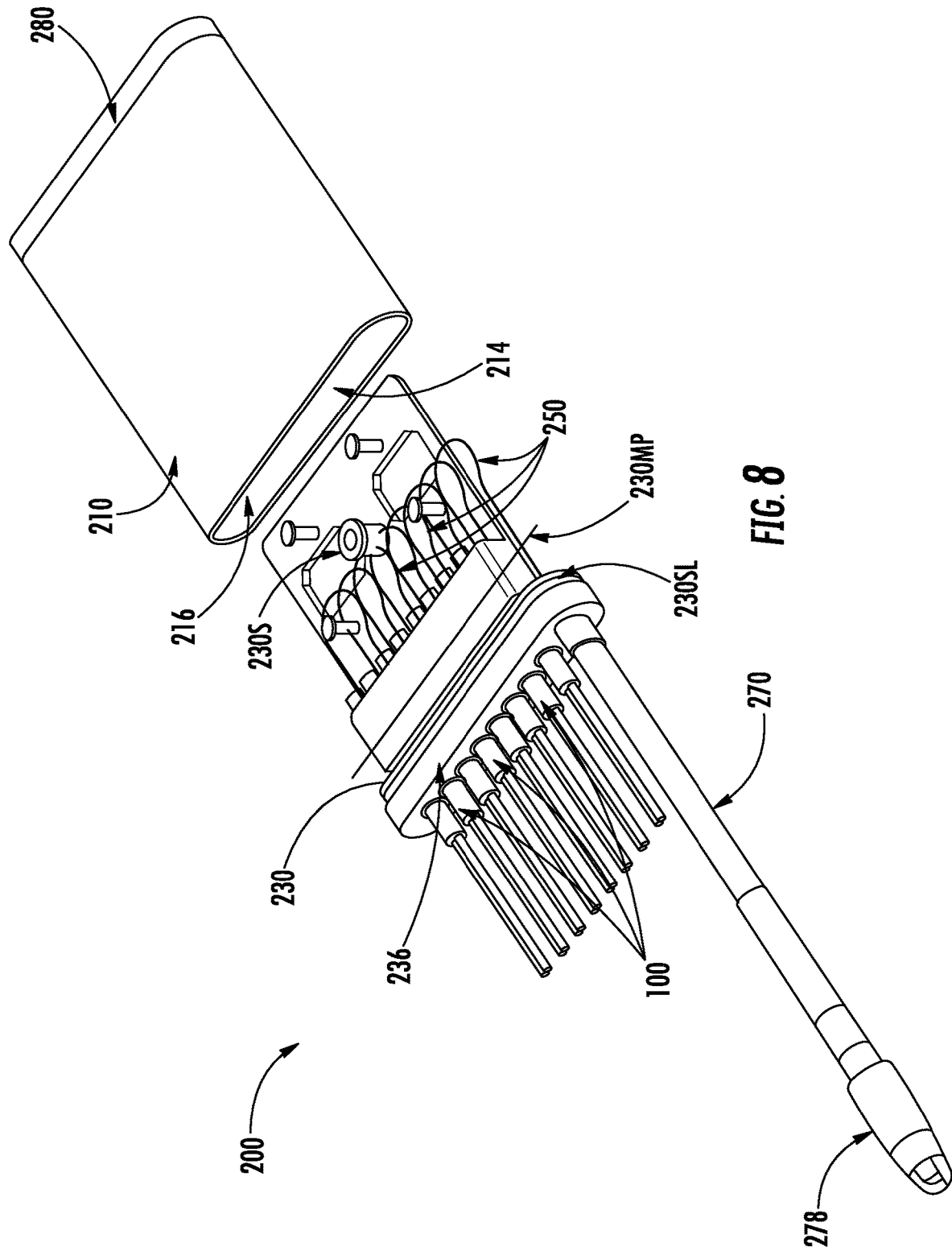
FIG. 8 is a partially exploded view of a multiport similar to the multiport of FIG. 7 showing the input connection port removed from the shell and having the input tether terminated with a fiber optic connector.
Figure 9:
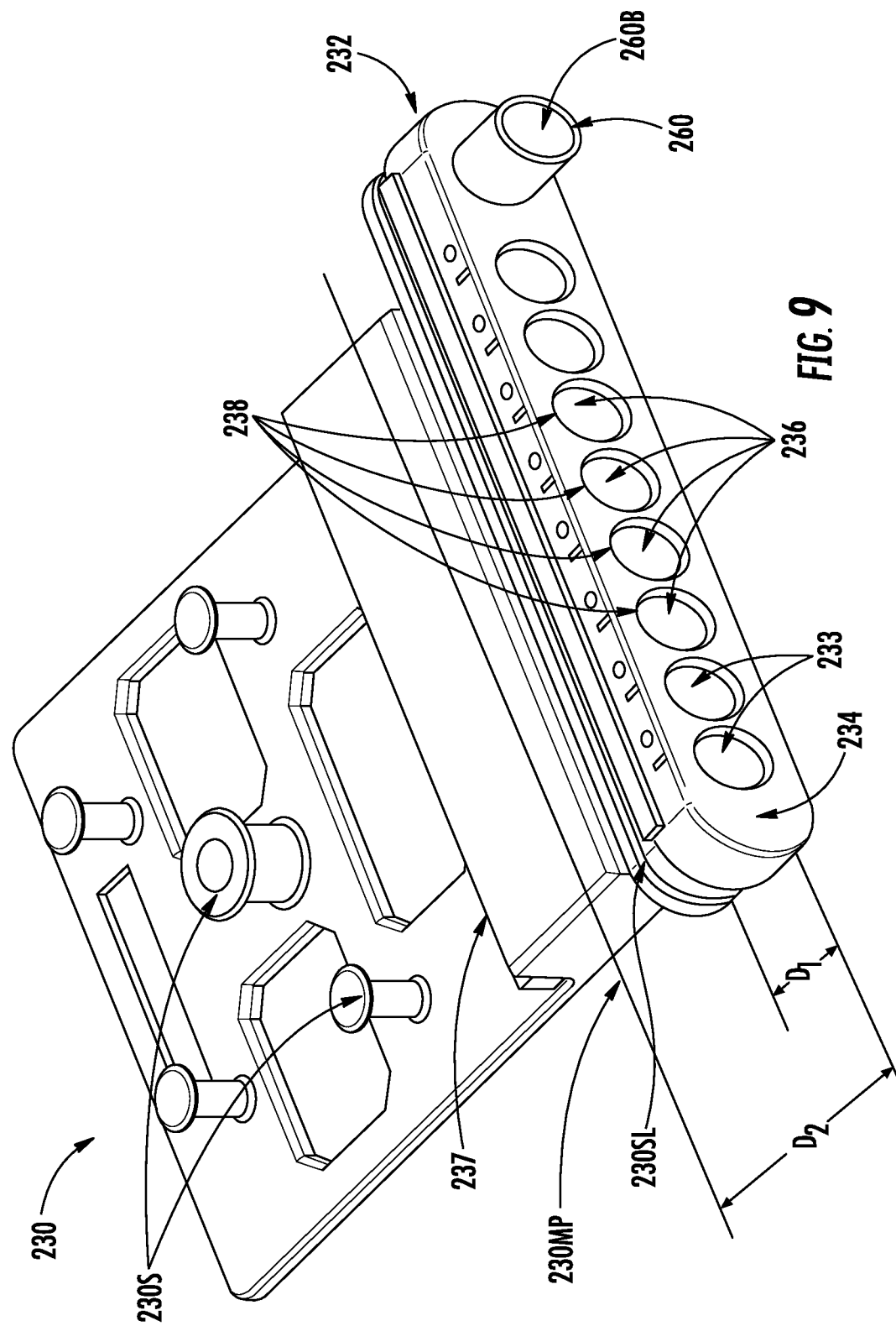
FIG. 9 is a perspective view the input connection port of FIGS. 7 and 8.
Figure 10:
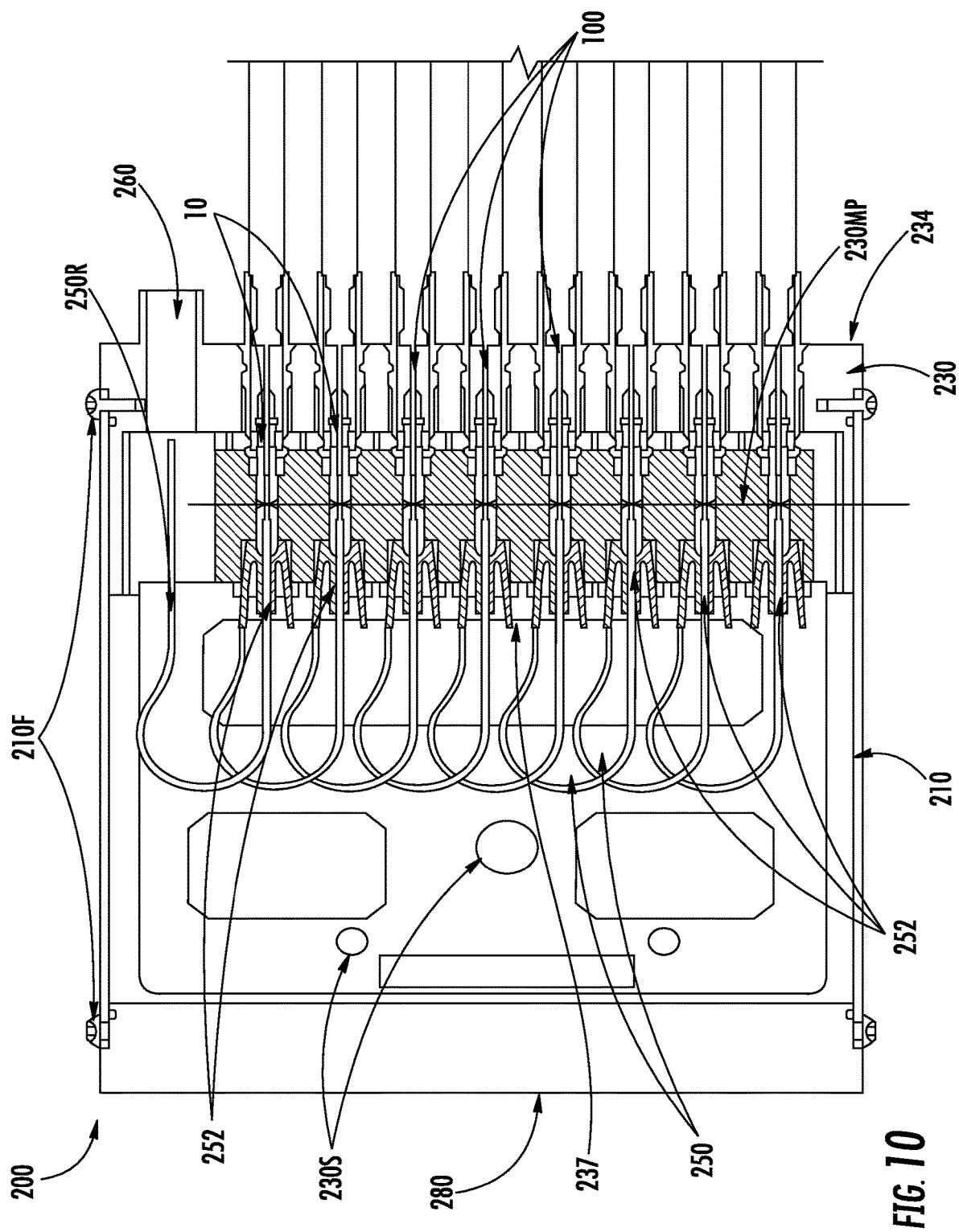
FIG. 10 is a sectional view of a multiport similar to FIGS. 7 and 8 showing the optical connections between respective rear connectors secured to the connection port insert of the multiport and the external fiber optic connectors of the fiber optic cable assemblies attached at the front face of the multiport with the input tether removed.

FIGS. 6-9 depict similar multiports and will be discussed together and FIG. 10 depicts a suitable connection port insert 230 for these multiports. FIG. 6 is a front perspective view of multiport 200 having an input connection port 200 configured for receiving furcation body 260F of an input tether 270 as discussed, and FIG. 7 is a front perspective view of another multiport similar to FIG. 6 having an input tether 270 attached to the connection port 260 and configured as a stub cable. FIG. 8 is a partially exploded view of a multiport similar to the multiport of FIG. 7 showing the connection port insert 230 removed from shell 210 and the input tether 270 terminated with fiber optic connector 278. FIG. 9 depicts a perspective view of the input connection insert of FIGS. 7 and 8, which is similar to the connection port insert 230 of FIG. 6.

As depicted in FIGS. 6-10, input connection insert 230 comprises a fiber tray (not numbered) integrated with the body 232. Fiber tray may include one or more supports 230S for providing strength for shell 210 to withstand any crushing forces. Including supports for multiports 200 greatly improves the strength between the opposing walls, and the supports may be included on other components such as the shell 210 or the integrated in a separate fiber tray such as depicted in the multiport 200 of FIG. 41. Supports 230S may also act as fiber routing guides 230G to inhibit tight bending or tangling of the optical fibers and aid with slack storage of optical fibers 250. Other embodiments can have other designs besides the body 232 of the connection port insert 230 comprising one or more fiber routing guides 230G or supports 230S. For instance, the fiber tray with supports or guides could be a dedicated component of multiports 200 (see FIG. 41).

As shown in FIGS. 7 and 9, connection port inserts 230 may also comprise a sealing location 230SL to provide a surface and location for making a weatherproof attachment to shell 210. Sealing location may be disposed at a first distance D1 from the front face 234 of the connector port insert 230. Sealing location is a disposed at a suitable distance D1 for providing a suitable seal with the shell 210. Connection port inserts 230 also have a connector mating plane 230MP disposed at a second distance D2 from the front face 234. The connector mating plane 230MP is disposed within the cavity of the shell 210 of the multiport for protecting the connector mating interface. In some particular embodiments, the connection port insert 230 comprises a sealing location 230SL disposed at a first distance D1 from the front face 234 and the connector mating position 230MP is disposed at the second distance D2 from the front face 234 with the second distance D2 being greater than the first distance D1.

The connection port passageways 233 may be configured for the specific connector 10 intended to be received externally into the multiport 200. Moreover, the connection port passageways 233 may be configured to provide a weatherproof seal with connector 10 or dust cap 295 for inhibiting dust, dirt, debris or moisture from entering the multiport 200 at a connection port passageway sealing surface 233SS (see FIG. 11). Likewise, the connection port passageways 233 should be configured to receive the specific rear connector 252 from the rear portion 237 for mating and making an optical connection with the connector 10. The connection port insert 230 shown in FIG. 9 is configured as a monolithic (e.g., integral) component for making the optical connection between the rear connectors 252 and the external connectors 10 of cable assembly 100; however, other embodiments are possible according to the concepts disclosed that use multiple components. For instance, the connection port insert 230 may be configured to secure one or more adapters 230A thereto, and the adapters 230A can "float" relative to the connection port insert 230. "Float" means that the adapter 230A can have slight movement in the X-Y plane for alignment, but is essentially inhibited from moving in the Z-direction along the axis of connector insertion so that suitable alignment may be made between mating connectors.

FIGS. 10 and 11 depict sectional views showing the optical connections between respective rear connectors 252 attached at the rear portion 237 of the connection port insert 230 of the multiport 200 and connectors 10 of cable assemblies 100 attached from the front face 234, and are similar to the optical connections shown in multiports 200 of FIGS. 6-9. FIG. 12 is an isolated perspective view of the optical connection between rear connector 252 and connector 10 as represented in FIG. 11.

Rear connector 252 shown in FIGS. 10-12 comprises a ferrule 252F attached to optical fiber 250 and a retention body 252R attached to ferrule 252F, thereby forming a simple connector. Retention body 252R comprises a plurality of arms 252A with a protrusion 252P for securing the rear connector 252 with the retention feature 233A in the connection port passageway 233. As shown, the connector mating plane 230MP is disposed within the disposed within the cavity of the shell 210 of the multiport for protecting the connector mating interface. As shown in FIG. 12, connector 10 comprises at least one O-ring 65 for sealing with the connection port passageway 233 when fully inserted into the connection port 236. Moreover, some connectors 10 may have a locking feature 20L on the housing 20 for cooperating with a securing feature 310 of multiports 200 if desired and discussed in more detail below.

Rear connectors 252 can have other configurations for use with the multiports disclosed herein. By way of example, rear connectors 252 may comprise a resilient member for biasing the rear connector ferrule 252F. Additionally, rear connectors 252 may further comprise a keying feature. Likewise, connection port insert 230 can have other configurations for use with the multiports disclosed herein. By way of example, the connection port insert may comprise a plurality of adapters 230A that are integrally-formed with the connection port insert 230.

Figure 13:
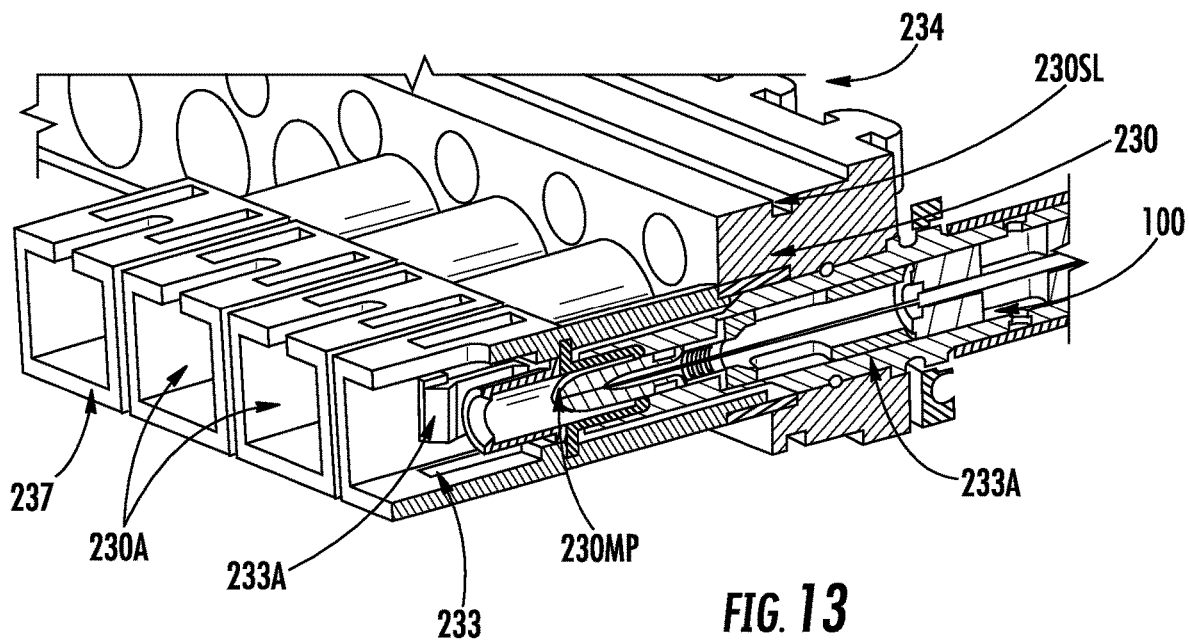
FIGS. 13-15 respectively are a rear perspective sectional view, a top view and a rear perspective view of the optical connections and features of another connection port insert where one or more adapters are integrally formed with the connection port insert.
Figure 14:
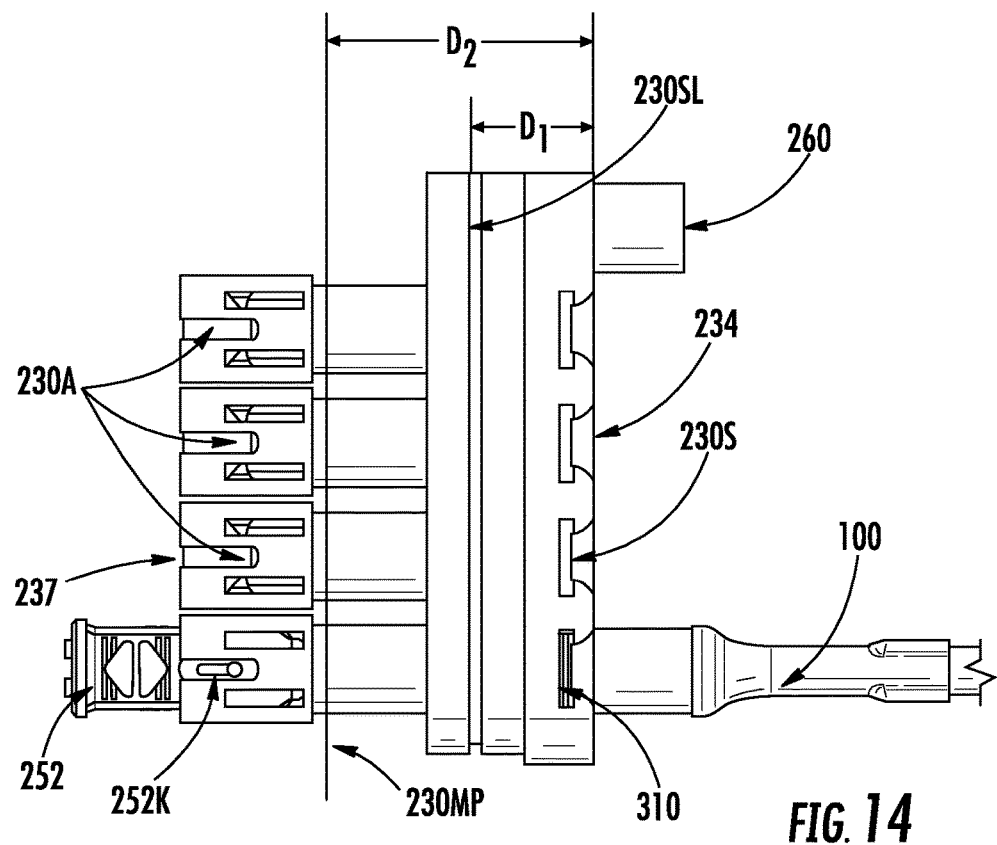
Figure 15:
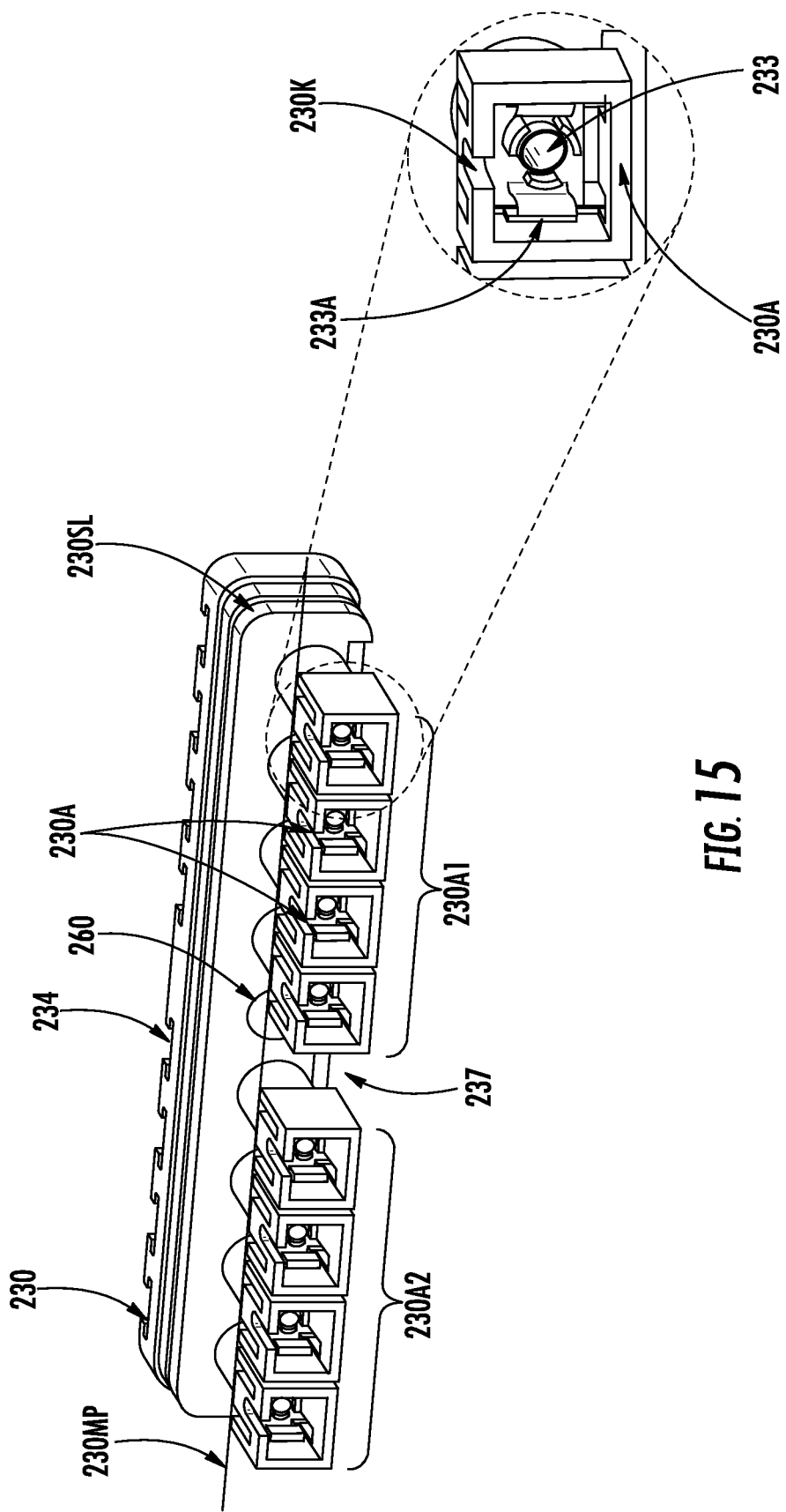

FIGS. 13-15 respectively are a rear perspective sectional view, a top view and a rear perspective view of the optical connections and features of another connection port insert 230. Connection port insert 230 shown in FIGS. 13-15 comprise one or more adapters 230A that are integrally formed with the connection port insert 230. In this particular example, the plurality of adapters 230A that are integrally formed with connection port insert 230 are configured for receiving SC connectors. Thus, rear connector 252 shown in FIG. 14 has a SC footprint. The SC connectors used as the rear connector 252 has a keying feature 252K that cooperates with the keying feature of adapter 230A. Additionally, adapters 230A comprise a retention feature 233A disposed in the connection port passageway 233 and are configured as latch arms for securing a SC connector at the rear portion 237 of connection port insert 230. As best shown in FIG. 15, connection port insert 230 depict comprises a plurality of slots 230S for receiving one or more securing features 310 that translate for engaging with a suitable locking portion 20L of connector 10 or the like.

Connection port insert 230 may have the input connection port 260 disposed in any suitable location on the connection port insert 230. The previous embodiments of the connection port insert 230 depicted the input connection port 260 disposed in an outboard position of the connection port insert 230. However, the input connection port 260 may be disposed in a medial portion of the connection port insert 230 as desired. As best shown in FIG. 15, connection port insert 230 has input connection port 260 disposed in a medial portion of the connector port insert 230. Further, the integrated adapters 230A are arranged in groups on either side of the input connection port 260 as depicted. Specifically, connection port insert 230 of FIGS. 13-15 has a first group of integrated adapters 230A1 and a second group of integrated adapters 230A2 disposed on opposite sides of input connection port 260. Consequently, the connection port insert 230 of FIGS. 13-15 comprises a plurality of connection port sections 232A, 232B.

FIGS. 16 and 16A are rear perspective sectional views of a representative force diagram for the force interactions between the mating optical connections. In particular, the force diagrams are directed to mating optical connections where both sides of the mated optical connection may be displaced. Simply stated, the forces should between the both sides of these types of mated optical connections may be displayed there may be concerns with one side of the mated connection to over-travel beyond its desired location, which may lead to optical performance issues especially if the connection experiences several mattings and uses a floating ferrule sleeve for alignment. This over-travel condition typically is not of concern for mated connections where only side of the connection may be displayed and the other side is fixed. An example of both sides of the mated optical connection being able to be displaced is represented when both connectors have ferrules that are biased and mated within a ferrule sleeve such as when a SC connector is mated with a connector 10 as depicted in FIG. 16A. Other embodiments could have an adapter sleeve that is biased instead of the rear connector ferrule being biased, which would result in a similar concern for being aware of forces that may result in over-travel conditions that could impact optical performance.

Multiports 200 that mate a rear connector 252 such as a SC with connector 10 that has a SC ferrule that is biased forward should have a spring force in connector 10 that mitigates concerns when mated within a ferrule sleeve or use a connector 10 that has a fixed ferrule for mitigating concerns. The spring force for connector 10 should be selected to be in a range to overcome sleeve friction and the spring force of the rear connector 10. By way of explanation, when the rear connector 252 is first inserted into the adapter 230A of connection port insert 230, the ferrule 252F of the rear connector 252 contact the ferrule sleeve 230FS and may displace the ferrule sleeve 230FS to extreme position on the right before the ferrule sleeve 230FS hits a physical stop in the adapter and the ferrule 252F is inserted into the ferrule sleeve 230FS. Thus, when the connector 10 is later inserted into the connector port 236 of the multiport it would be helpful for the ferrule to push the ferrule sleeve 230FS from an extreme position in the adapter if it was displaced. Consequently, the spring selected for biasing the ferrule of connector 10 should overcome the sum of initial friction along with the insertion friction to move the ferrule sleeve 230FS, thereby inhibiting the ferrule sleeve 230FS from being displaced at a maximum displaced position due to the rear connector 252 being inserted for mating first. FIGS. 17A-18C are perspective views of shells 210 for multiports 200 having various configurations. As depicted, shells 210 are monolithically formed and comprise at least a first end 212 having a first opening 214 leading to a cavity 216. Other variations of shells 210 may comprise a second end 213 having a second opening 215 such as depicted herein. Second opening 215 is configured for receiving a second insert 230' so that at least a portion of the second insert 230' fits into the second opening 215 and cavity 216 of shell 210. Second insert 230' may comprise a body 232 having a front face 234 and comprise a plurality of connection ports 236 having an optical connector opening 238 like the connection port insert 230. Shells 210 may be made from any suitable material such as metal or plastic and may have any suitable shape as desired. As discussed with other embodiments, multiports may include mounting features 210M integrated into the shell 210. Additionally, shells 210 may comprise at least one support 210S disposed within cavity 216, thereby providing crush support for the multiport and resulting in a robust structure.

Figure 19A:
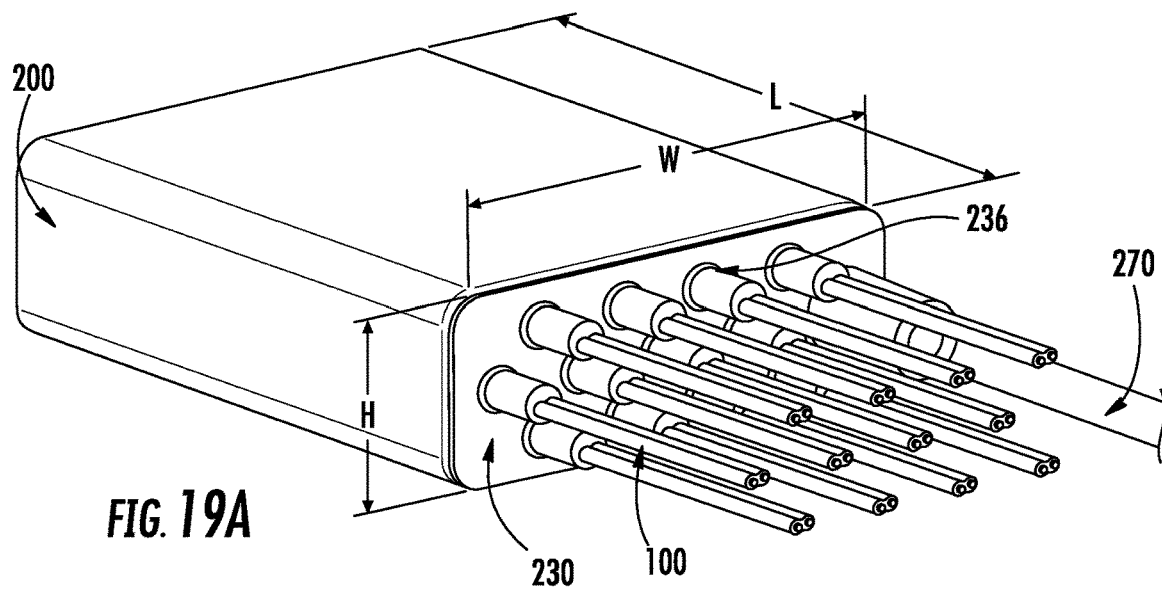
FIGS. 19A-19C are perspective views of various other multiports configurations having other form-factors such as multi-row arrays in similar sized packages.
Figure 19B:
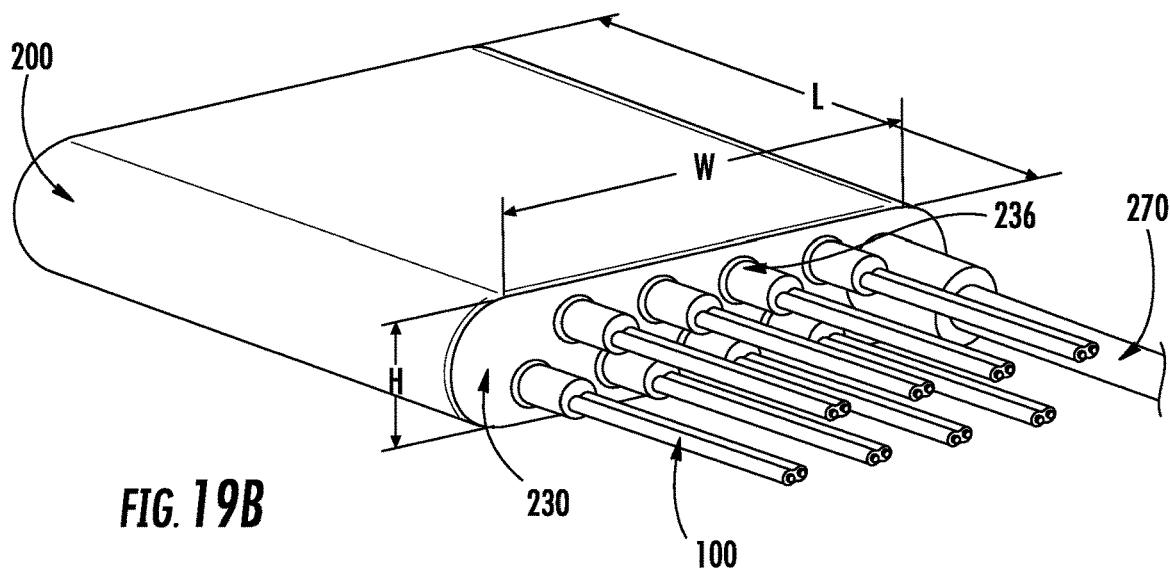
Figure 19C:
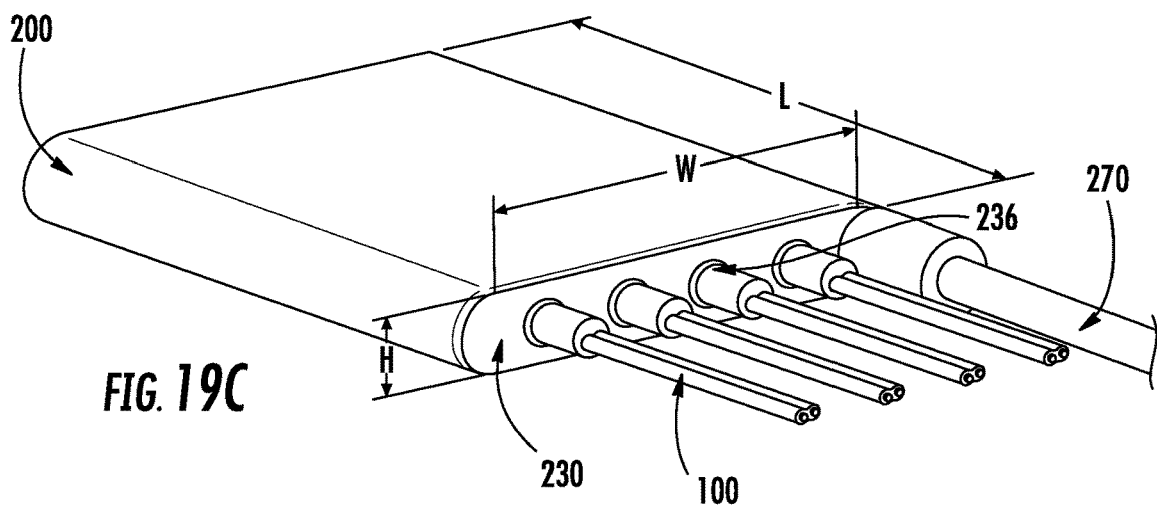

Shells 210 and connector port inserts 230 allow relative small multiports 200 having a relatively high-density of connections along with an organized arrangement for connectors 10 exiting the multiports 200. Shells have a given height H, width W and length L that define a volume for the multiport as depicted in FIG. 19C. By way of example, shells 210 may defines a volume of 800 cubic centimeters or less, other embodiments of shells 210 may define the volume of 400 cubic centimeters or less, other embodiments of shells 210 may define the volume of 100 cubic centimeters or less as desired. Some embodiments of multiports 200 comprise a connection port insert 230 having a density of at least one connection port 236 per 20 millimeters of width W of the connection port insert. Likewise, embodiments of multiports 200 may comprise a given density per volume of the shell 210 as desired.

Furthermore, multiports 200 may have any suitable arrangement of connection ports 236 in connector port insert 230. By way of explanation, FIGS. 19A-19C are perspective views of various other multiports 200 having other form-factors such as multi-row arrays in similar sized packages. In other words, the multiports 200 of FIGS. 19A-19C have similar lengths L and widths W, but by slightly changing the height H of the multiports 200 the density of connectors per width of the multiport may be significantly increased. For instance, multiport 200 of FIG. 19A has four connector ports for its volume with a given height H, with a small increase in height H multiport 200 of FIG. 19B has eight connector ports for its volume, and with another small increase in height H multiport 200 of FIG. 19C has twelve connector ports for its volume. Part of the increase in connection port density per volume is attributable to the staggered position of the connection ports 236 in the rows. Although, the multiports shells depicted have generally planar major surfaces other suitable shapes are possible such as a curved shell or other shapes as desired. The skilled person will immediately recognize the advantages of the multiports of the present disclosure over the conventional multiports.

Table 1 below compares representative dimensions, volumes, and normalized volume ratios with respect to the prior art of the shells (i.e., the housings) for multiports having 4, 8 and 12 ports as examples of how compact the multiports of the present application are with respect to convention prior art multiports. Specifically, Table 1 compares examples of the conventional prior art multiports such as depicted in FIG. 1 with multiports having a linear array of ports and a staggered array of ports such as shown in FIGS. 19A-19C. As depicted, the respective volumes of the conventional prior art multiports of FIG. 1 with the same port count are on the order of ten times larger than multiports with the same port count as disclosed herein. By way of example and not limitation, the shell of the multiport may define a volume of 400 cubic centimeters or less for 12-ports, or even if double the size could define a volume of 800 cubic centimeters or less for 12-ports. Shells for smaller port counts such as 4-ports could be even smaller such as the shell defining a volume of 100 cubic centimeters or less for 4-ports, or even if double the size could define a volume of 200 cubic centimeters or less for 4-ports. Consequently, it is apparent the size (e.g., volume) of multiports of the present application are much smaller than the conventional prior art multiports of FIG. 1. In addition to being significantly smaller, the multiports of the present application do not have the issues of the conventional prior art multiports depicted in FIG. 2. Of course, the examples of Table 1 are for comparison purposes and other sizes and variations of multiports may use the concepts disclosed herein as desired.

One of the reasons that the size of the multiports may be reduced in size with the concepts disclosed herein is that the connectors 10 that cooperate with the multiports may have locking features 20L that are integrated into the housing 20 of the connectors. In other words, the locking features for securing connector 10 are integrally formed in the housing 20 of the connector, instead of being a distinct and separate component like the conventional connector. Conventional connectors for multiports have threaded connections that require finger access for connection and disconnecting. By eliminating the threaded coupling nut (which is a separate component that must rotate about the connector) the spacing between conventional connectors may be reduced. Also eliminating the dedicated coupling nut from the conventional connectors also allows the footprint of the connectors to be smaller, which also aids in reducing the size of the multiports disclosed herein.

TABLE 1

Comparison of Conventional Multiport of FIG. 1 with Multiports of Present Application

| Multiport Type | Port Count | Dimension L × W × H (mm) | Volume (cm³) | Normalized Volume Ratio |
|---|---|---|---|---|
| Prior Art FIG. 1 | 4 | 274 × 66 × 73 | 1320 | 1.0 |
|  | 8 | 312 × 76 × 86 | 2039 | 1.0 |
|  | 12 | 381 × 101 × 147 | 5657 | 1.0 |
| Linear | 4 | 76 × 59 × 15 | 67 | 0.05 |
|  | 8 | 123 × 109 × 15 | 201 | 0.10 |
|  | 12 | 159 × 159 × 15 | 379 | 0.07 |
| Staggered | 4 | 76 × 59 × 15 | 67 | 0.05 |
|  | 8 | 76 × 59 × 25 | 112 | 0.06 |
|  | 12 | 76 × 59 × 35 | 157 | 0.03 |

FIG. 20 is a top view of multiport 200 having cable assemblies 100 removably secured using retention features 233A. Multiport is similar to other multiports discussed herein, but further comprise retention features 233A that fit into a bore 230B of connector port insert 230. Bore 230B intersects a portion of the connector opening 238 so that retention features 233A intersects a portion of the connector opening 238 and provides a snap-fit with a groove, scallop or the like formed in a housing 20 of connector 10. Stated another way, when connector 10 is pushed into connector opening 238 of connection port 236 the connector 10 engages and slightly deflects the respective retention feature 233A until the retention feature 233A is seated in the groove or scallop of connector 10, thereby provide a retention for the connector 10 in the connector port. By way of example, one embodiment could have the retention feature 233A configured as a fixed plastic pin sized to snuggly fit or be attached within bore 230B so a slight force is required to seat connector 10.

Figure 20A:
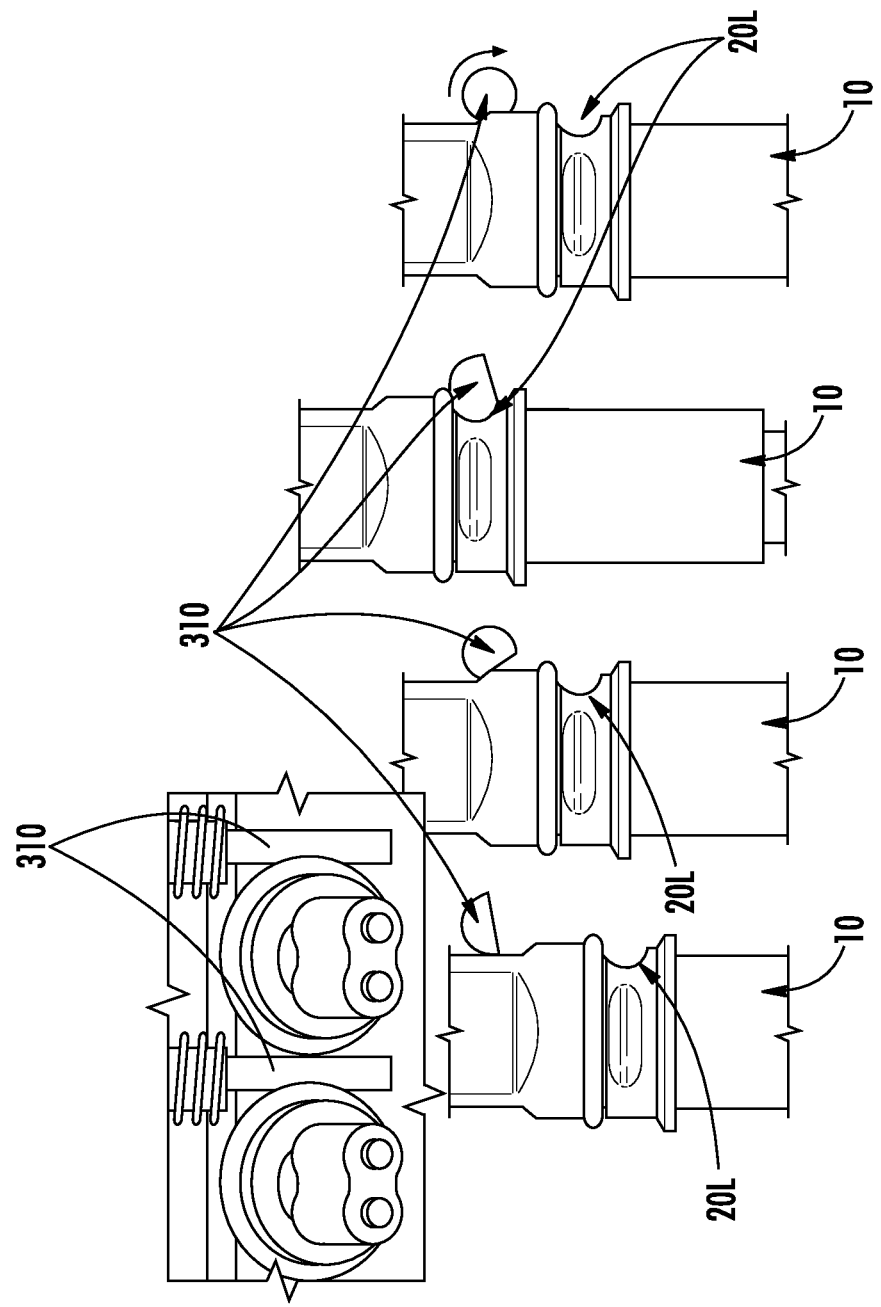
FIG. 20A depicts a portion of a multiport having a pin having a flat surface that acts as a securing feature for the connector.

However, by changing the material and operation, the retention feature 233A may become a securing feature 310. By way of explanation, the pin could be configured so that it translates into and out of the paper within bore 230B and made of a more rigid material such as metal. Consequently, the metal pin could secure a dust cap 295 by cooperating with a scallop or groove in the dust cap 295 so when the pin is in a closed position the dust cap 295 could not be removed and protects the connection port 236. When the user desired to insert a connector into the connection port 236, he would move the pin to an open position by translating the pin out of paper so the pin did not interfere with the removal of the dust cap 295. Then the user could insert the connector 10 into the connection port 236 and translate the pin back into the paper so that the pin engaged a complementary scallop or groove on connector 10 and removal of the connector is inhibited. Thus, the retention 233A becomes securing feature 310 for securing the connector 10 within the connection port 236. Alternatively, the pin could have a flat portion and when the pin is rotated to the flat portion facing the scallop or groove then insertion and removal of the connector past the pin is allowed and when the pin rotates to a round portion the scallop or groove is engaged by the pin and the connector 10 is inhibited from being removed or inserted, thereby acting as a securing feature 310. Other variations could have the pin with a flat surface that rotates as the connector 10 is inserted or removes by having the rotation of the pin being driven by the surface of the connector 10. Illustratively, FIG. 20A depicts such an arrangement for the pin acting as a securing feature 310 for connector 10.

Figure 21:
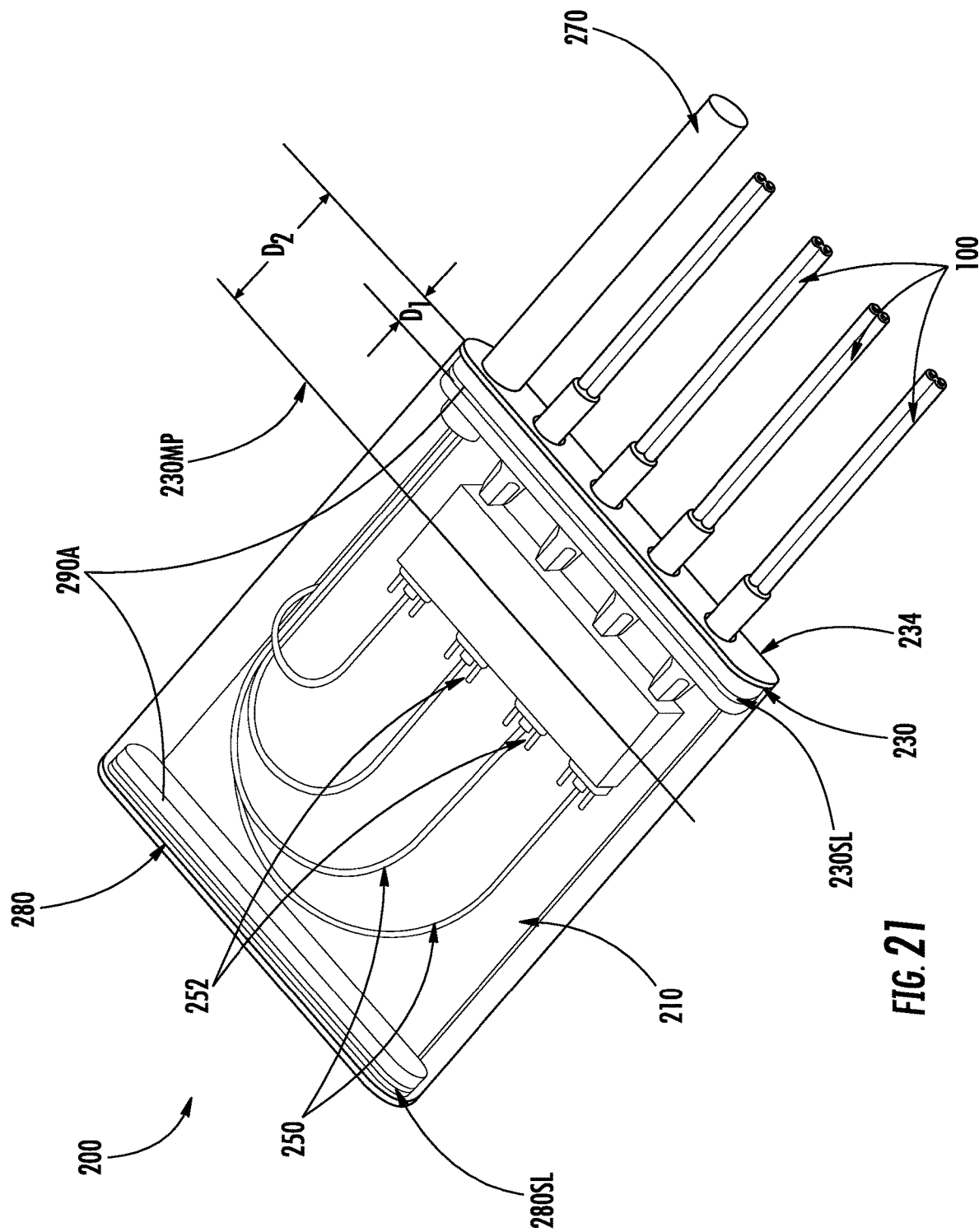
FIG. 21 is a perspective view of a multiport having an end cap with O-rings for sealing.

FIG. 21 is a perspective view of multiport 200 similar to the other multiport disclose having connector port insert 230 sealing location 230SL and an end cap 280 with sealing location 280SL. The multiport of FIG. 21 has a sealing element 290 disposed between the connection port insert 230 and the shell 210. Any of the other multiports 200 may also use similar features as described. In this embodiment, the sealing locations 230SL, 280SL comprise respective grooves in the connector port insert 230 and end cap 280. Grooves (not numbered) of the sealing locations 230SL, 280SL extend about the perimeter of the connection port insert 230 and the end cap 280 and are located at respective distances D1 from the front face 234 of the connection port insert 230 and end cap 280. Grooves may receive one or more appropriately sized O-rings or gaskets 290A for weatherproofing multiport 200. In other words, the O-rings or gaskets 290A are disposed about a part of the connector port insert 230 and the end cap 280. As depicted, distance D1 is less than distance D2 to the connector mating plane 230MP. The O-rings are suitable sized for creating a seal between the connector port insert 230 and the shell 210 and for the end cap 280. By way of example, suitable O-rings are a compression O-ring that may maintain a weatherproof seal.

Any of the multiports 200 disclosed herein may optionally be weatherproof by appropriately sealing the connection port insert or second insert 230, 230' with the shell 210 using other suitable means such as adhesive, sealant, welding, overmolding or the like. For instance, adhesive or sealant may be applied about the perimeter of the insert. Likewise, welding such as ultrasonic or induction welding may be used as appropriate for the sealing element 290. Moreover, the interface between the connection ports 236 and the dust cap 295 or connector 10 may be sealed using appropriate geometry and/or a sealing element such as an O-ring or gasket. Likewise, the input connection port may be weatherproofed in a suitable manner depending on the configuration such as a gasket, or O-ring with an optical connection or a heat shrink when using a input tether. Thus, making the multiports 200 suitable for an outdoor environment.

Multiports 200 can have other features or constructions using a second insert 230' that is similar to the connection port insert 230. For instance, the second insert 230' comprises a body 232 having a front face 234 comprising a plurality of connection ports 236 having an optical connector port opening 238 like the connection port insert 230. Second inserts 230' can have other configurations as well for use with the multiports disclosed herein. Moreover, any of the multiport designs disclosed herein may use an optical splitter 275 (hereinafter "splitter") within a cavity 216 or furcation body 270F of the multiports 200. By way of example, splitters 275 allow a single optical signal to be split into multiple signals such as 1×N split, but other splitter arrangements are possible such as a 2×N split. For instance a single optical fiber may feed an input tether 270 of multiport 200 and use a 1×8 splitter to allow eight connection ports 236 on the connection port insert.

Figure 22:
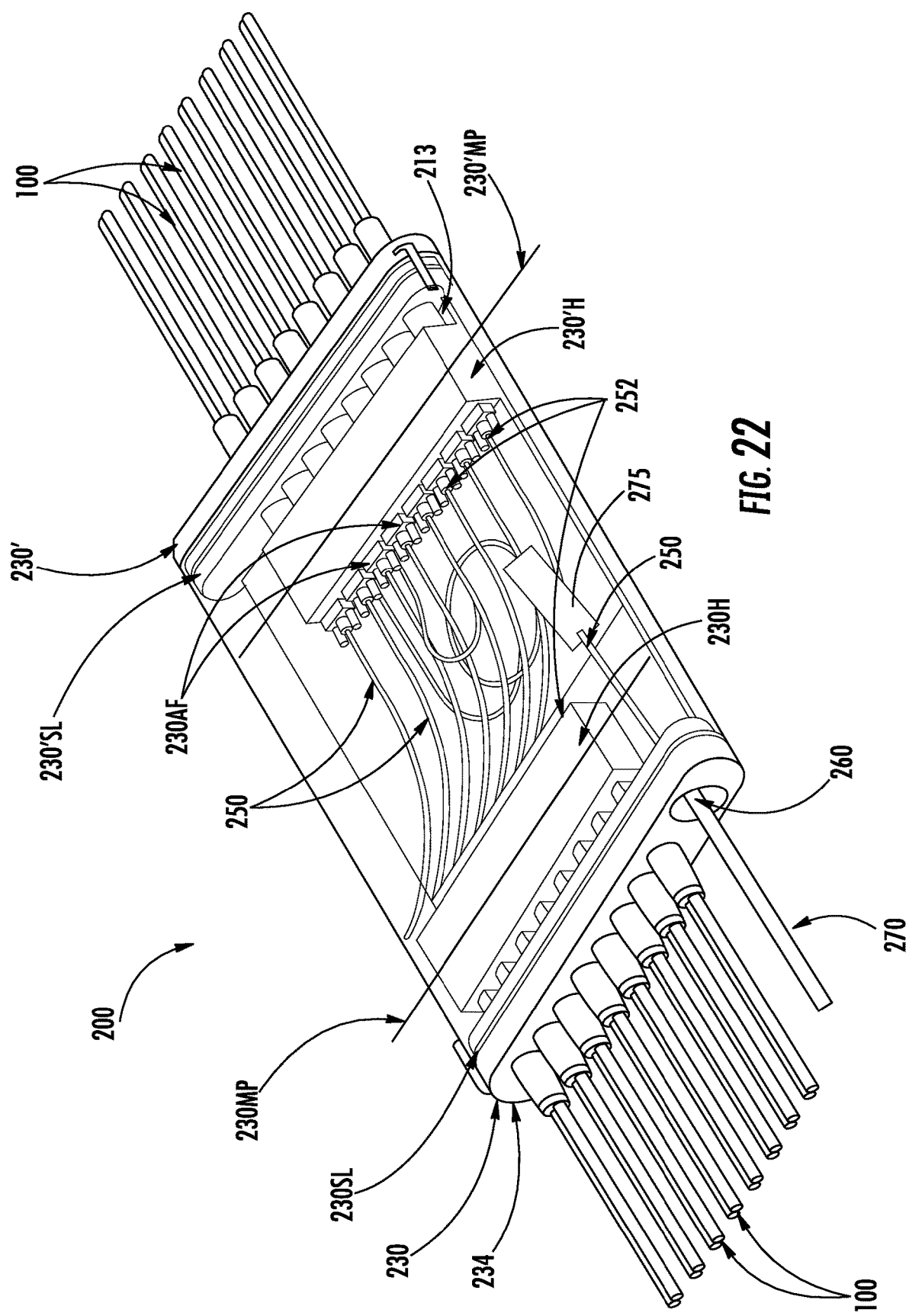
FIGS. 22-24 are various perspective views of multiports having one or more floating adapters received in the connection port insert.
Figure 23:
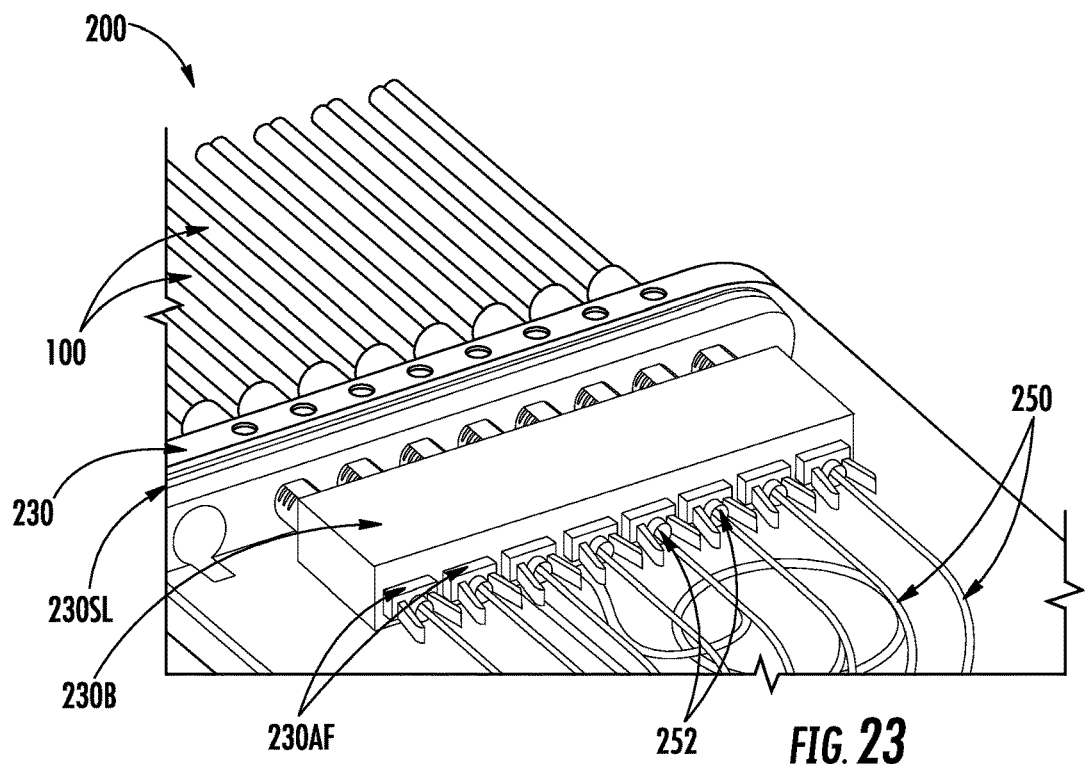
Figure 24:
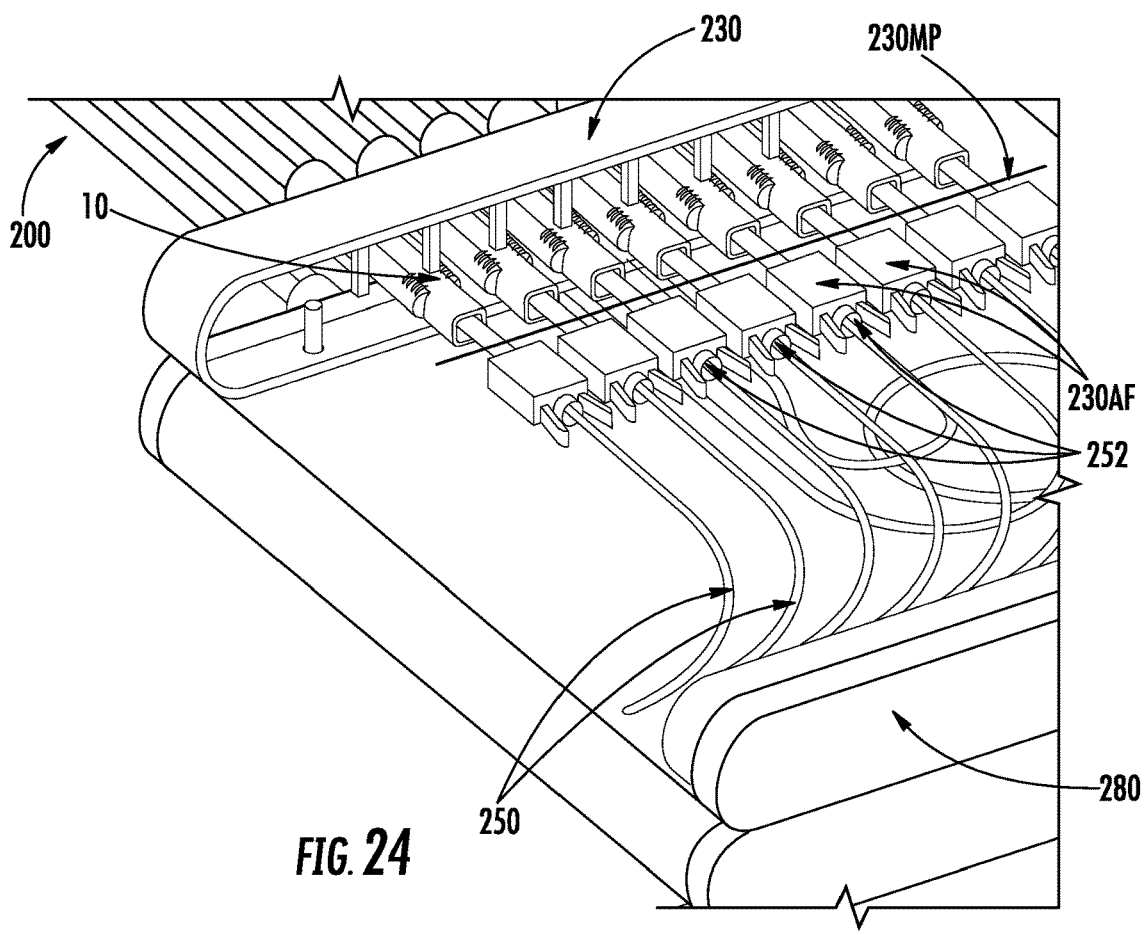

FIGS. 22-24 are perspective views of multiports 200 similar to the multiport of FIG. 6, but use one or more adapters 230AF received in the connection port insert 230 that float relative to the connection port insert 230. FIG. 22 depicts multiport 200 having splitter 275 and a second insert 230'. Connection port insert 230 and second insert 230' both are configured to securing one or more adapters thereto where the adapters 230AF float relative to the connection port insert and the second insert 230'. Second insert 230' is similar to connection port insert 230, but it does not have an input connector port 260 like the connection port insert, but second insert 230' comprises connection ports 236 for receiving connectors 10. Connection port insert 230 includes an integrated housing 230H for receiving individual adapters 230AF from the rear portion. Housing 230H has suitable structure for securing adapters 230AF so they float by using suitable geometry for securing the adapters 230AF. Specifically, housing 230H allows that adapters 230A to have slight movement in the X-Y plane for alignment, but essentially inhibits the adapters 230A from moving in the Z-direction along the axis of connector insertion so that suitable alignment may be made between mating connectors. Multiport of FIG. 22 also comprises a splitter 275 that receives an optical fiber 250 for a 1×16 split for feeding eight optical fibers to the connection port insert 230 and eight optical fibers to the second insert 230'.

FIGS. 23 and 24 are perspective views of multiports 200 similar to the multiport 200 of FIG. 22. FIG. 23 is a close-up of showing housing 230H and FIG. 24 shows the connector port insert with housing 230H for showing the individual adapters 230AF. Adapters 230AF receive rear connectors 252 that are similar to the rear connectors 252 depicted in FIGS. 10-12 for mating with connectors 10 received in respective connection ports 236 of connector port insert 230 as shown. Rear connectors 252 and connectors 10 make their optical connections at mating optical plane 230MP as discussed herein.

Figure 25A:
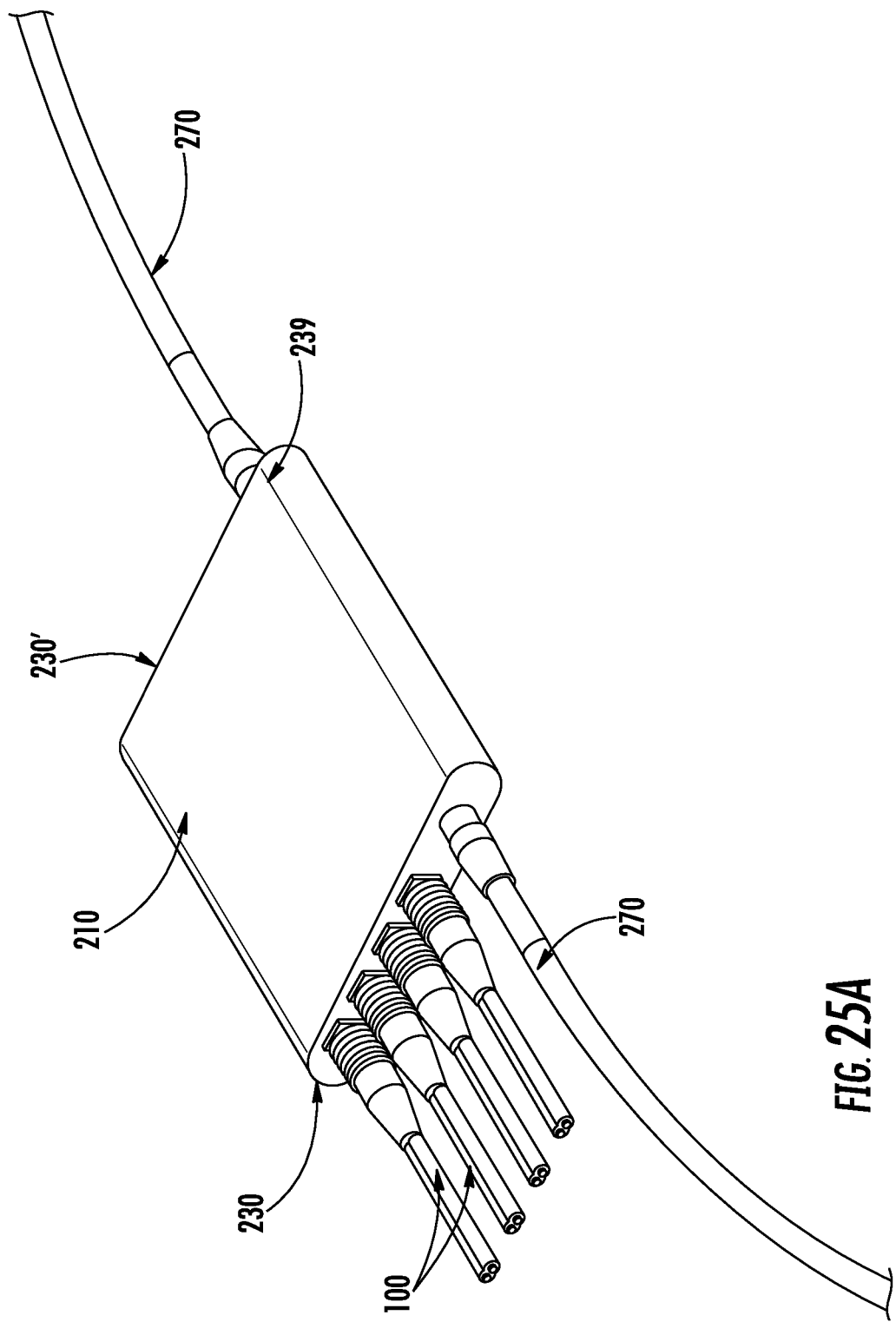

FIGS. 25A and 25B depict perspective views of multiports 200 similar to other multiports having a second insert such as disclosed herein, except that the second inserts 230' comprises at least one pass-through port 239. FIG. 25A shows the tethers 270 configured with boots for providing strain relief. Tethers 270 may either be configured as stub cables or may be terminated with fiber optic connectors 278 as desired. FIG. 26 depicts a perspective view of an alternative second insert 230' having a pass-through port with an integrated adapter 230A for receiving a fiber optic connector. Second insert 230' also includes a retaining structure 230RS for securing connector 10 to the second insert 230' such as depicted in FIG. 74D.

Figure 28:
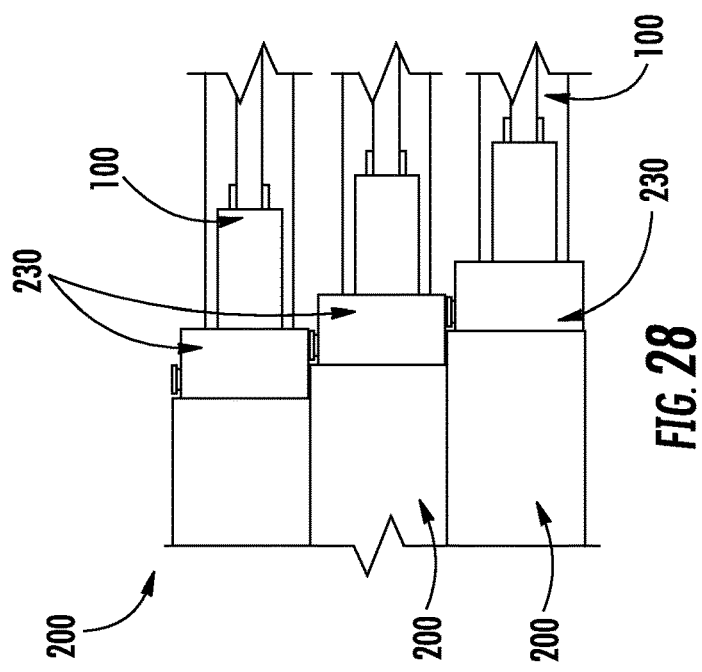
FIGS. 27-30 are various views of multiports having one or more attachment features.
Figure 27:
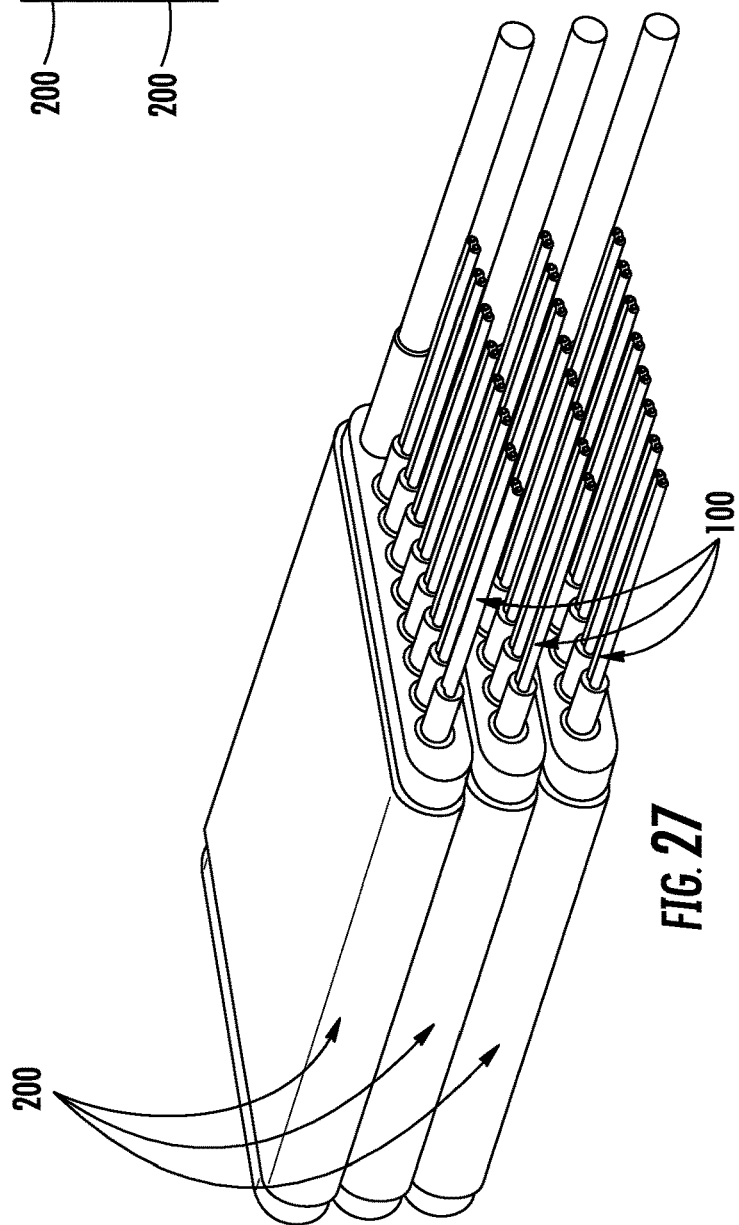
Figure 29:
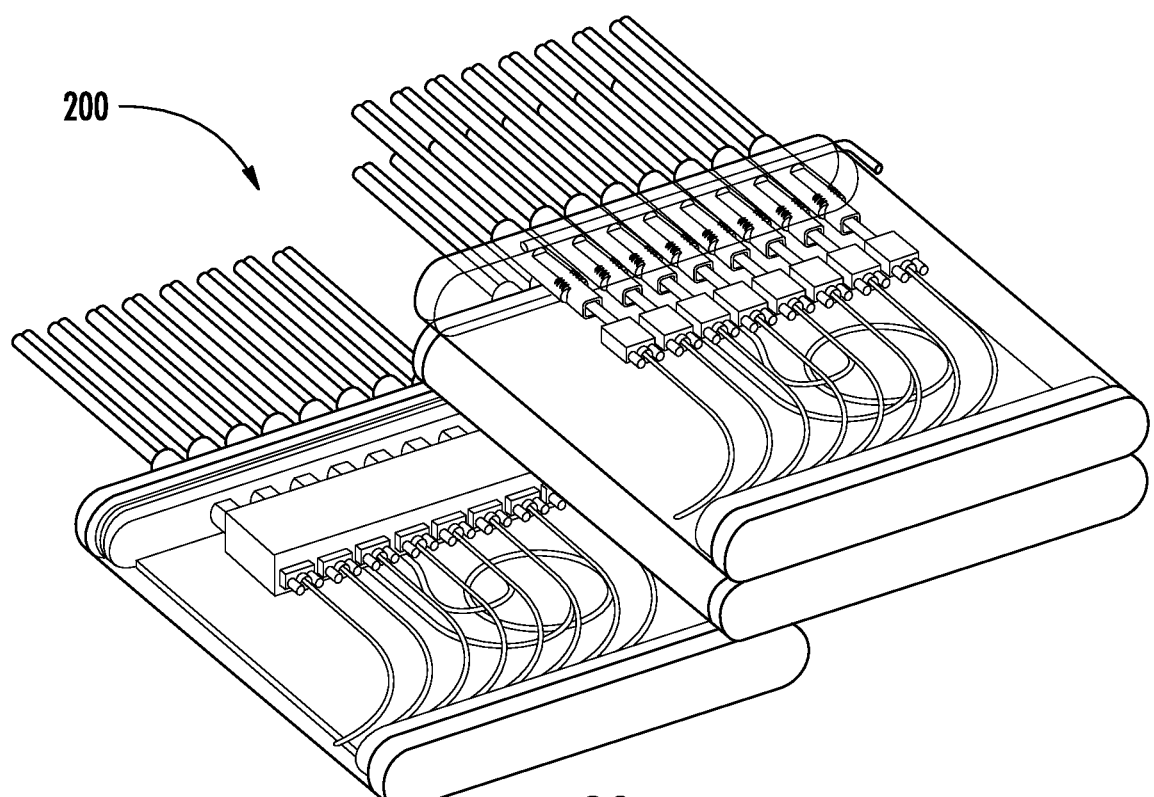
Figure 30:
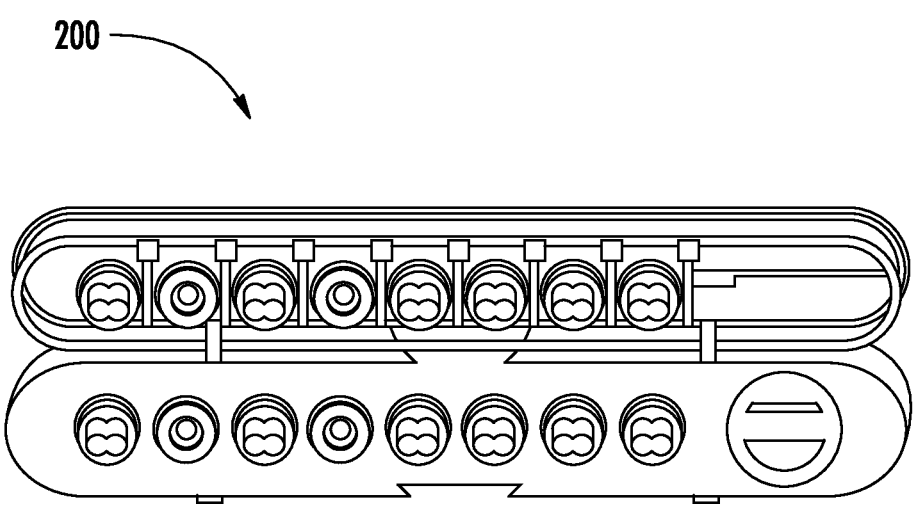
Figure 33:
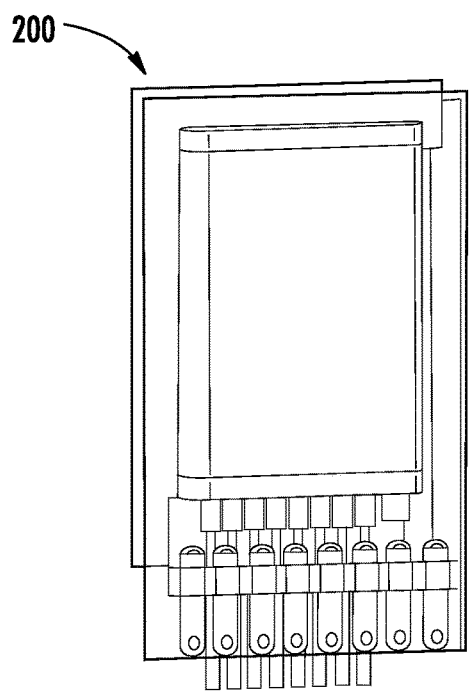
Figure 35:
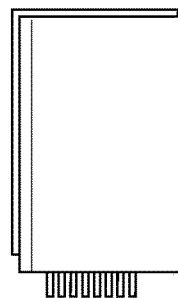
Figure 36:
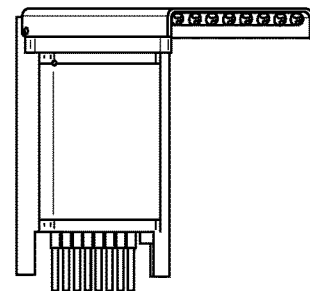
Figure 34:
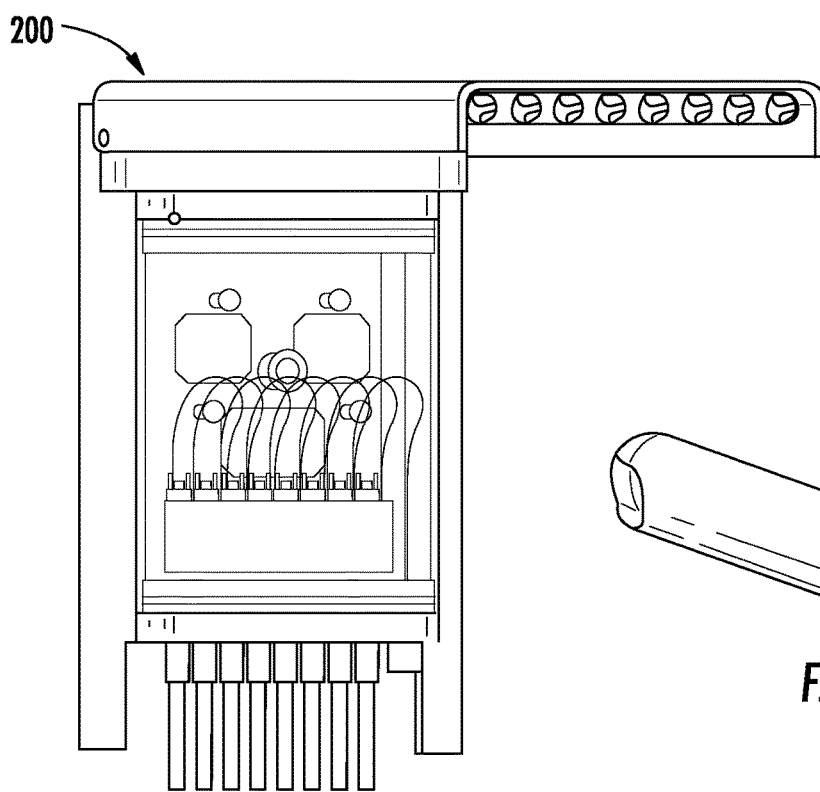
Figure 37:
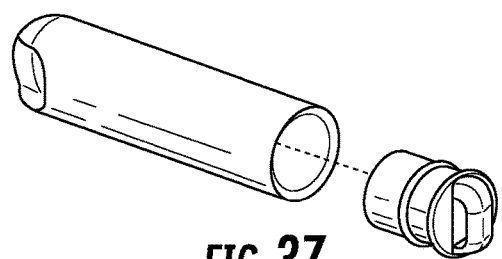

FIGS. 27-30 are various views of multiports having one or more attachment features 240. As depicted, the connector port insert 230 or second insert 230' further comprise one or more attachment features 240. By way of explanation, the attachment features 240 are dovetail openings 240A or a dovetail protrusion 240B disposed on the connection port insert 230 or second insert 230'. FIGS. 27 and 28 show the one or more attachment features 240 may comprise a top attachment feature 240A and a bottom attachment feature 240B where the top attachment feature 240A is offset from the bottom attachment feature 240B along a longitudinal direction of the connector port insert. FIG. 29 shows the one or more attachment features 240 are arranged along a longitudinal direction of the multiport 200 and FIG. 30 shows the one or more attachment features 240 are arranged transverse to a longitudinal direction of the multiport 200.

Figure 38:
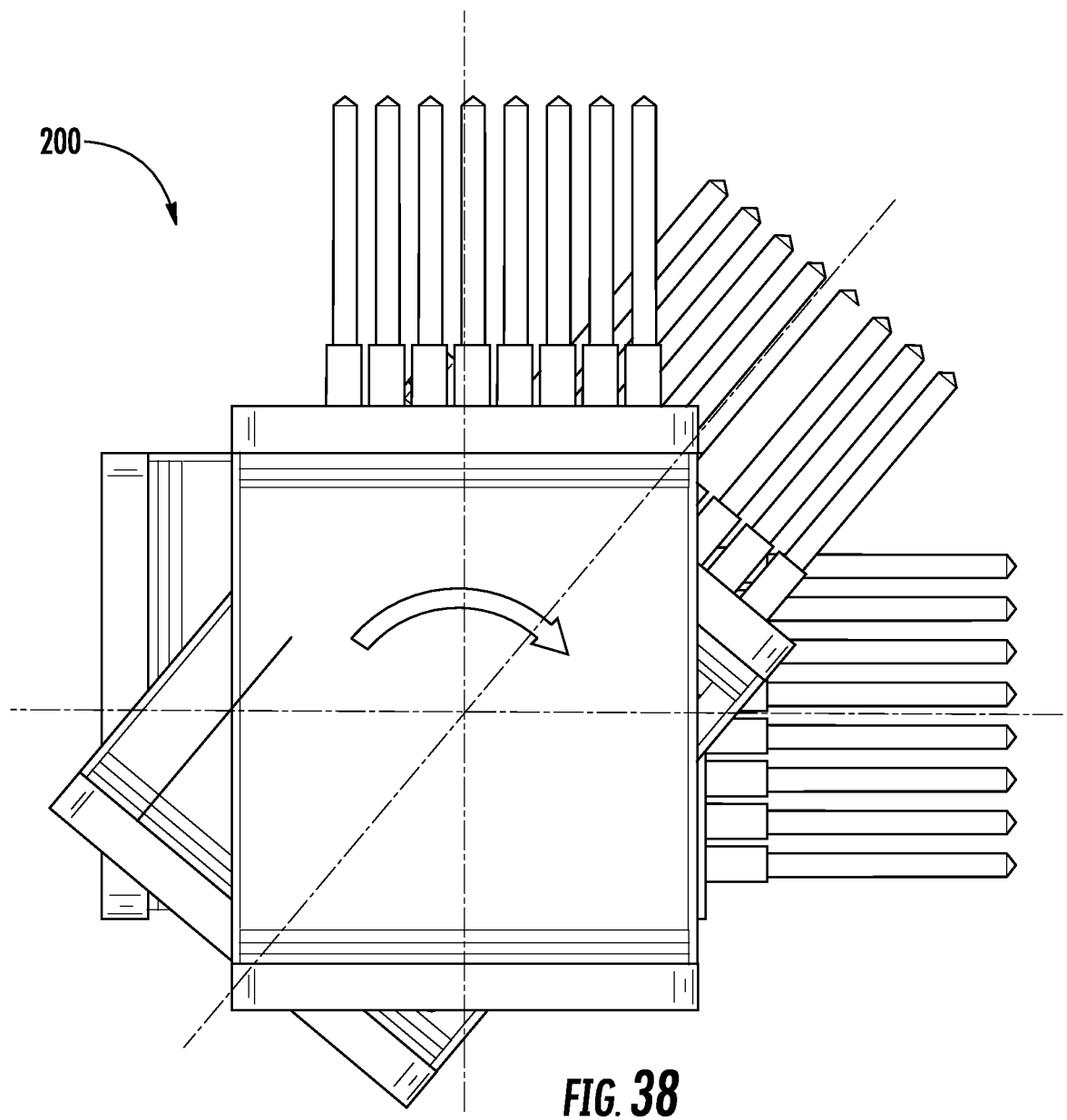

FIGS. 31-38 are various views of multiports 200 and designs associated with mounting structures 300 for the multiports 200. Specifically, the mounting structure 300 comprises a cover 306. In some embodiments, the cover 306 pivots relative to a base 302. FIG. 38 shows a mounting structure 300' for multiport 200 that may rotate.

Figure 39A:
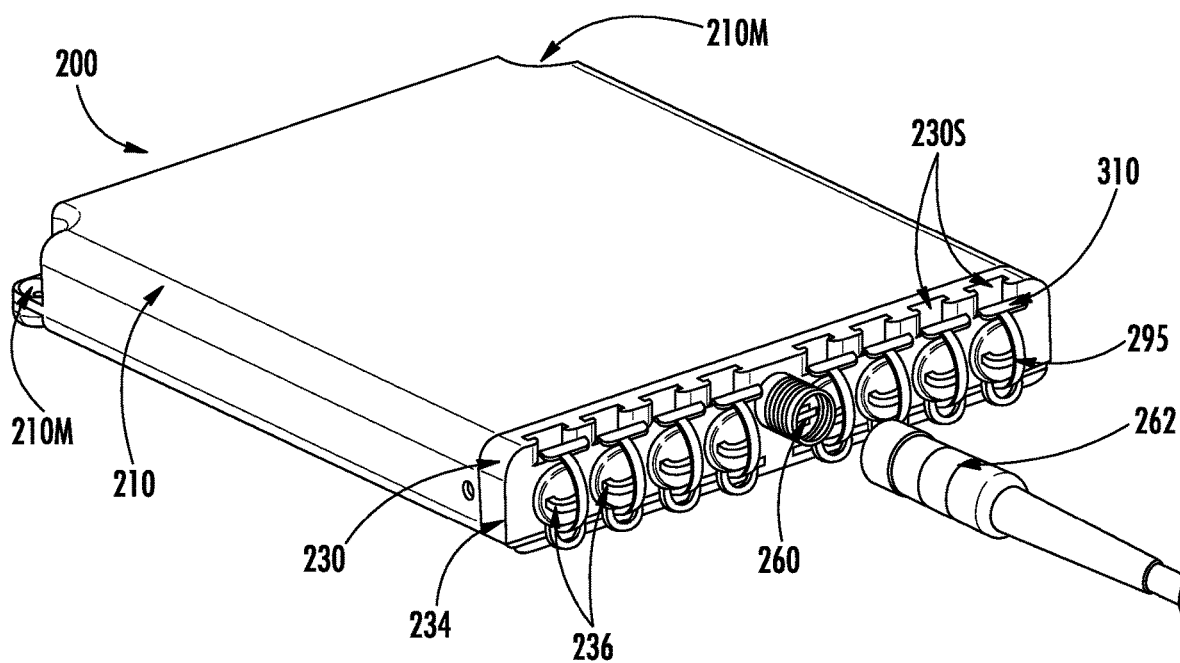
FIGS. 39A-39C are various perspective views of multiports having at least one securing feature associated with one or more of the connection ports and a connection port insert having an input connection port.
Figure 39B:
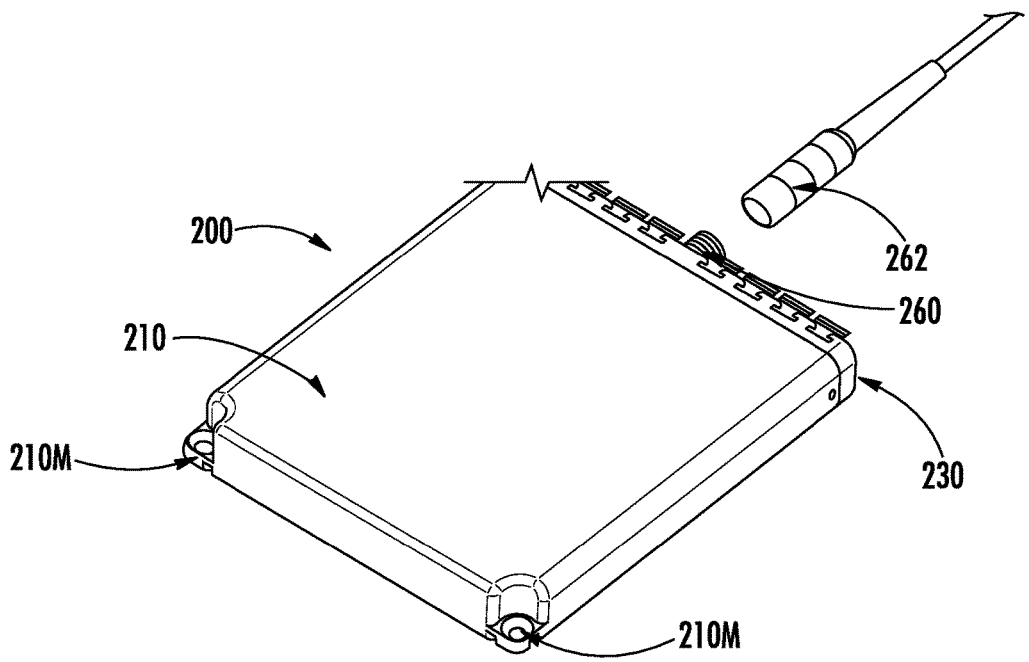
Figure 39C:
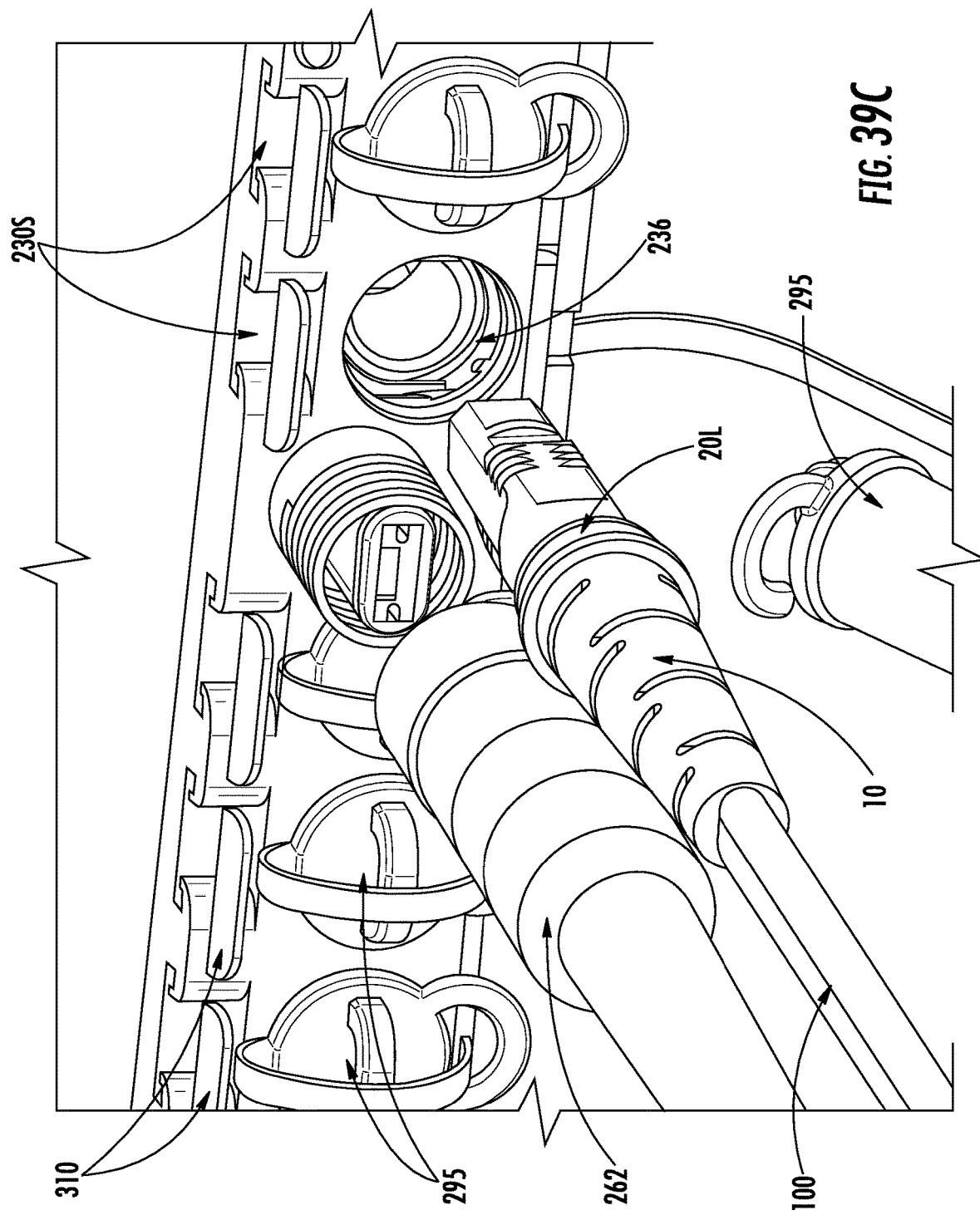

FIGS. 39A-39C are various perspective views of multiports 200 having at least one securing feature 310 associated with one or more of the connection ports 236. Although, this multiport 200 is shown with a connection port insert 230, the construction of this multiport may be is similar to the multiport of FIG. 5 with a first portion 210A of the shell 210 having the connection port 236 formed therein as well as the other multiports disclosed herein. Multiport 200 of FIGS. 39A-39C comprise an input connection port 260 suitable for making a connection with a fiber optic connector 262 of the input tether similar to the multiport of FIGS. 3 and 4. In this embodiment, securing feature 310 has an open position OP and a closed position CP. Securing feature 310 translates between the open position OP and the closed position, but other securing features may rotate when transitioning from positions. In the open position OP the dust cap 295 may be removed and the connector 10 inserted into connection port 236. The open position for the securing feature 310 occurs when the securing feature is translated to an upward position to stick-up from the slots 230S and the closed position occurs when the securing feature 310 is translated to fully-seated within the respective slot 230S. However, the securing feature 310 may have other positions as discussed herein.

Any suitable type of securing features may be used with the concepts disclosed herein and examples of the same are disclosed. Depending on the type of securing feature different types of actuation movement may be used for translation such as rotation, translation, or deforming of components. Further, embodiments may include other components such as protectors or covers 230C for keeping dirt, debris and other contaminants away from the actuation mechanism as desired.

By way of example and illustration, securing feature 310 of the multiport of FIGS. 39A-39C is a U-clip that translates within a respective slot 230S formed in connection port insert 230. U-Clip is shown in further detail in FIGS. 52A-52D. Each securing feature 310 of this embodiment is associated with a single connection port 236 such as shown in FIGS. 39A-39C so that a securing feature 310 must be translated when accessing an individual connection port 236. Securing feature 310 interfaces with the locking feature 20L disposed on the housing of connector 10 for securing or releasing connector 10. Likewise, the securing feature 310 interfaces with a the locking feature disposed on the dust cap 295 for securing or releasing dustcape 295 as desired.

Figure 40C:
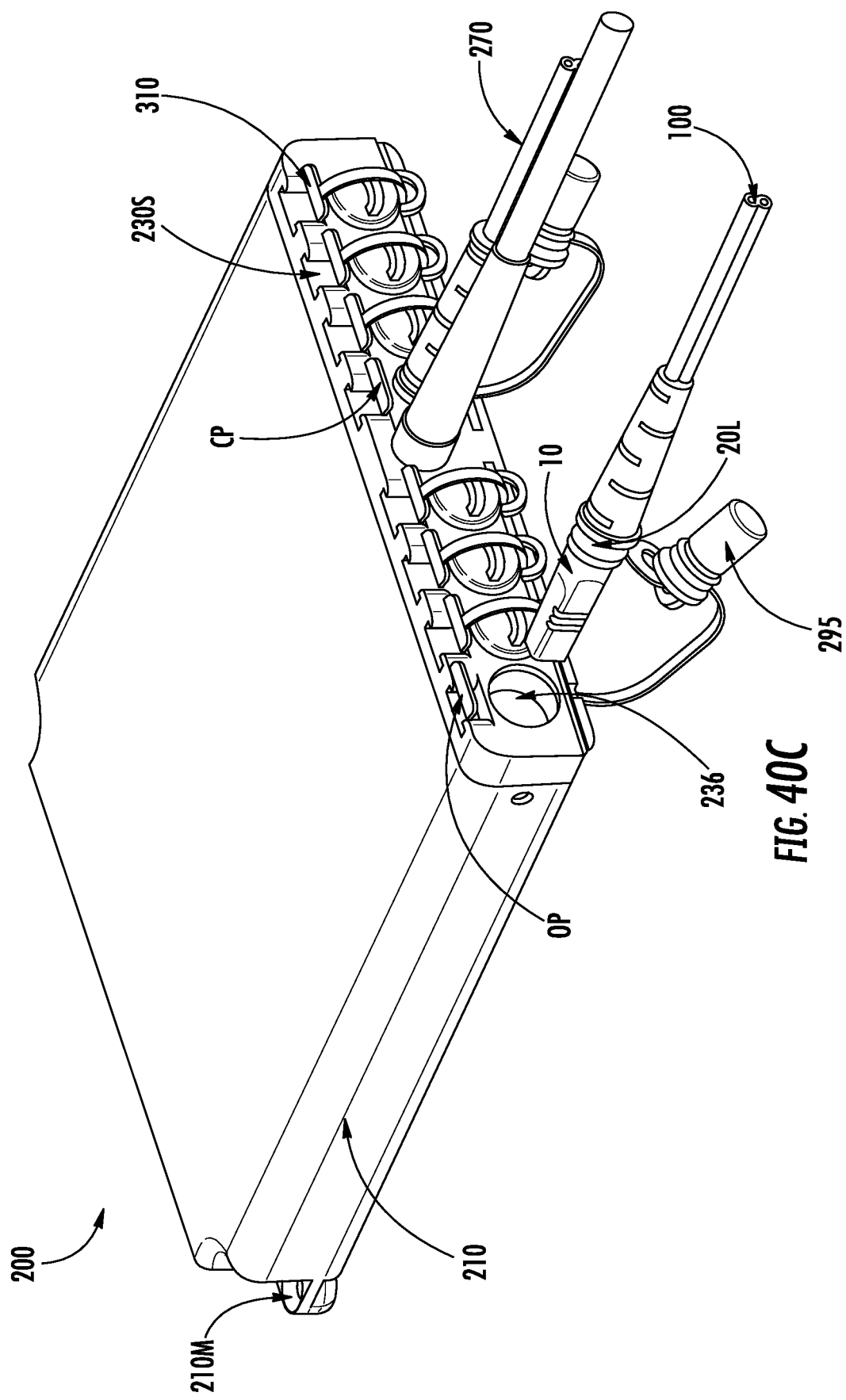

FIGS. 40A-40C are various perspective views of multiport 200 similar to the multiports of FIGS. 39A-39C having at least one securing feature 310 associated with each connection port 236 and is configured as a U-clip. Multiport 200 of FIGS. 40A-40C comprises an input tether 270 similar to the multiport of FIG. 5 and will not be discussed with this embodiment for brevity. Moreover, the designs with securing features may use any suitable concepts or features disclosed herein. FIG. 40C depicts the securing feature 310 on the near end of the multiport 200 in an open position OP with a connector 10 aligned for insertion into the connection port 236.

Figure 43:
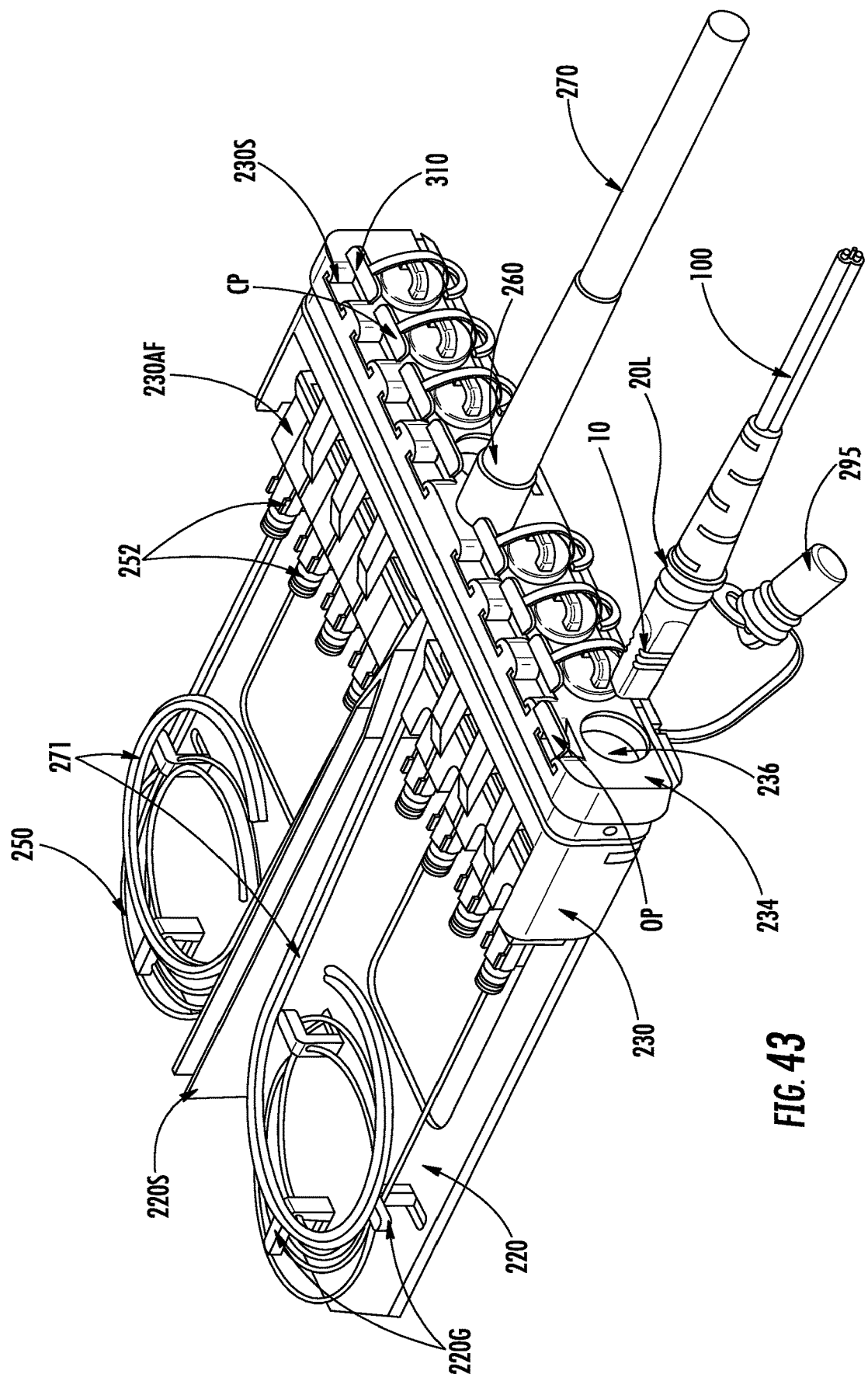
FIGS. 43 and 44 are front assembled views of a portion of the multiport of FIGS. 40A-40C with the shell removed for clarity.
Figure 44:
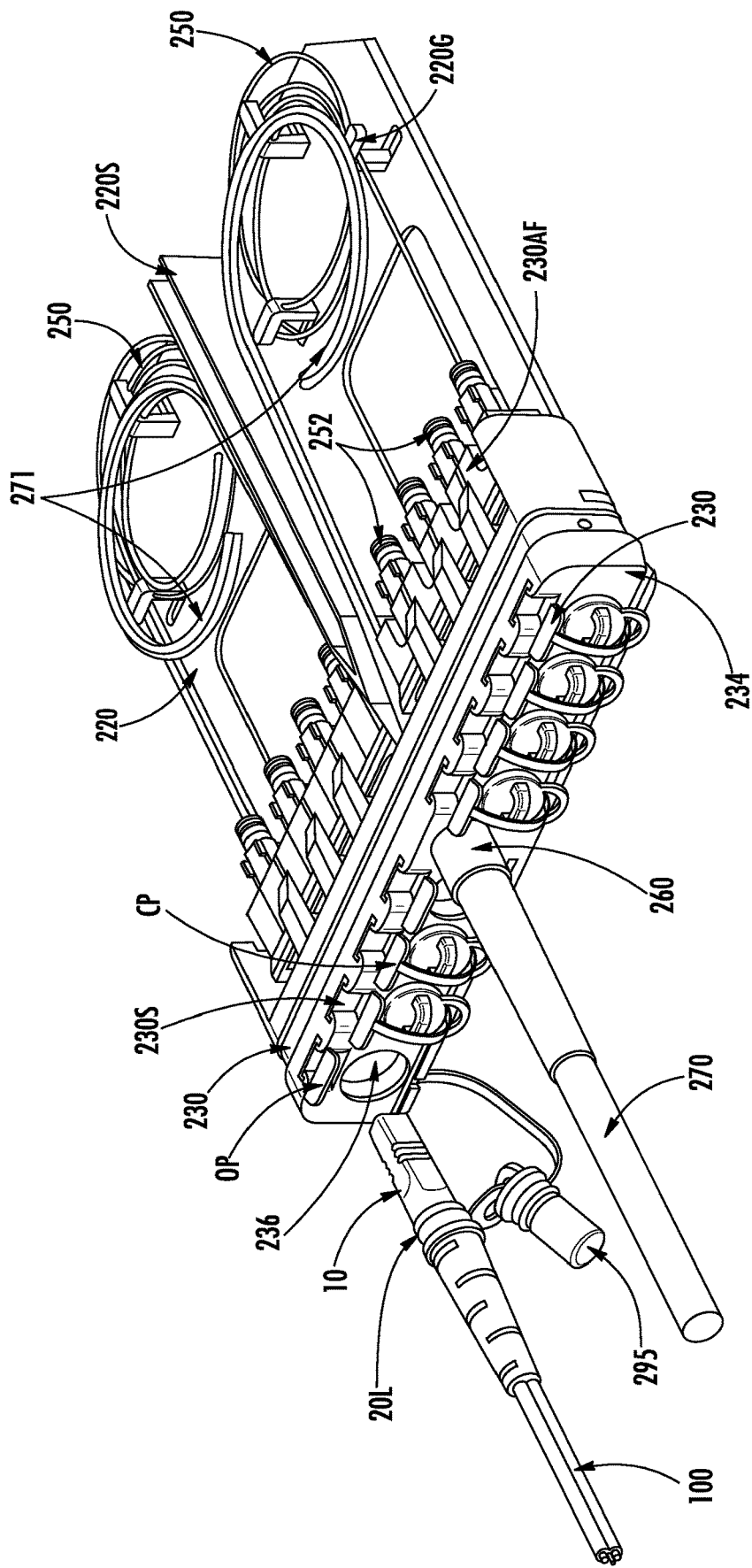
Figure 45:
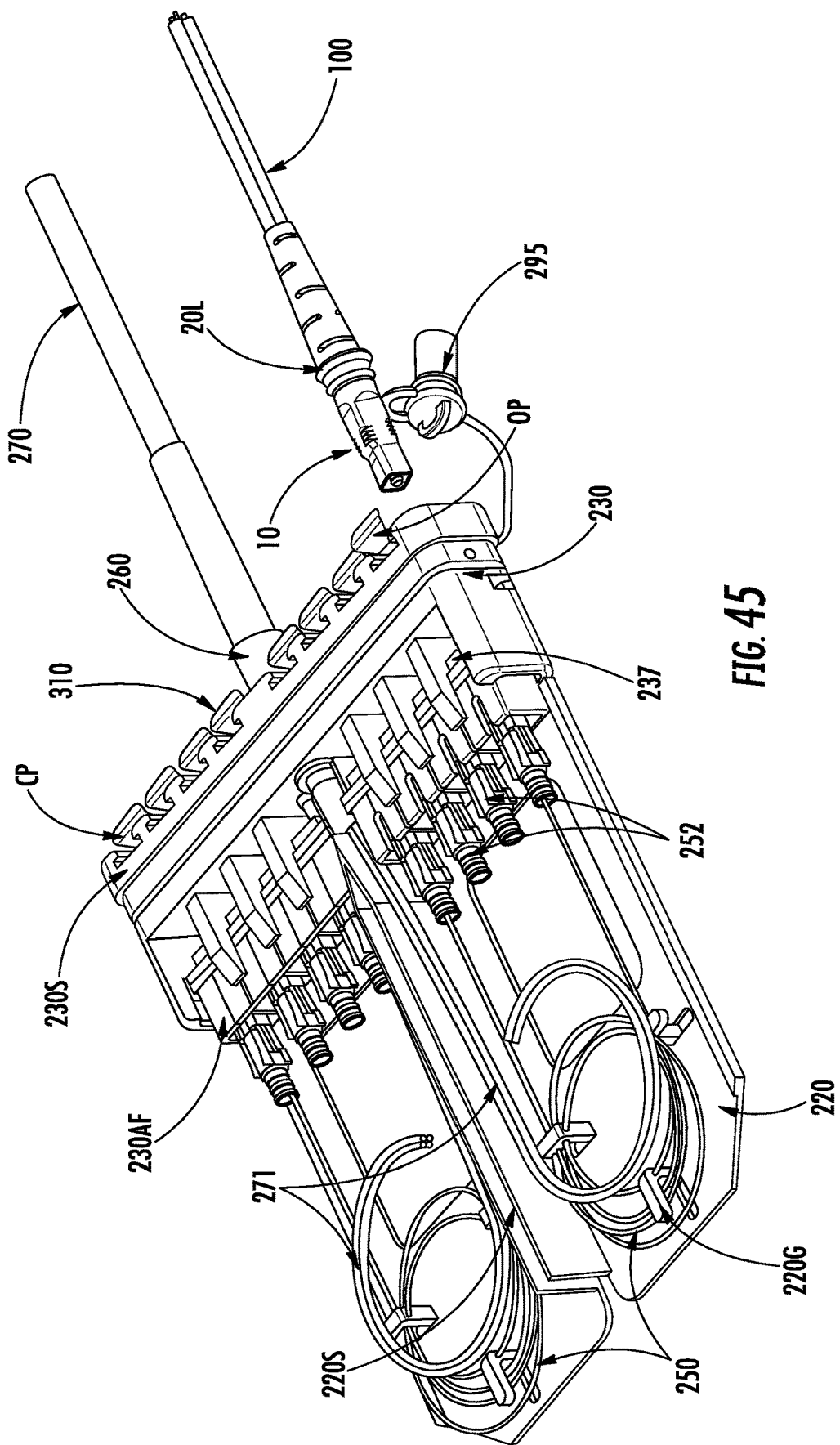
FIG. 45 is a rear assembled view of a portion of the multiport of FIGS. 40A-40C with the shell removed for clarity.

FIG. 41 is a front exploded view of the multiport 200 of FIGS. 40A-40C and FIG. 42 is a partially rear exploded view of a portion of the multiport 200 of FIGS. 40A-40C. FIGS. 43-45 are various assembled views of a portion of the multiport 200 of FIGS. 40A-40C with the shell 210 removed for clarity. Multiport 200 of FIGS. 40A-40C comprises shell 210 having a first opening 214 leading to a cavity 216 and a connection port insert 230 similar to other multiports 200. The connection port insert 230 of is multiport 200 is configured to secure one or more adapters 230AF thereto, where the adapters 230AF float relative to the connection port insert. Adapters 230AF are configured to receive rear connectors 252 with a SC footprint and the respective adapters 230AF include ferrule sleeves 250FS for aligning mating ferrules between rear connectors 252 and connector 10. Adapters 230AF may be ganged together or formed individually. Moreover, the adapters 230AF may be formed from several components, but some components could be integrally formed. This multiport include a fiber tray 220 that is a discrete component that may attach to connector port insert 230. Like other fiber trays, this fiber tray includes supports 220S and fiber routing guides 220G. Support 220S provides crush strength to the shell 210.

Figure 42:
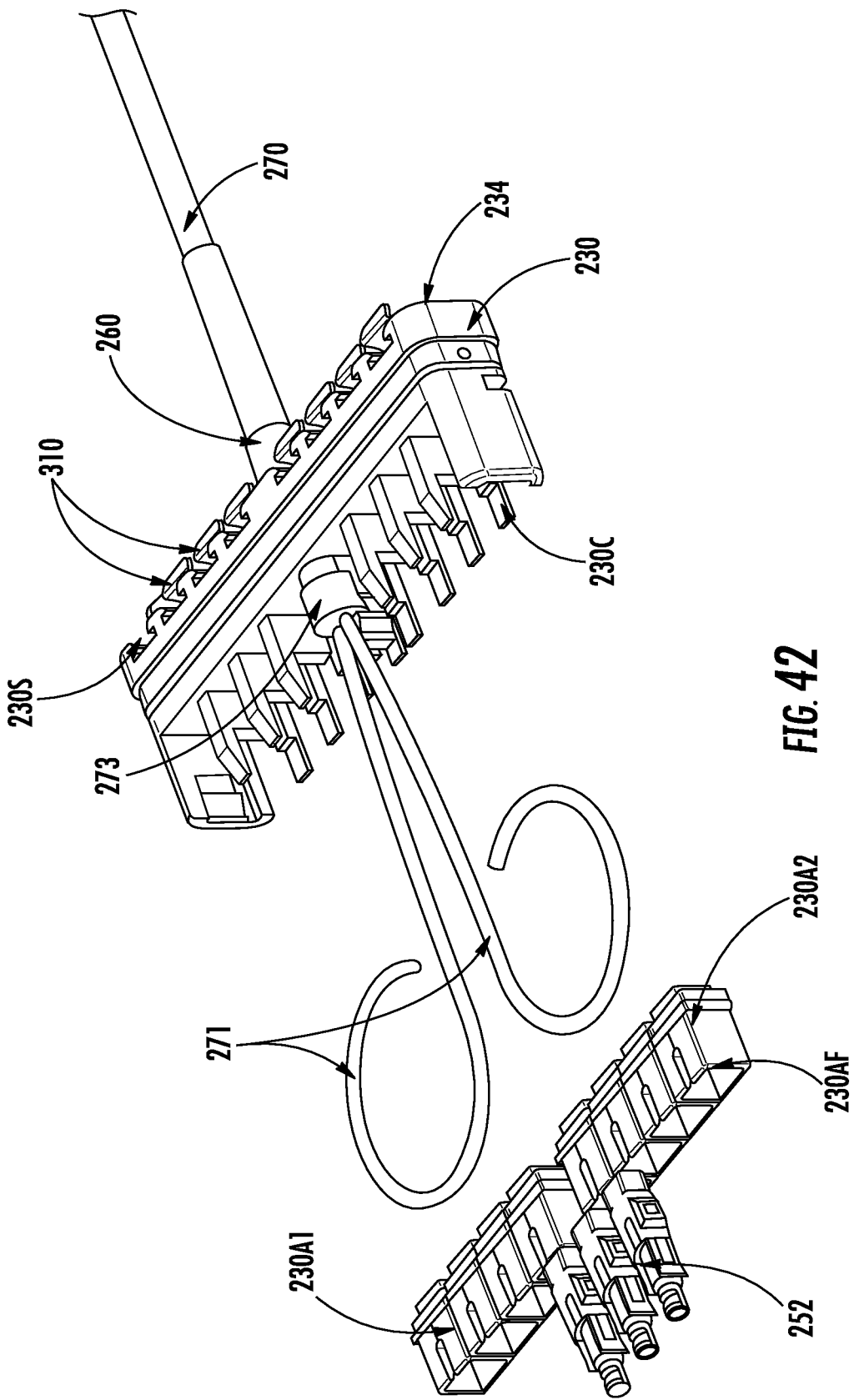
FIG. 42 is a rear partially exploded view of a portion of the multiport of FIGS. 40A-40C.

As best shown in FIG. 42, input tether 270 is secured to the connection port insert 230 using a collar 273 that fits into cradle 273C (see FIG. 46B) of the connection port insert 230. This attachment of the input tether 270 using collar 273 and cradle 273C provides improved pull-out strength and aids in manufacturing; however, other constructions are possible for securing the input tether 270. Input tether 270 may also comprise tubes 271 for organizing and protecting the optical fibers 250 as they transition to the respective connection port sections 230A1 and 230A2 and route about supports 220S. Tubes 271 also protected the optical fibers from overly tight bends, pinching and tangling, but may be omitted as desired.

Figure 47A:
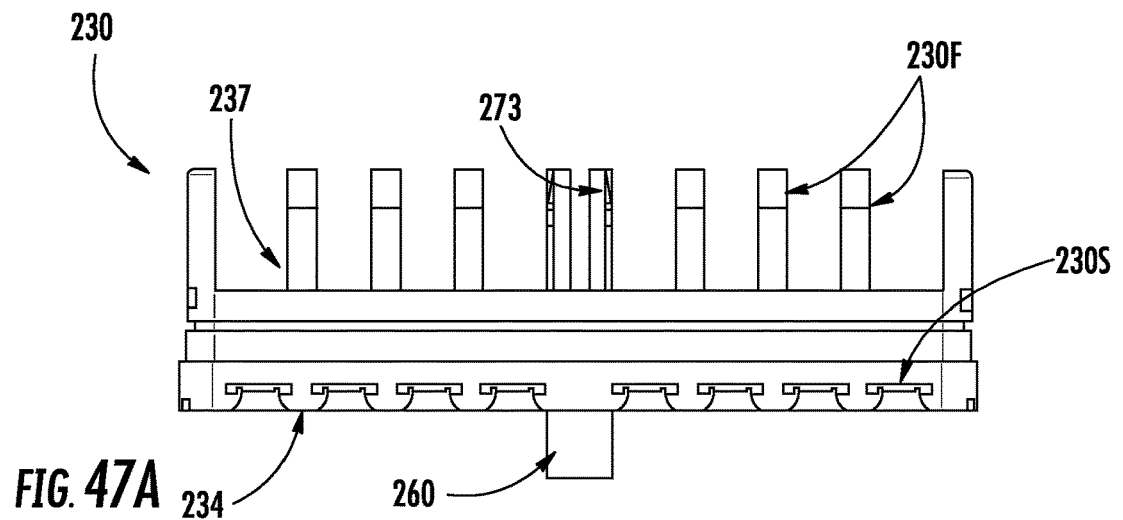
FIGS. 47A-47D are various views of the connection port insert of FIGS. 40A-40C.
Figure 47B:
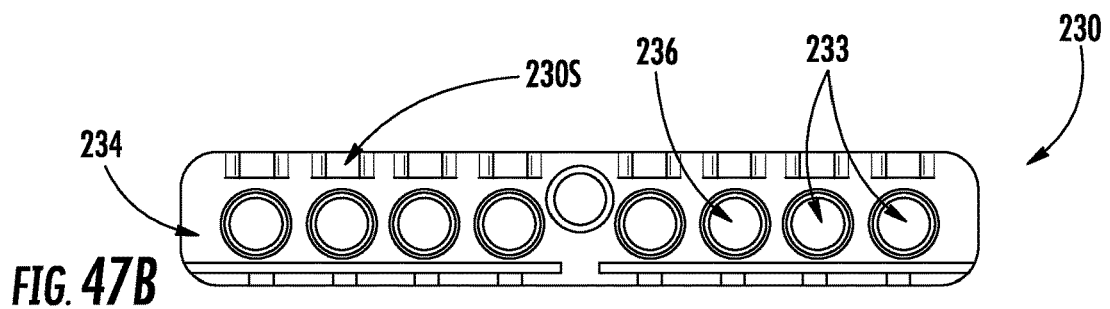
Figure 47C:
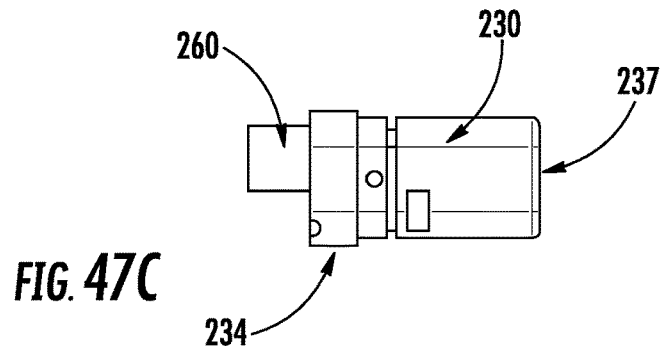
Figure 47D:
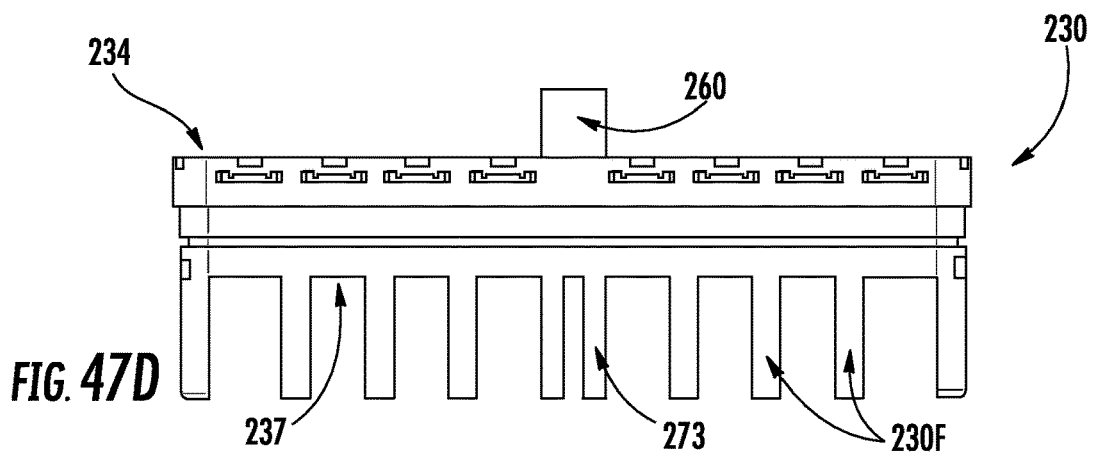
Figure 48A:
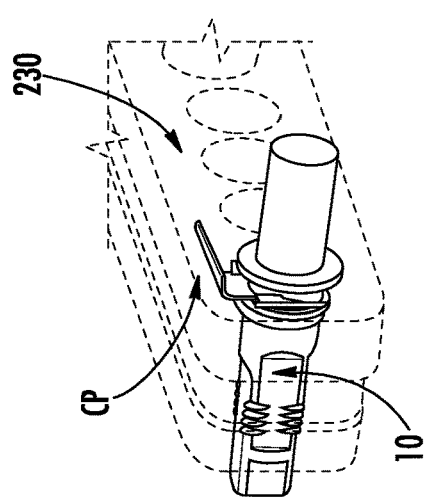
FIGS. 48A-48C are perspective views of the connection port insert and a securing feature to explain the open position, intermediate position and close position for the securing feature relative to the fiber optic connector being inserted into the connection port.
Figure 48B:
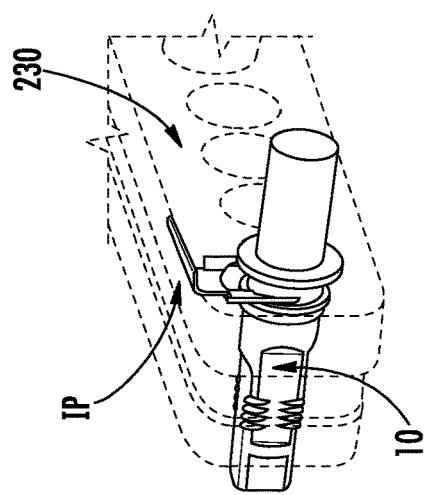
Figure 48C:
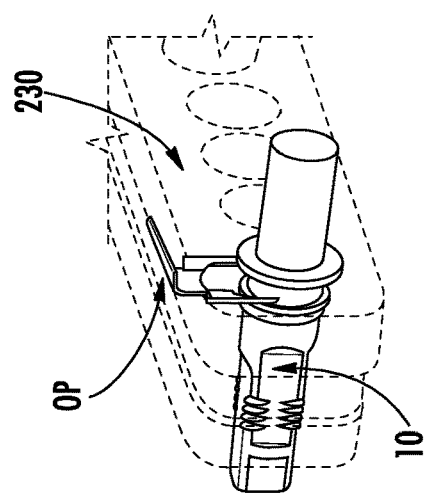

FIGS. 46A and 46B are front and rear perspective views of the connection port insert 230 and FIGS. 47A and 47D are various views of the connection pot insert 230 multiport of FIGS. 40A-40C. Connection port insert 230 is similar to other connection port inserts, but comprises a plurality of fingers 230F for securing the adapters 230AF so they may float. As depicted, connection port insert 230 has slots 230S molded therein for receiving the securing features 310 therein in a translating manner. Securing features 310 of the multiport 200 of FIGS. 40A-40C may have more than two positions as desired. By way of example, FIGS. 48A-48C are perspective views of the connection port insert 230 and a securing feature 310 for explaining the open position OP, intermediate position IP and close position CP for the securing features 310 relative to connector 10 being inserted into the connection port 236. This explanation is also suitable for the dust caps 295. FIG. 48A depicts the securing feature 310 in an open position where the securing feature translates to the extended position where connector 10 may be freely inserted or removed from the connection port 236. FIG. 48B depicts the securing feature 310 in an intermediate position where the securing feature translates to a middle position where connector 10 may be inserted or removed from the connection port with some effort required to overcome the interference with the securing feature 310. This is advantageous if a user wishes to work in difficult location and needs his hands free since unintended disconnection is not as likely. FIG. 48C depicts the securing feature 310 in a closed position where the securing feature translates to fully seated position and the connector 10 will not be inserted or removed without great difficulty or damage.

Figure 49:
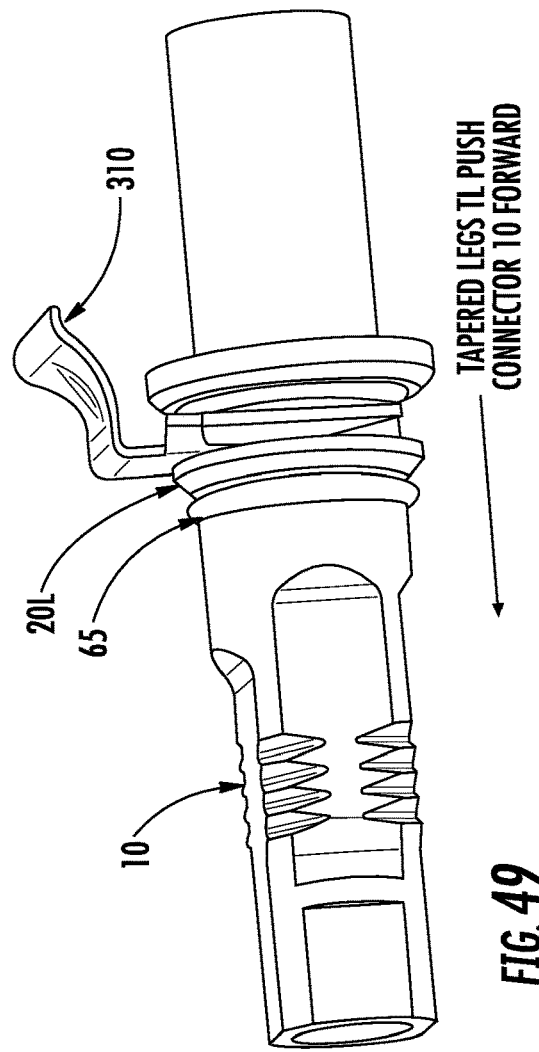
FIG. 49 is an isolated perspective view of the securing feature that cooperates with the fiber optic connector of FIGS. 48A-48C.
Figure 49A:
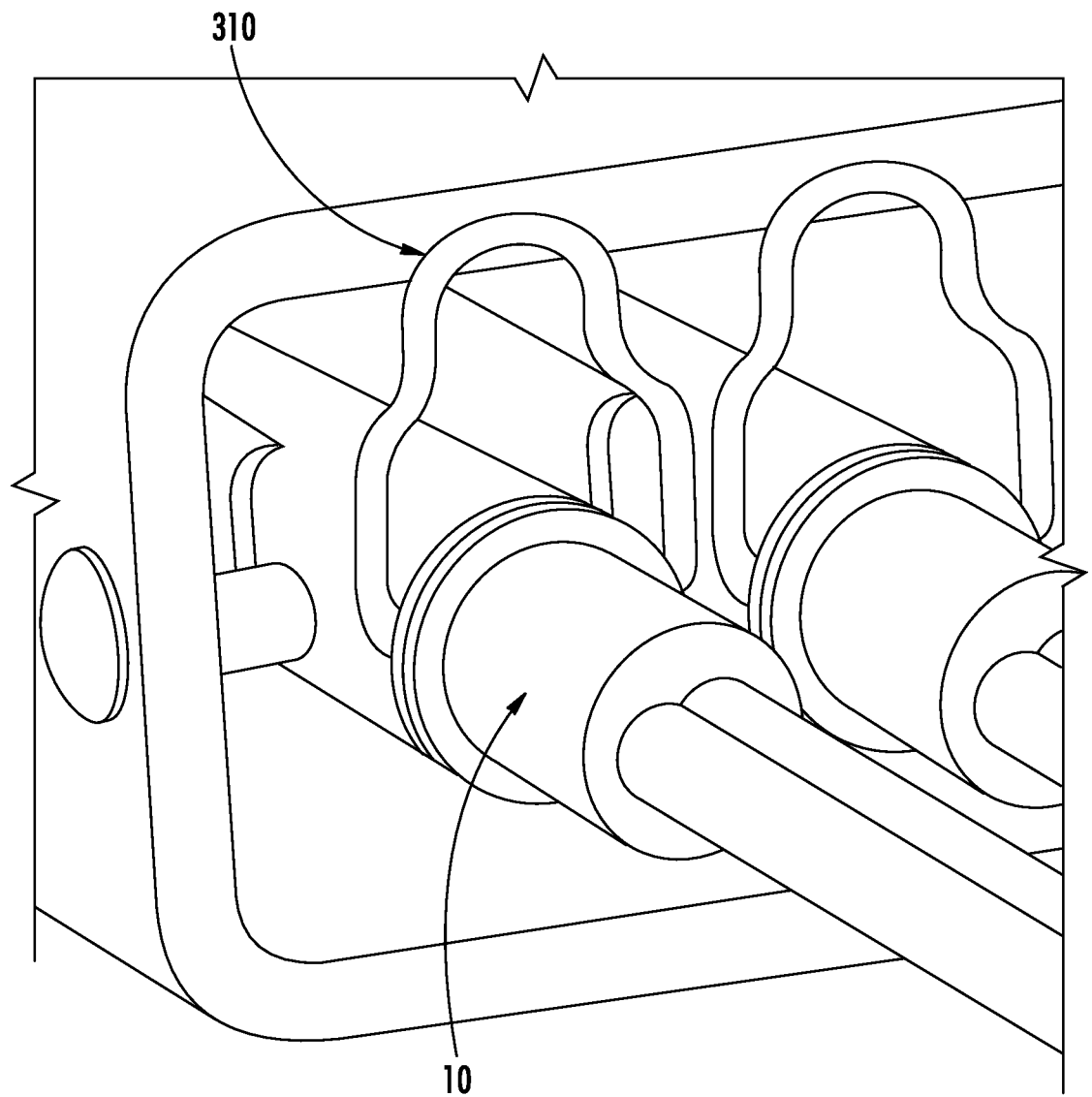
FIG. 49A is an isolated perspective view of another securing feature for the fiber optic connector that cooperates with the multiport.
Figure 49B:
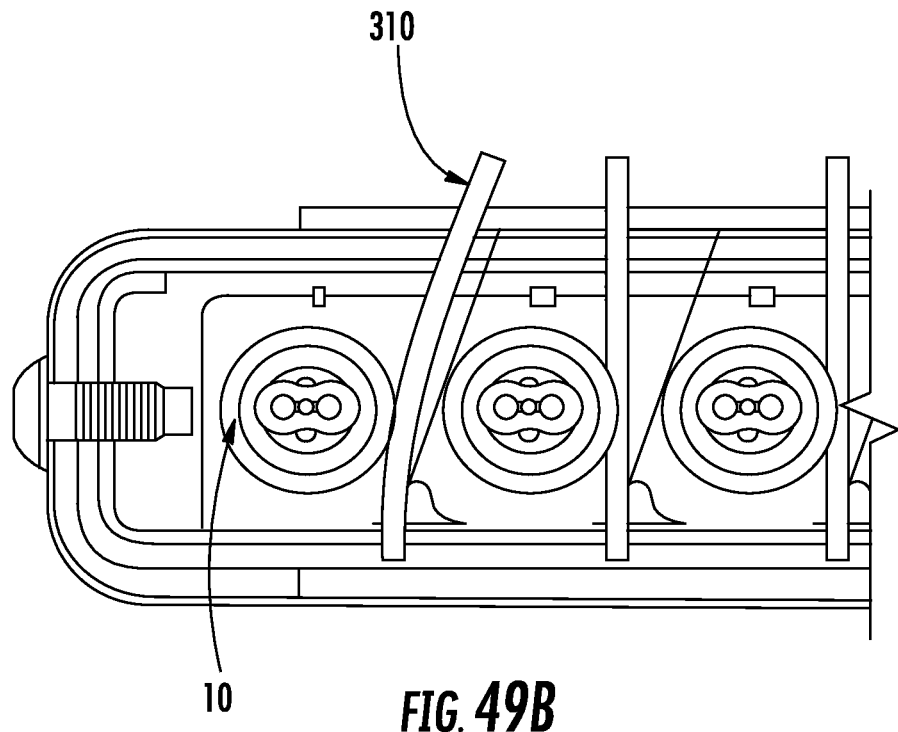
FIGS. 49B and 49C are isolated perspective view of another securing feature for the fiber optic connector that cooperates with the multiport.
Figure 49C:
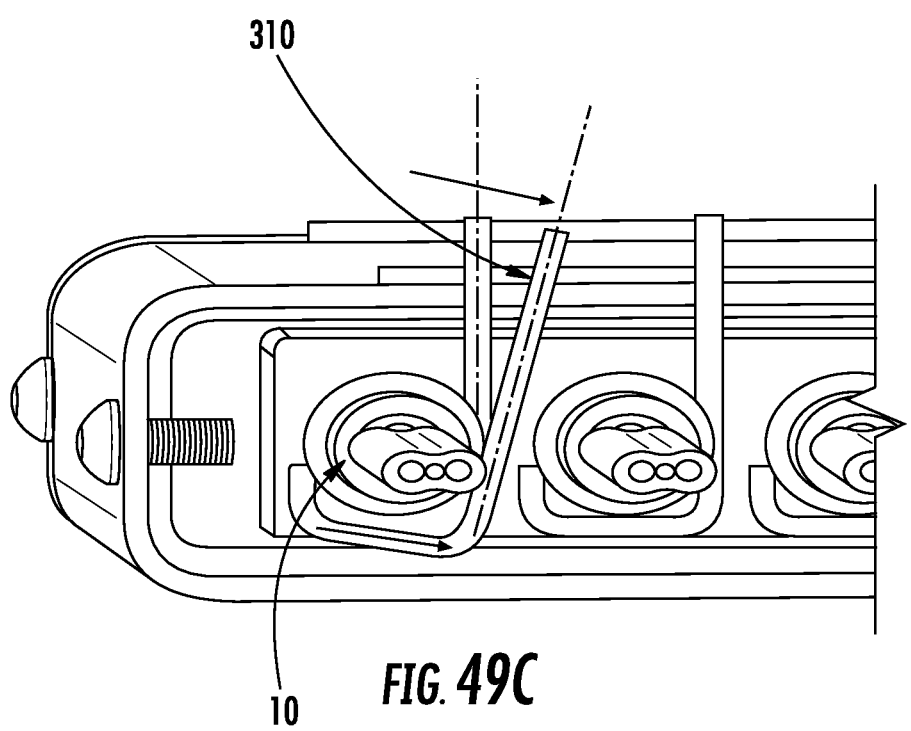

FIG. 49 is an isolated perspective view of securing feature 310 and connector 10 of FIGS. 48A-48C. A depicted the tapered portion 310TP of the legs of the securing feature 310 push the connector 10 forward for mating after engaging the securing feature 310. However, other types of securing features 310 configured as clips may be used with the concepts disclosed. By way of example, FIG. 49A show securing feature 310 formed as a bent wire that cooperates with the multiport for securing connector 10. Likewise, FIGS. 49B and 49C depict another securing feature 310 configured as a flexible or deformable wire that cooperates with the multiport for securing connector 10.

Figure 51:
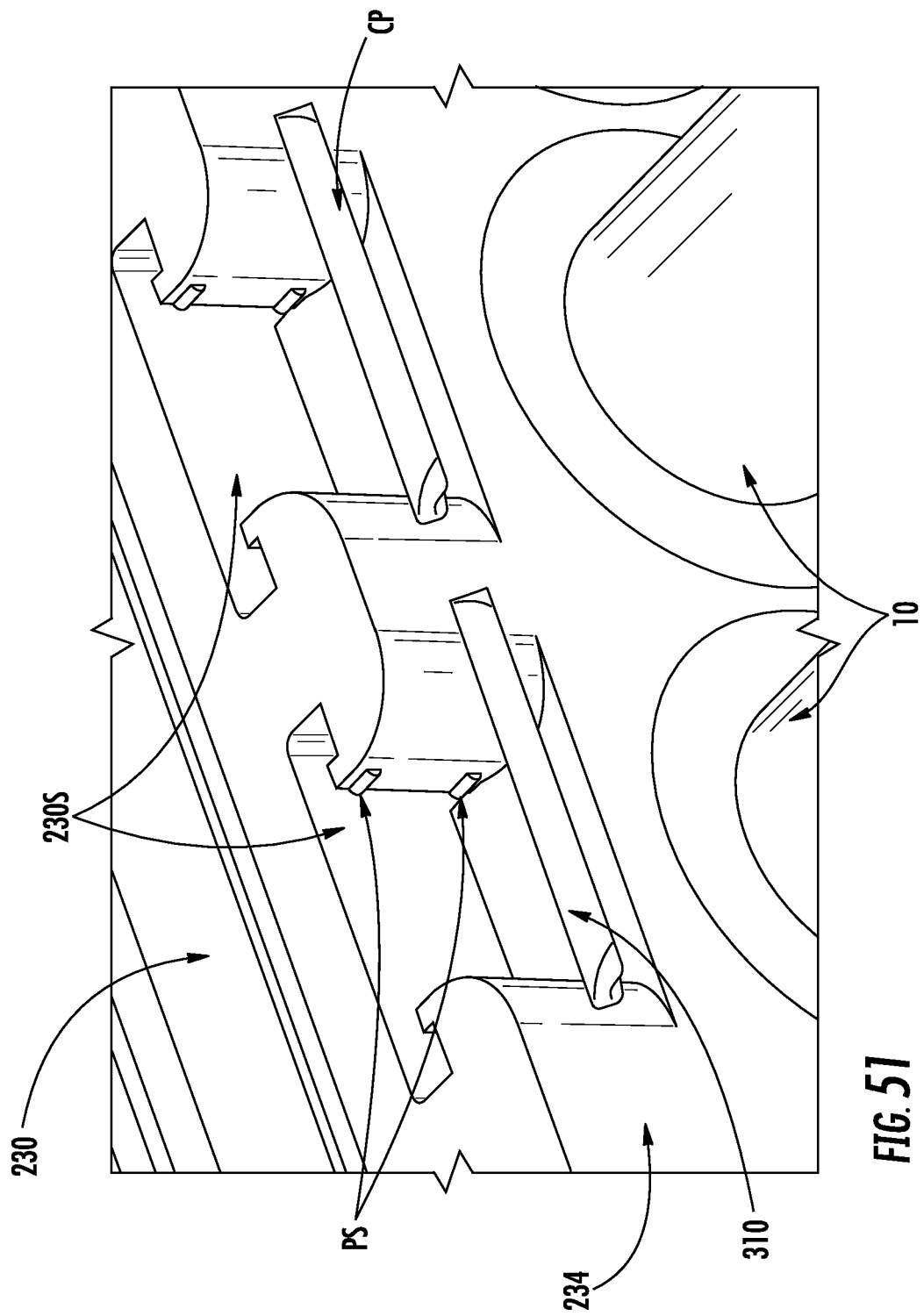
Figure 52A:
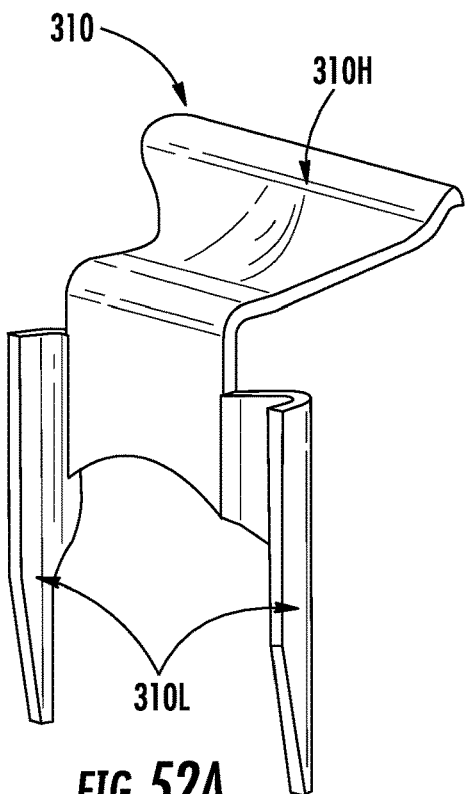
FIGS. 52A-52D are various views of the securing feature of multiports of FIGS. 39A-40C.
Figure 52B:
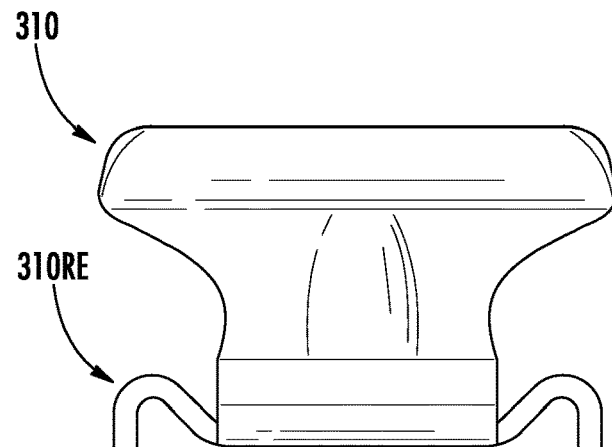
Figure 52C:
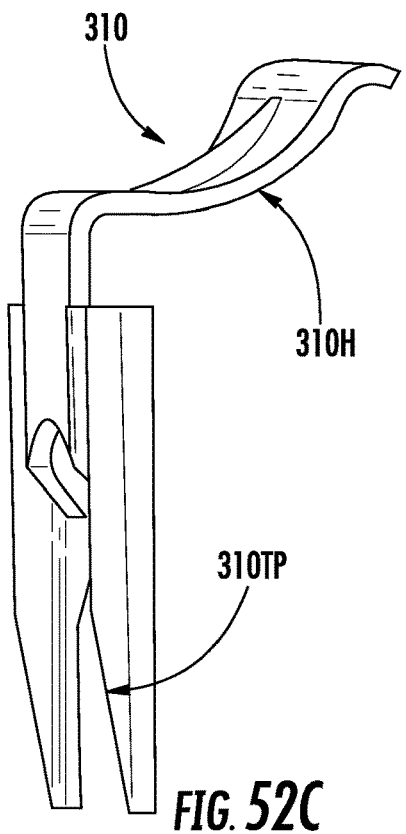
Figure 52D:
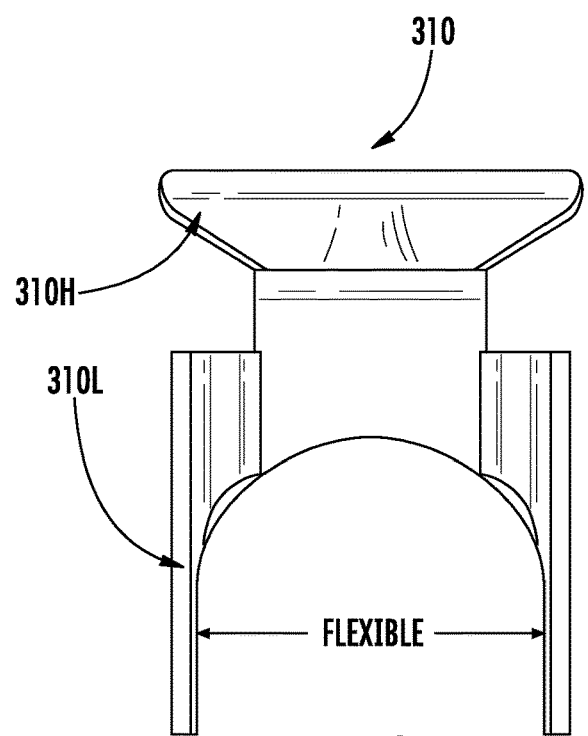

FIGS. 50 and 51 respectively are detailed top and perspective views of the connection port insert 230 having slots 230S for cooperating with securing feature 310 of FIGS. 48A-48C and securing the connector 10 in multiports 200. Generally speaking, the slots 230S may have a generally T-shaped opening for receiving a rolled edge 310RE of securing feature 310 and a bell-shaped recess at the top for receiving a portion of handle 310H. Moreover, the slots 230 may include protruding stops PS for helping the user stop at the correct positions.

FIGS. 52A-52D are various views of the securing feature 310 that translates within the slots 230S. Securing feature 310 comprises legs 310L that are flexible along the lateral axis so they can spread when the connector 10 is pushed-in or pulled-out when in the intermediate position IP. Rolled edges 310RE provide stiffness and durability for the securing feature. Securing feature 310 may also have a handle 310H to help grab and move the securing feature 310. The securing feature 310 may also include a hydrophobic coating for weather-resistance such as PTFE as desired.

Figure 53:
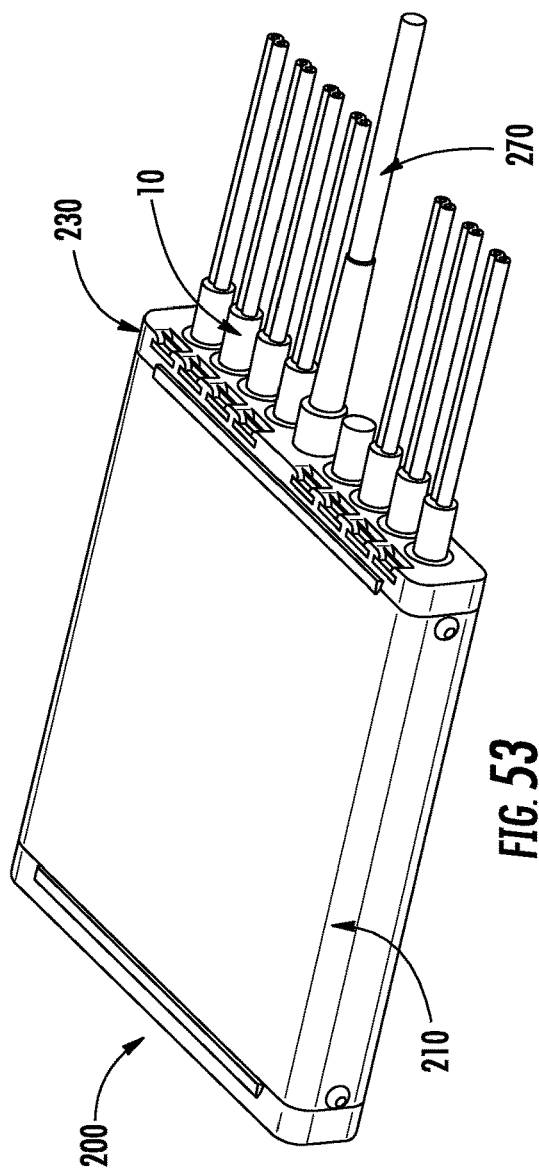
FIGS. 53 and 54 are perspective and partially assembled views of another multiports similar to the multiports of FIGS. 40A-40C having multiple adapter ganged together on either side of the input tether.
Figure 54:
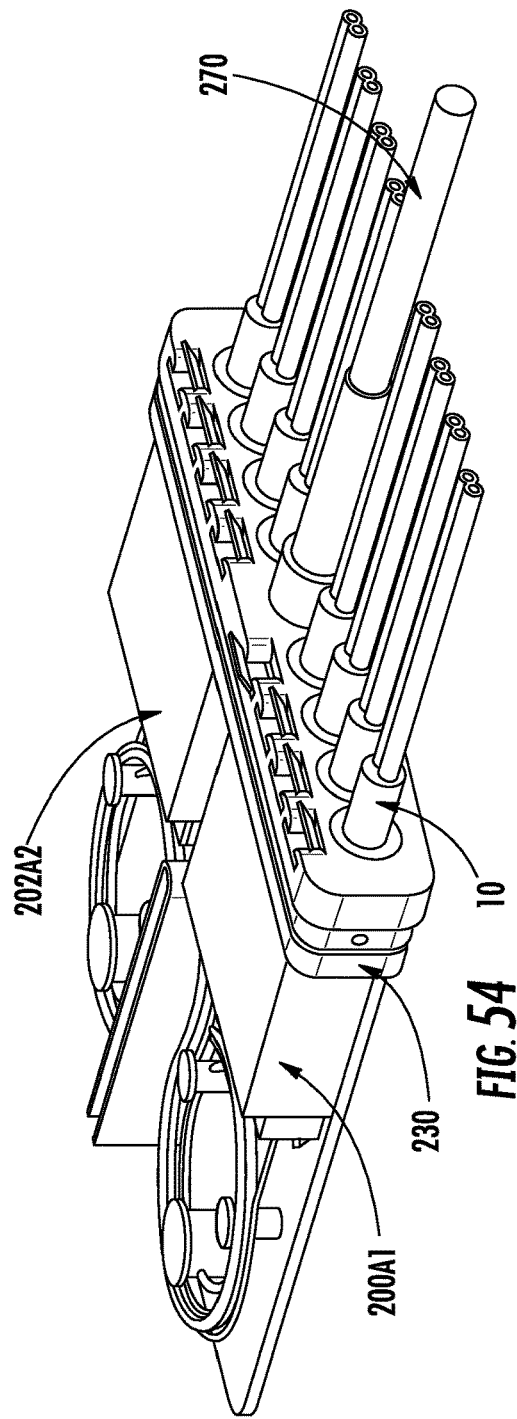
Figure 55:
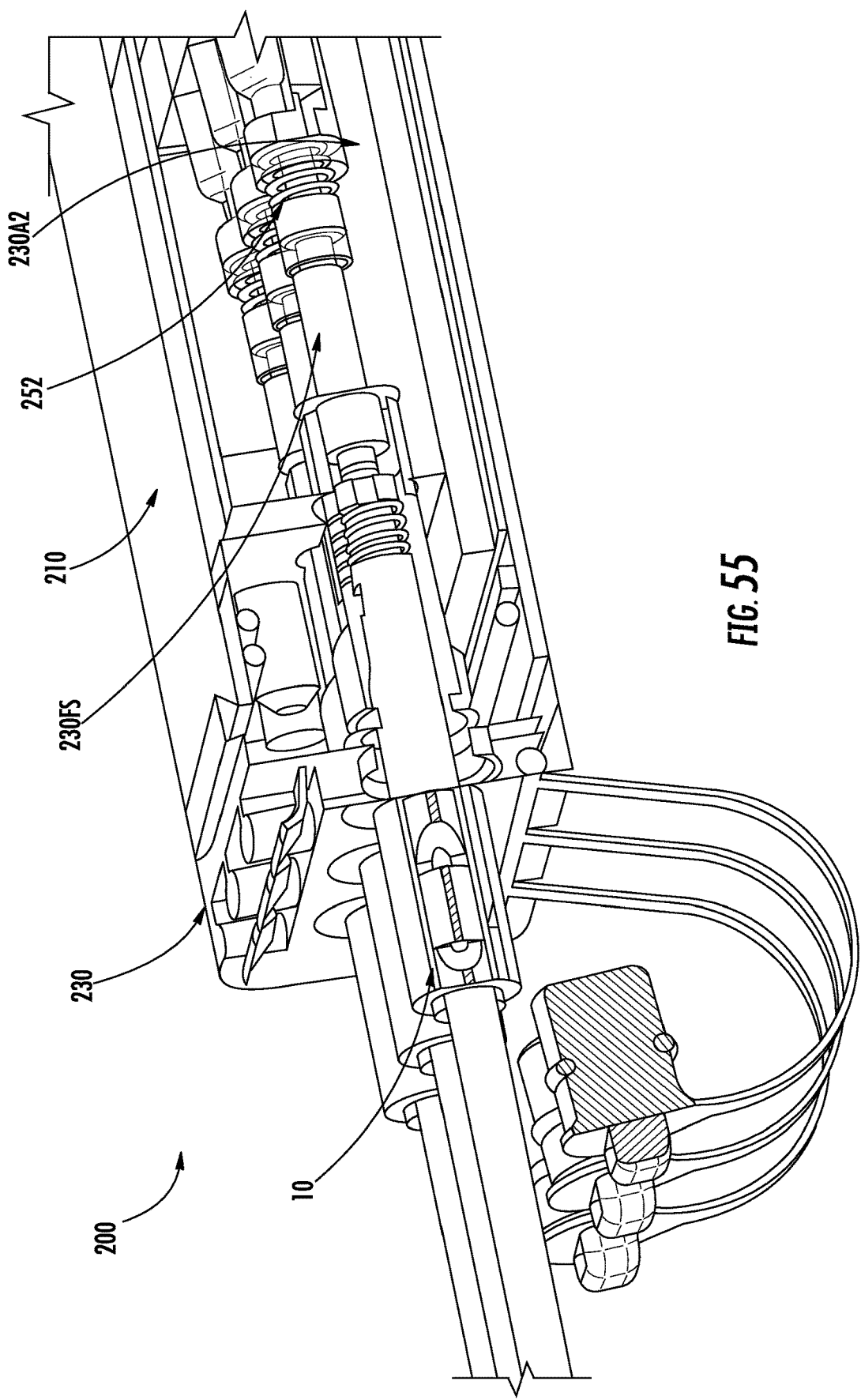
FIG. 55 is a sectional views of the optical connections of the multiport in FIGS. 53 and 54 showing the optical connection between a rear connector and a fiber optic connector of the fiber optic cable assembly.

FIGS. 53 and 54 are perspective and partially assembled views of other multiports 200 similar to the multiports of FIGS. 40A-40C having multiple adapters ganged together in common adapter blocks 200A1, 200A2 on either side of the input tether. FIG. 55 is a sectional view of the optical connections of the multiport in FIGS. 53 and 54 showing the optical connection between a rear connector 252 and connector 10 being mated in the common adapter block 200A2.

Figure 56:
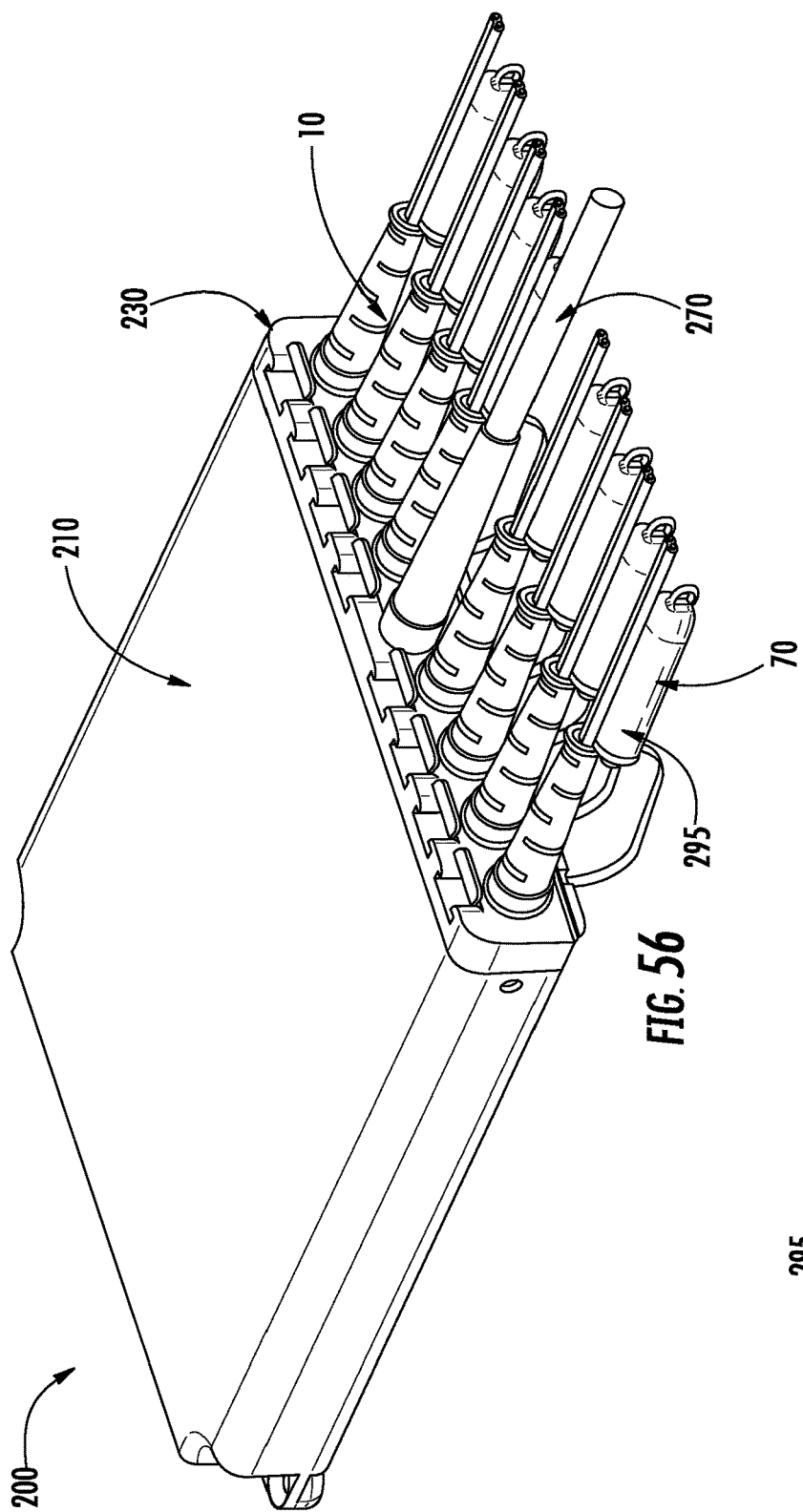
FIGS. 56 and 57 are perspective views of another multiport similar to FIGS. 40A-40C showing a different dust cap configuration that can be mated with the dust cap of the fiber optic connector for storage.
Figure 57:
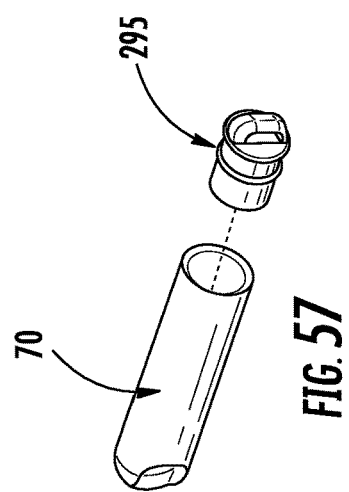

FIGS. 56 and 57 are perspective views of another multiport 200 similar to FIGS. 40A-40C showing a different dust cap configuration that can be mated with the dust cap 70 of the optic connector 10 for storage. Specifically, the dust cap 295 of multiport 200 is suitable for attaching to the dust cap 70 of connector 10 when connector 10 is optically connected with multiport 200 to prevent loss of the dust caps and inhibit dust, debris or the like to contaminate the dust caps. The dust caps of the multiport 200 are tethered to the multiport 200 so the mated dust caps 70, 295 will not be lost.

FIGS. 58A-58B are perspective views of another multiport similar to FIGS. 40A-40C showing another dust cap configuration for storage. In this configuration, the multiport 200 has ganged dust caps 295G with each dust cap 295 attached to a rail 295R by a tether 295T. The rail 295R is configured to engage a groove 230DR formed in the connection port insert 230. Consequently, the dust caps 295 of the multiport 200 are tethered to the multiport 200 so the dust caps 295 will not be lost.

FIGS. 59A-59D are perspective views of still another multiport 200 similar to FIGS. 40A-40C showing yet another dust cap configuration that is similar to the dust cap configuration of FIGS. 58A-58B. In this case, the multiport 200 has ganged dust caps 295G with each dust cap 295 attached to a rail 295R by a tether 295T. The rail 295R is configured to engage a bores 230DB formed in the connection port insert 230 using protrusions 295P on rail 295R that cooperate with bores 230DB. Consequently, the dust caps 295 of the multiport 200 are tethered to the multiport 200 so the dust caps 295 will not be lost.

FIGS. 60-64 are perspective and sectional views of still another multiport 200 having at least one rotating securing feature 310 associated with a plurality of connection ports 236. The multiport 200 depicted in FIGS. 60-64 comprises connection port insert 230 having at least one flexure 230F (see FIG. 62) associated with at least one of the connection ports 236. In this multiport 200 each connection port 236 has a dedicated flexure 230F disposed on the connection port insert 230. The securing feature 310 of this multiport 200 is associated with a plurality of flexures 230F. Like the translating securing feature 310, the rotating securing feature 310 has an open position OP and a closed position CP. The rotating securing feature 310 comprises a cam surface 310CS that determines whether the flexures 230F are deflected or not based on the rotational position of the cam surface. Further, the rotating securing feature 310 may be configured for comprising an open position OP, an intermediate position IP and a closed position CP if desired by configuring the cam surface 310CS to provide the three positions based on the degree of deflection of the flexure 230F. The securing feature 310 depicted in FIGS. 60-64 deflects at least one and in this case a plurality of flexures 230F when in the closed position CP.

Figure 60:
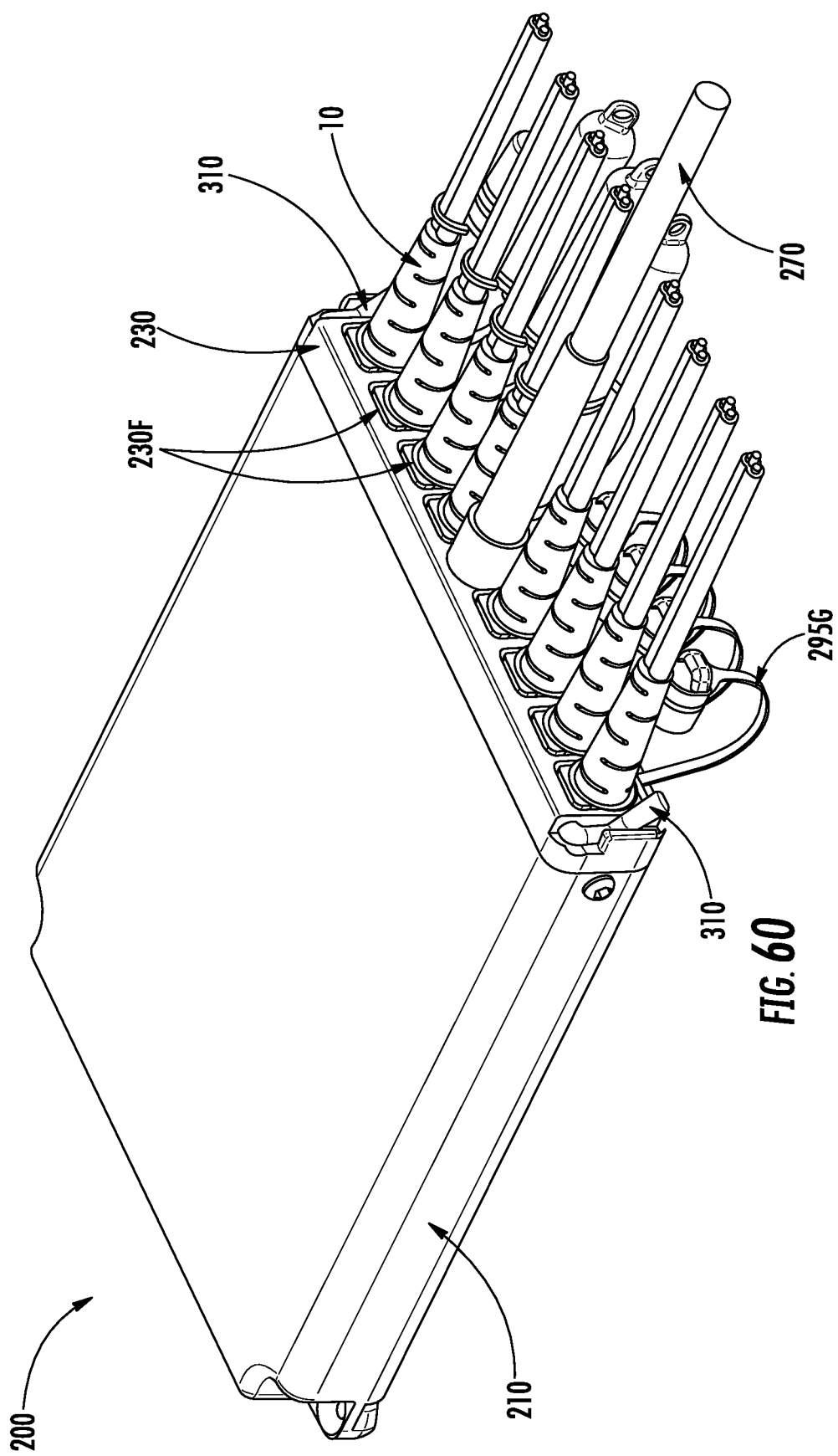
Figure 63:
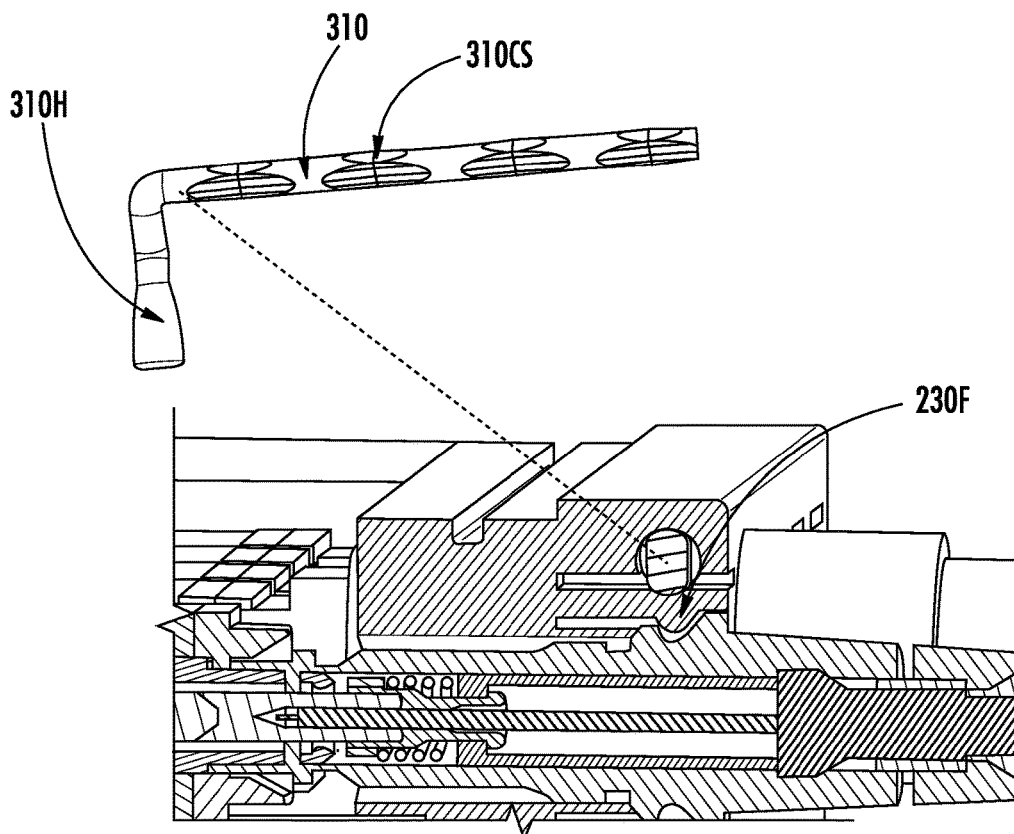
Figure 64:
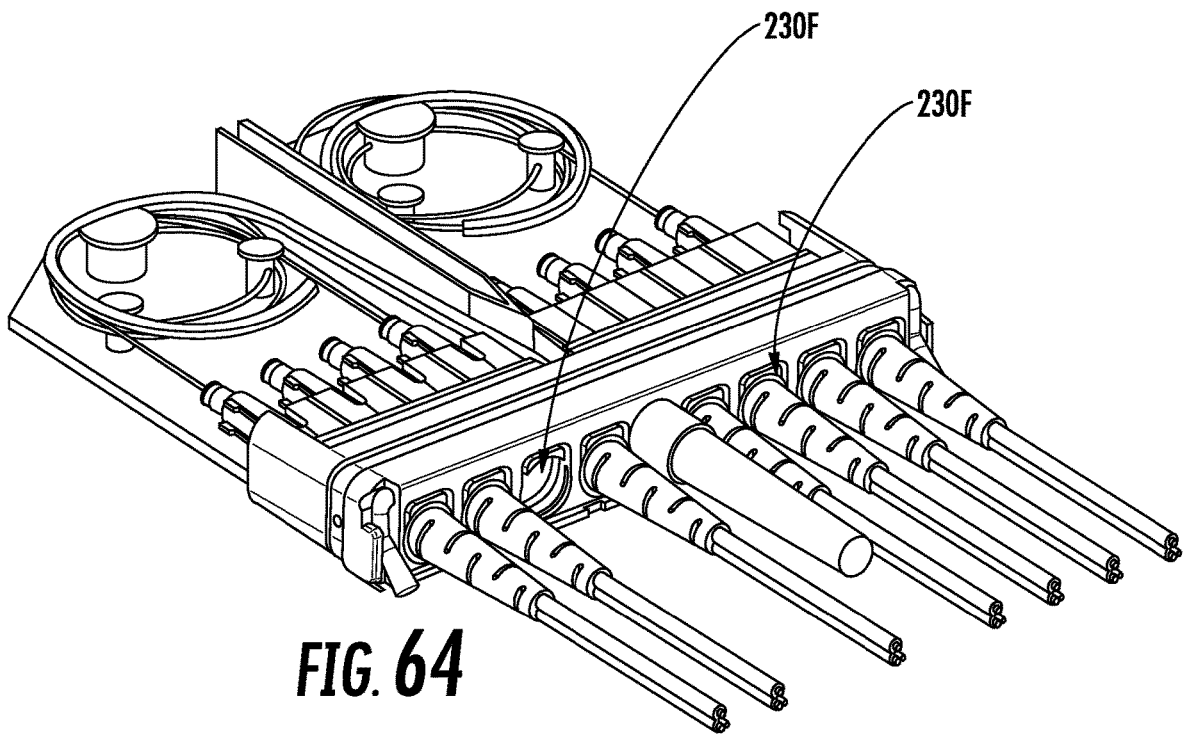

As depicted in FIG. 60, multiport 200 comprises two securing features 310. Specifically, a first securing feature operates the flexures 230F on a first side of input tether 270 and a second securing feature operates the flexures 230F on the second side of input tether 270. FIG. 61 is a detailed perspective view of flexure 230F being associated with at least one of the connection ports 236. In this case, each securing feature 310 is associated with four connection ports 236 and cooperates with four flexures 230F. FIG. 62 is a sectional view depicting cam surface 310CS. Connection port insert 230 comprises one or more bores for receiving a portion of the at least one securing feature 310 as shown. In this case, bore 230B is arranged transversely to a longitudinal axis LA of the connection port insert. When cam surface 310CS deflects flexure 230F the flexure 230F engages the locking feature 20L on the housing of connector 10 to determine which position is achieved open position, intermediate position or closed position. FIG. 64 depicts the cam surfaces 310CS of securing feature 310 uses the multiport 200 of FIGS. 60-64. Securing feature 310 also includes a handle 310H that is accessible near the end of the connection port insert as shown in FIG. 64. Other variations of these concepts are also possible such as having the securing feature 310 cooperate with more or less connection ports 236. Likewise, the securing feature may have different orientations relative to the connection port insert.

FIGS. 65-66 are perspective views of still other multiports 200 similar to the multiport 200 of FIGS. 60-64 having at least one rotating securing feature associated with a plurality of connection ports. Like the multiport 200 of FIGS. 60-64, this multiport 200 comprises the connection port insert 230 having at least one flexure 230F associated with at least one of the connection ports 230 just like before; however, in these embodiments the second insert is used that is similar to the first connection port insert. Thus, both ends of shell 210 have connection port inserts with securing features 310 such as described with respect to FIGS. 60-64.

Figure 67:
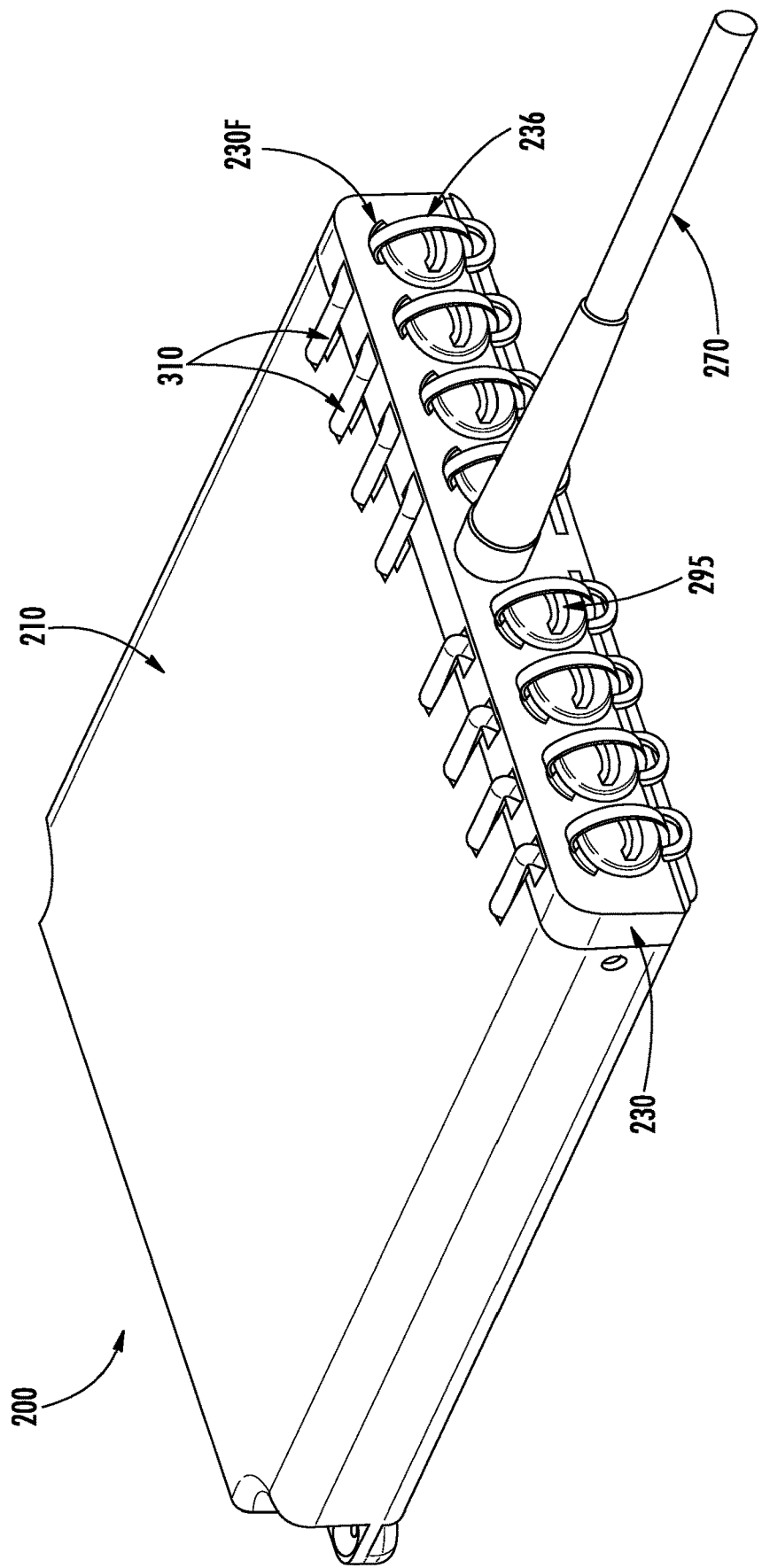
Figure 72:
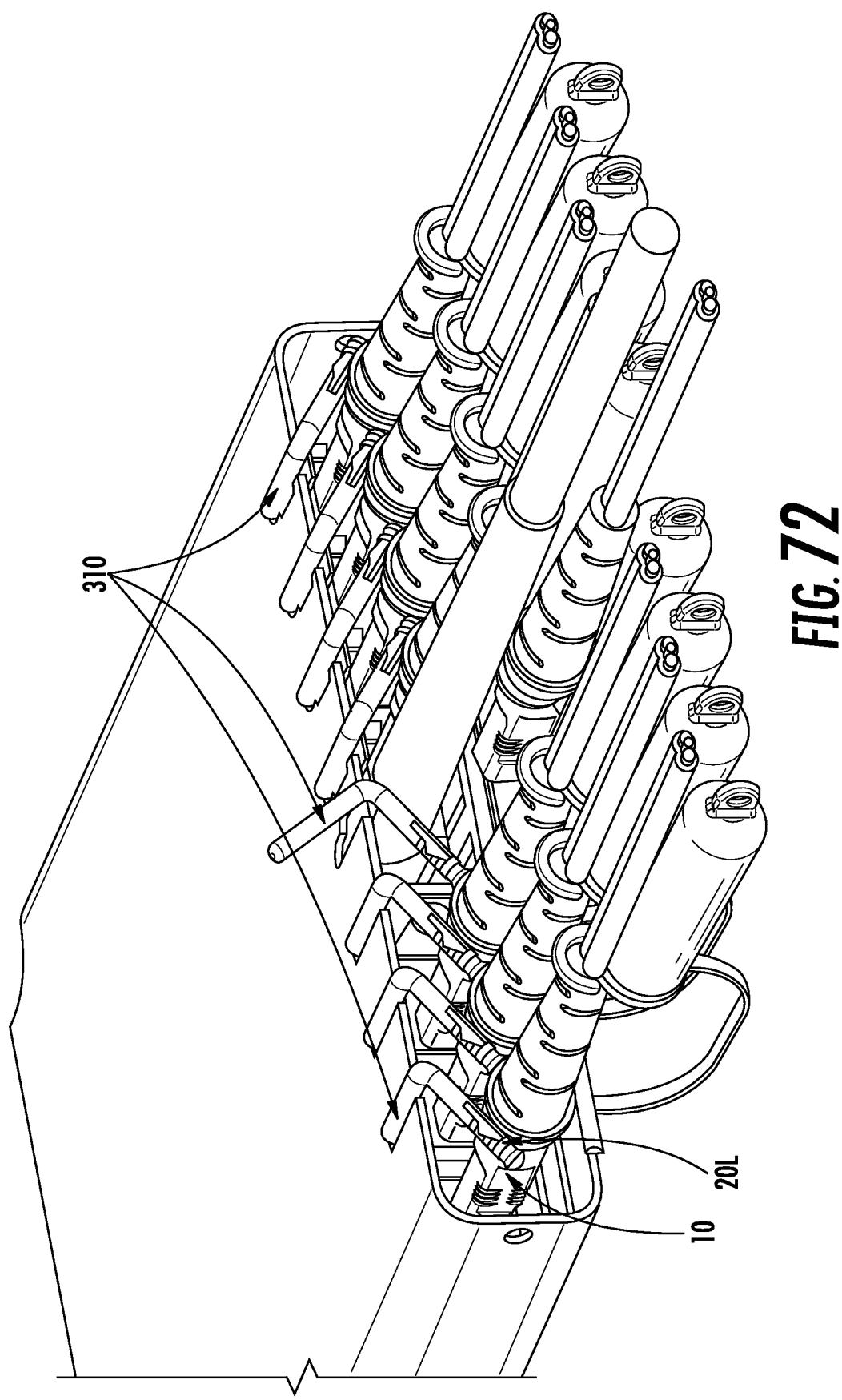
FIG. 72 is a perspective view of the multiport of FIGS. 67-69 with the connection port insert removed for showing the orientation of the dedicated rotating securing feature associated with each connection port and flexure.

FIGS. 67-69 are perspective views of still another multiport having a dedicated rotating securing feature 310 associated with each connection port and the connection port insert 230 having a flexure 230F associated with each of the connection ports 236. The operation of this multiport 200 is very similar to the operation of the multiport 200 in FIGS. 60-64, except that each connector port has a dedicated securing feature 310 to individually control the flexure 230F for each connection port 236. In other words, the eight connection ports 236 each has their own securing feature to deflect the flexure 230F associated with each connection port 236. Thus, each securing feature cooperates with only one flexure 230F for this configuration. To accomplish this arrangement, the securing features 310 are angled with respect the horizontal axis. Moreover, the flexures 230F are also angle with the horizontal axis to allow room for the securing features 310. Like the other embodiments the cam surfaces 310CS can be tailor to provide the desired positions either open position and closed position or add an intermediate position between the open position and closed position. Like the other embodiments, the securing feature 310 may also work with the dust cap such as shown in FIG. 70. FIG. 71 shows details of how the securing feature 310 is disposed with the bore 230B of the connection port insert. FIG. 72 shows the arrangement of the securing features 310 with the connection port insert 230 removed to depict the angled arrangement.

Figure 74A:
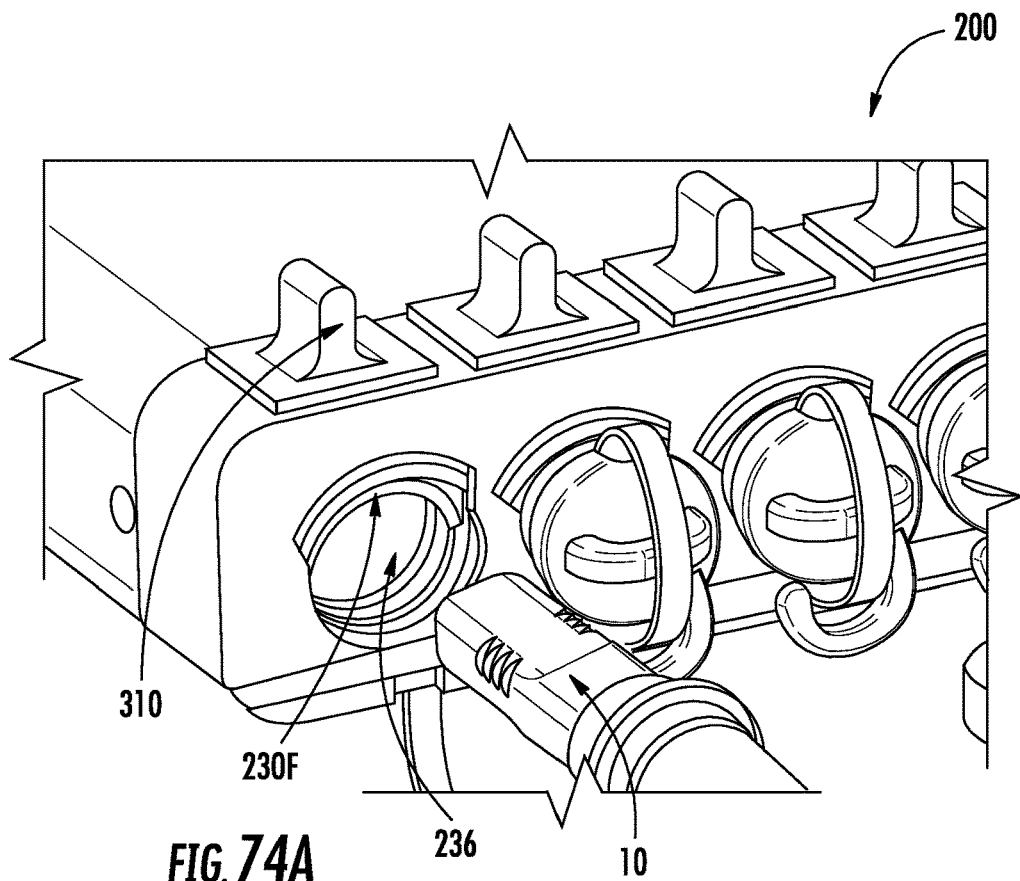
FIGS. 74A and 74B are partial perspective and sectional views of another multiport showing a translating securing feature associated with each connection port and flexure.
Figure 74B:
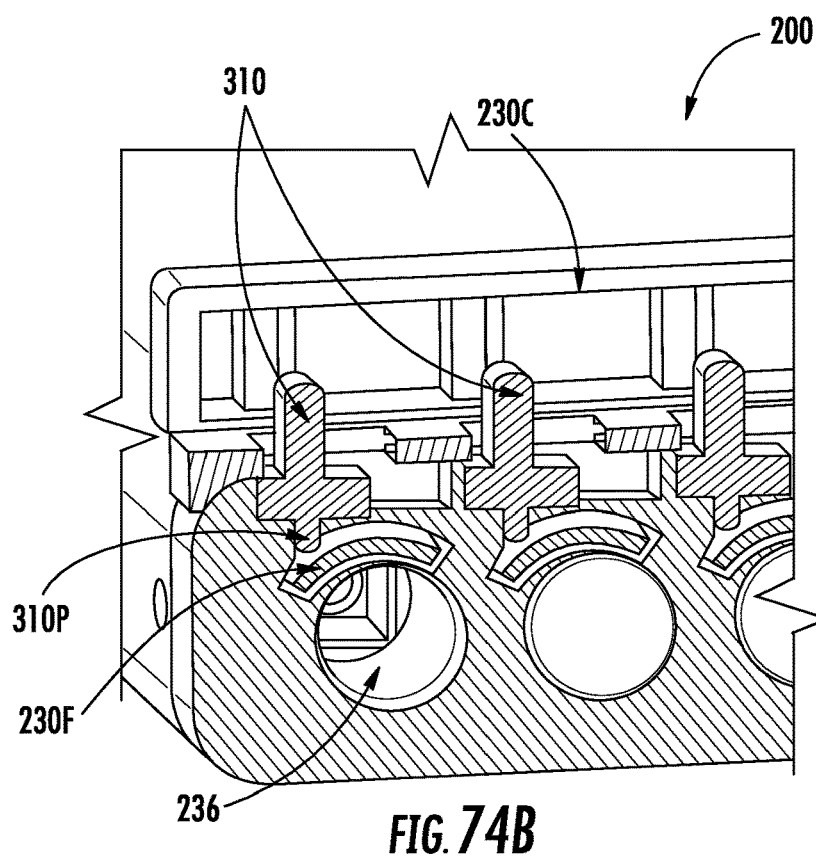

FIGS. 74A and 74B are perspective and sectional views of another multiport 200 showing a translating securing feature 310 associated with each connection port 236 and a flexure 230F. Each connection port 236 has its own securing feature 310 to deflect the flexure 230F associated with each connection port 236; however, several flexures 230F may be driven by a single securing feature 310 if desired. This construction uses securing features 310 that translate from left-to-right so that a protrusion 310P disposed on each securing feature 310 drives each flexure 230F as best shown in FIG. 74B. Like the other embodiments the protrusion or flexures may be tailored for providing the desired positions either open position and closed position or add an intermediate position between the open position and closed position. Like the other embodiments, the securing feature 310 may also work with the dust cap such as shown in FIG. 74B. Further, the connection port insert 230 may further comprise a cover 230C for protecting the securing mechanism from dirt, debris and the like. Cover 230C may also inhibit unintended actuation of the securing features 310 when in the closed position.

Figure 75:
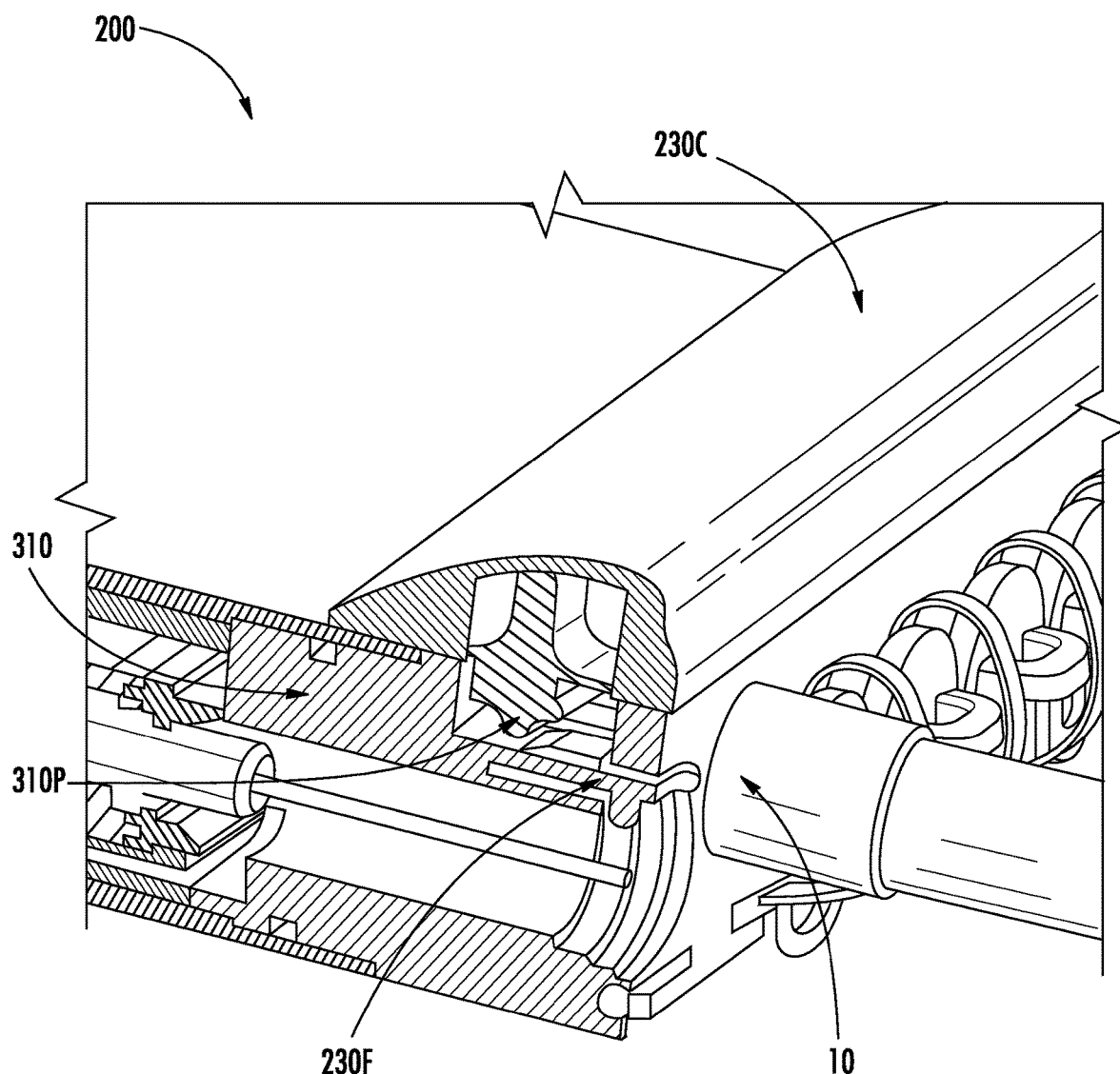
FIG. 75 is a partial sectional view of another multiport showing a translating securing feature associated with each connection port and flexure along with a cover for protecting the securing mechanism.

FIG. 75 is a partial sectional view of another multiport 200 showing a translating securing feature 310 associated with each connection port 236 and a flexure 230F similar to the embodiment shown in FIGS. 74A and 74B. Each connection port 236 has its own securing feature 310 to deflect the flexure 230F associated with each connection port 236; however, several flexures 230F may be driven by a single securing feature 310 if desired. This construction uses securing features 310 that translate from front-to-back so that a protrusion 310P on the securing feature 310 drives each flexure 230F. Like the other embodiments the protrusion or flexures may be tailored for providing the desired positions either open position and closed position or add an intermediate position between the open position and closed position. Like the other embodiments, the securing feature 310 may also work with the dust cap. Further, the connection port insert 230 may further comprise a cover 230C for protecting the securing mechanism from dirt, debris and the like.

Figure 76:
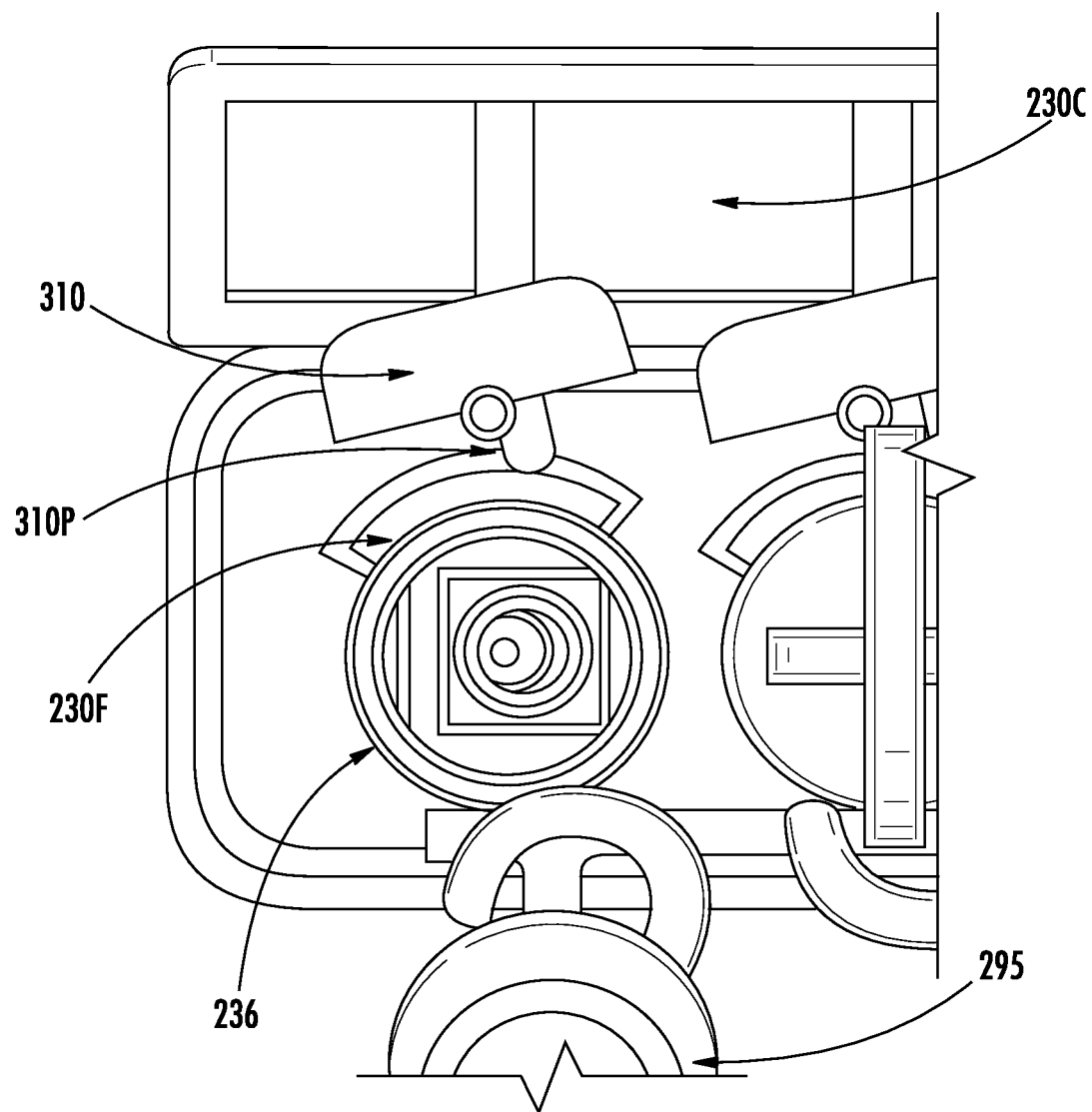
FIG. 76 is a view of still another multiport showing a rotating securing feature associated with each connection port and flexure along with a cover for protecting the securing mechanism.

FIG. 76 is a partial view of another multiport 200 showing a rotating securing feature 310 associated with each connection port 236 and a flexure 230F similar to other embodiments. Each connection port 236 has its own securing feature 310 to deflect the flexure 230F associated with each connection port 236. This construction uses securing features 310 that rotates about the Z-axis from left-to-right so that a protrusion 310P on the securing feature 310 drives each flexure 230F. In this embodiment the securing feature 310 acts like a toggle, but could be tailored for providing the desired positions either open position and closed position or add an intermediate position between the open position and closed position. Like the other embodiments, the securing feature 310 may also work with the dust cap. Further, the connection port insert 230 may further comprise a cover 230C for protecting the securing mechanism from dirt, debris and the like. Other variations of securing features that rotate about the Z-axis are also possible such as rotating partially concentric with the port instead of having the axis of rotation at a distance from the middle of the port.

Figure 77:
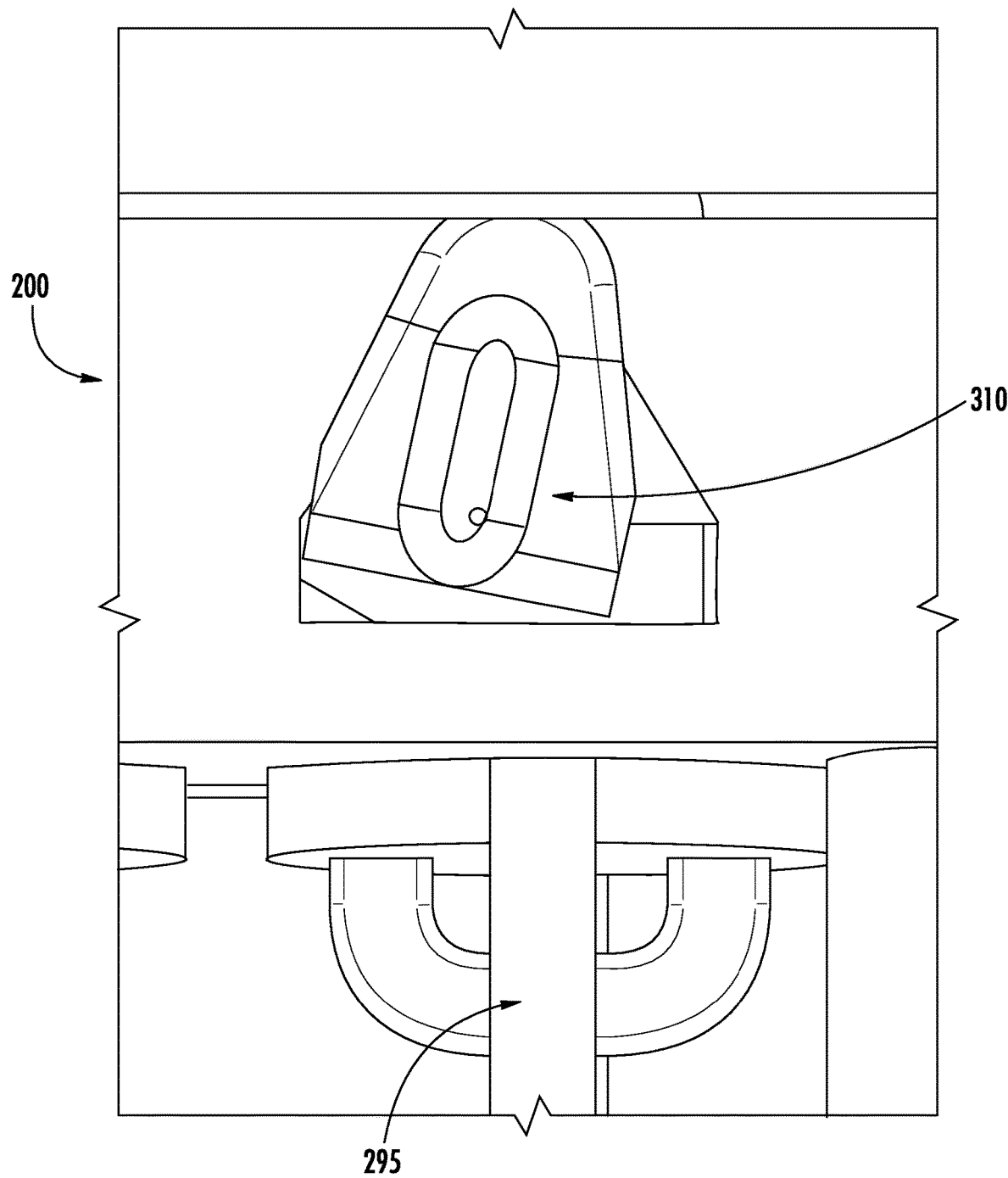
FIG. 77 is a partial perspective view of yet another multiport showing a rotating securing feature associated with each connection port and flexure along with a cover for protecting the securing mechanism.

FIG. 77 is a partial top view of another multiport 200 showing a rotating securing feature 310 associated with each connection port 236 and a flexure 230F similar to the embodiment shown in FIG. 76. Each connection port 236 has its own securing feature 310 to deflect the flexure 230F associated with each connection port 236. This construction uses securing features 310 that rotates about the Y-axis from left-to-right so that a protrusion 310P on the securing feature 310 drives each flexure 230F. In this embodiment the securing feature 310 acts like a toggle, but could be tailored for providing the desired positions either open position and closed position or add an intermediate position between the open position and closed position. Like the other embodiments, the securing feature 310 may also work with the dust cap. Further, the connection port insert 230 may further comprise a cover 230C for protecting the securing mechanism from dirt, debris and the like.

Figure 78:
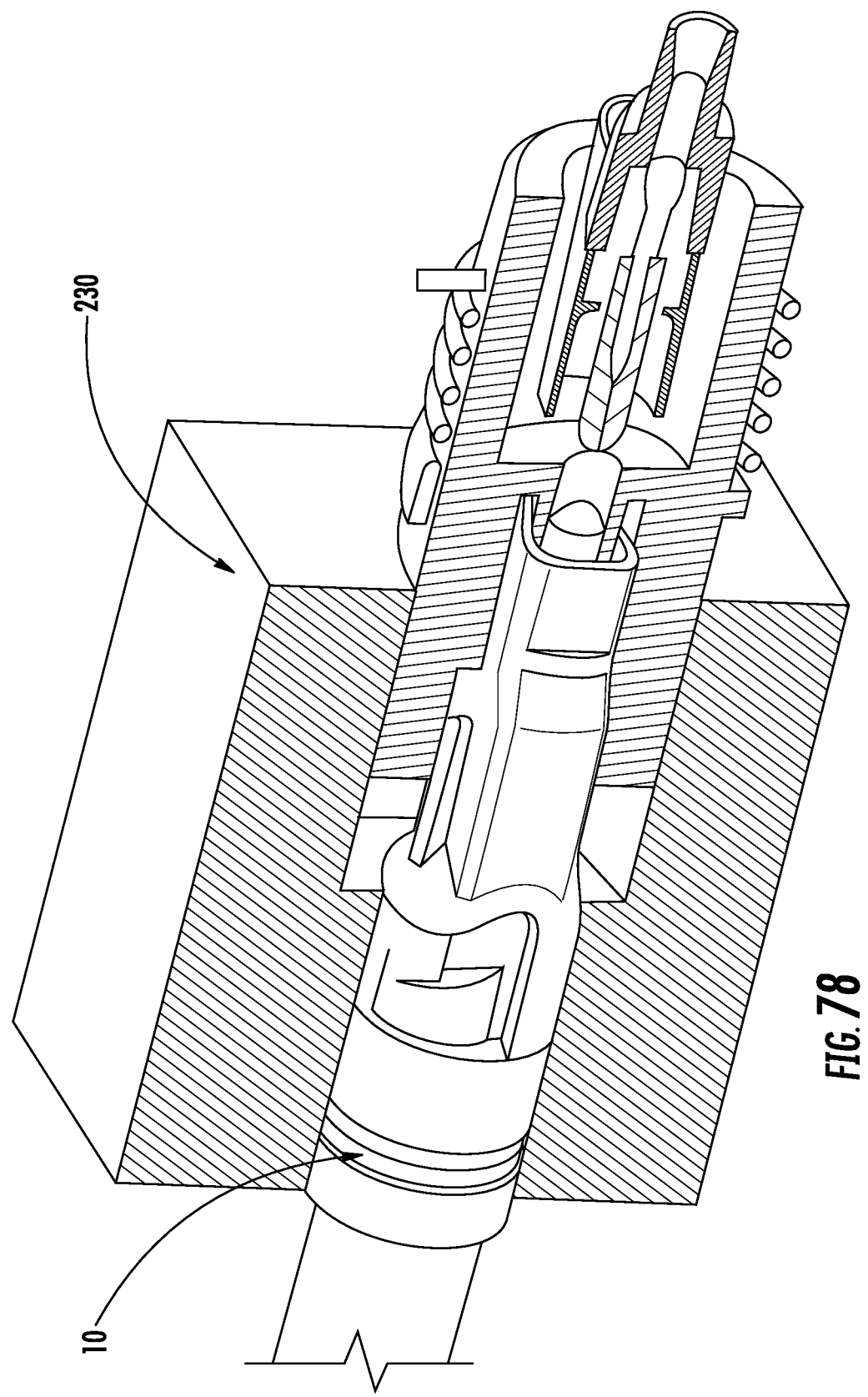
FIG. 78 is a partial sectional view of still another connection port insert for a multiport having a securing feature associated with each connection port that receives a connector having a partial-turn securing feature.
Figure 79A:
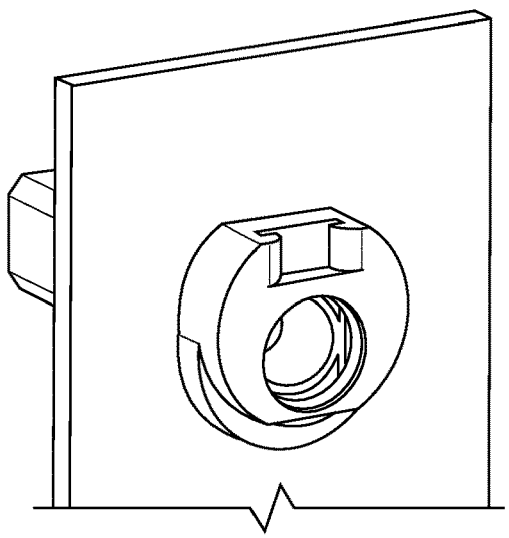
FIGS. 79A-79D are a perspective views of an connection port insert that may be used with multiports disclosed herein.
Figure 79B:
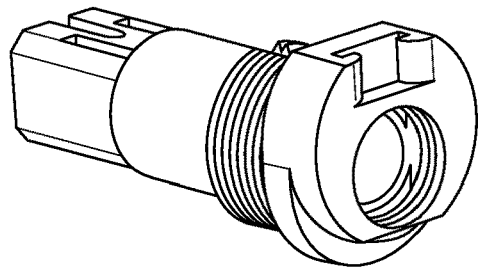
Figure 79C:
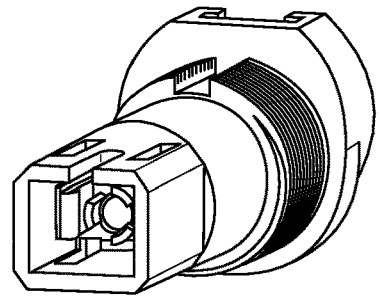
Figure 79D:
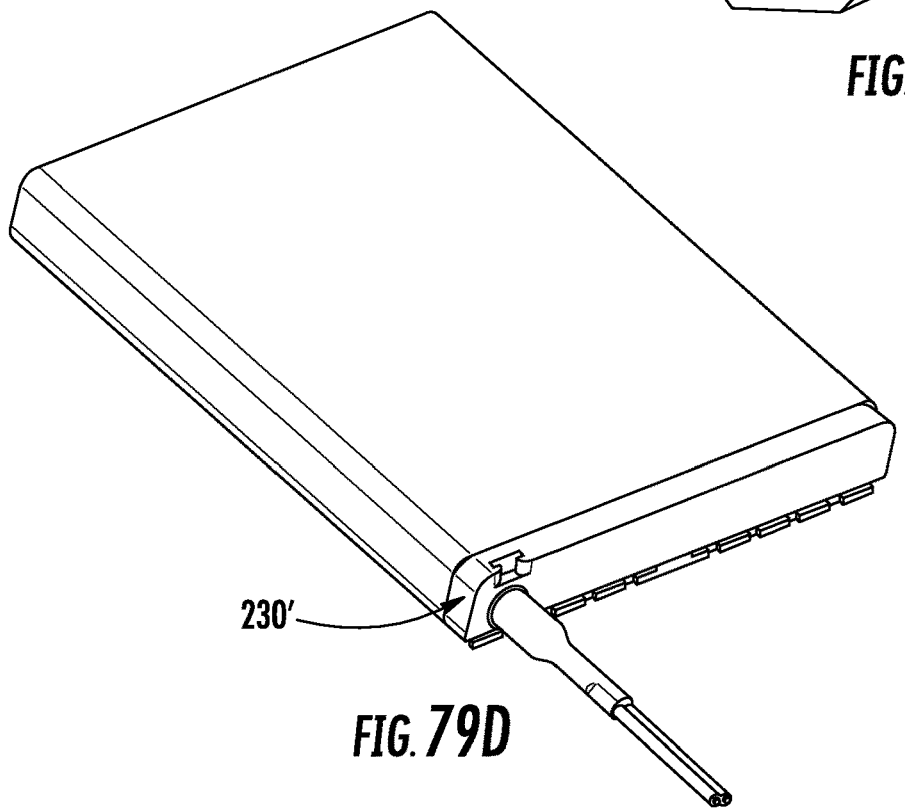

FIG. 78 is a perspective view of a portion of a connection port insert 230 for a multiport having a securing feature associated with each connection port that receives a connector 10 having a partial-turn securing feature.

FIGS. 79A-79D are a perspective views of an connection port insert 230 and variation configured as single adapter port that may be used with multiports 200 disclosed herein such as at entry and exit locations.

The present application also discloses methods for making a multiport. One method comprises inserting a connection port insert 230 into an opening 214 disposed in a first end 212 of an shell 210 so that at least a portion of the connection port insert 230 fits into the opening 212 and is disposed within a cavity 216 of the shell 210; and wherein the connection port insert 230 comprises a body 232 having a front face 234 and a plurality of connection ports 236 with each connector port 236 having an optical connector opening 238 extending from the front face 234 into the connection port insert 230 with a connection port passageway 233 extending through part of the connection port insert to a rear portion 237.

Another method for making a multiport comprises routing a plurality of optical fibers 250 from one or more rear portions 237 of a plurality of connection ports 236 of a connection port insert 230 so that the plurality of optical fibers 250 are available for optical communication at an input connection port 260 of the connection port insert 230. Then inserting the connection port insert 230 into an opening 214 disposed in a first end 212 of a shell 210 so that at least a portion of the connection port insert 230 fits into the opening 212 and is disposed within a cavity 216 of the shell 210; and wherein the connection port insert 230 comprises a body 232 having a front face 234 and a plurality of connection ports 236 with each connector port 236 having an optical connector opening 238 extending from the front face 234 into the connection port insert 230 with a connection port passageway 233 extending through part of the connection port insert to the rear portion 237.

The methods disclosed may further include installing at least one securing feature 310 into the connection port insert 230 so that the at least one securing feature 310 is associated with one or more of the plurality of connection ports 236. The securing feature 310 may include an open position OP and a closed position CP. The method may include translating or rotating the at least one securing feature 310 to the open position OP and the closed position CP.

The method may also comprise a connector port insert 230 having one or more slots 230S for receiving a portion of the at least one securing feature 310. The securing feature may be a U-clip with the methods disclosed.

The methods of actuating the securing features may comprises one or more bores 230B for receiving a portion of the at least one securing feature 310. Further, the one or more bores 230B may be arranged transversely to a longitudinal axis LA of the connection port insert 230. The securing feature may comprises a cam surface 310C. The method of actuating may comprise a plurality of securing features 310 associated with one or more of the plurality of connection ports 236 or using a single securing feature 310 associated with a plurality of connection ports 236. Additionally, the step of actuating the at least one securing feature 310 may comprises an intermediate position IP, wherein the intermediate position IP permits connector insertion into the one or more of the plurality of connection ports 236 and connector removal into the one or more of the plurality of connection ports 236.

Methods of making multiport make also include providing connection port inserts 230 having one or more flexures that cooperate with one or more securing features 310 as disclosed herein.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A multiport for providing an optical connection using external fiber optic connectors, comprising:
    a shell comprising a first portion and a second portion that cooperate to define a cavity;
    a plurality of connection ports being formed as a portion of the shell and arranged in a linear array with each one of the plurality of connections ports comprising an optical connector opening and a connection port passageway that leads to the cavity;
    a plurality of securing features each associated with a respective connection port of the plurality of connection ports for securing the external fiber optic connector received in the respective connection port, wherein each one of the plurality of securing feature translates, and the first portion of the shell comprises a plurality of bores with each bore configured for receiving a portion of the respective securing feature;
    a plurality of optical fibers being disposed within the cavity of the shell and routed within the cavity from one or more of the plurality of connection ports toward an input of the multiport for optical communication; and
    a sealing element for weatherproofing the shell.

2. The multiport of claim 1, wherein the multiport has a density of at least one connection port per each 20 millimeters of width of the shell.

3. The multiport of claim 1, further comprising one or more integrated mounting features formed as part of the shell.

4. The multiport of claim 1, further comprising at least one rear connector in communication with the connection port passageway.

5. A multiport for providing an optical connection with external fiber optic connectors, comprising:
    a shell comprising a first portion comprising a first end having a first opening that leads to a cavity with one or more integrated mounting features formed as part of the shell;
    at least one a plurality of connection ports with each connection port comprising an optical connector opening and a connection port passageway formed in a connection port insert, wherein the connection port insert is sized so that at least a portion of the connection port insert fits into the first opening and the cavity of the shell;
    a plurality of optical fibers being disposed within the cavity of the shell and routed from one or more of the plurality of connection ports toward an input connection port within the shell; and
    at least one securing feature associated with at least one of the plurality of connection ports for securing the respective external fiber optic connector received in one of the plurality of connection ports, wherein the at least one securing feature translates, and the connection port insert comprises at least one bore for receiving a portion of the at least one securing feature.

6. The multiport of claim 5, wherein the multiport has a density of at least one connection port per each 20 millimeters of width of the shell.

7. A multiport for providing an optical connection using external fiber optic connectors, comprising:
    a shell comprising a first portion including a first end having a first opening that leads to a cavity with one or more integrated mounting features formed as part of the shell;
    at least one connection port comprising an optical connector opening and a connection port passageway formed in a connection port insert, wherein the connection port insert is sized so that at least a portion of the connection port insert fits into the first opening and the cavity of the shell and the at least one connection port comprises a keying feature;
    a plurality of optical fibers being disposed within the cavity of the shell and routed from the at least one connection port toward an input connection port within the shell;
    at least one rear connector in communication with the connection port passageway, wherein the at least one rear connector is associated with one of the plurality of optical fibers and disposed within the cavity of the shell; and
    at least one securing feature associated with the at least one connection port for securing the external fiber optic connector received in the at least one connection port, wherein the at least one securing feature translates, and the first portion of the shell comprises at least one bore for receiving a portion of the at least one securing feature.

8. A multiport for providing an optical connection using external fiber optic connectors, comprising:
    a shell comprising a first portion and a second portion that cooperate to define a cavity;
    a plurality of connection ports with each connection port comprising an optical connector opening and a connection port passageway formed in a first portion of the shell;
    a plurality of optical fibers being disposed within the cavity of the shell and routed within the cavity from the plurality of connection ports toward an input connection port within the shell;
    at least one rear connector in communication with one of the connection port passageways, wherein the at least one rear connector is associated with at least one of the plurality of optical fibers and disposed within the cavity of the first portion and second portion of the shell; and
    at least one securing feature associated with the at least one connection port for securing the external fiber optic connector received in the at least one connection port, wherein the at least one securing feature translates, and the first portion of the shell comprises at least one bore for receiving a portion of the at least one securing feature.

9. The multiport of claim 8, wherein the at least one securing feature has an open position and a closed position.

10. The multiport of claim 8, further comprising a plurality of securing features associated with the plurality of connection ports.

11. The multiport of claim 8, wherein the at least one rear connector has a SC footprint.

12. The multiport of claim 8, wherein the first portion of the shell comprises at least one adapter that is integrally-formed with the first portion.

13. The multiport of claim 8, wherein the first portion of the shell is configured to secure at least one adapter thereto, wherein the at least one adapter floats relative to the at least one connection port.

14. The multiport of claim 8, further comprising an optical splitter disposed within the multiport.

15. The multiport of claim 8, wherein the plurality of connection ports each comprises a keying feature.

16. The multiport of claim 8, wherein the shell defines a volume of 800 cubic centimeters or less.

17. The multiport of claim 8, further including a sealing element.

18. A multiport for providing an optical connection using external fiber optic connectors, comprising:
- a shell comprising a first portion and a second portion that cooperate to define a cavity, and the first portion comprises a first end having a first opening that leads to a cavity;
- a plurality of connection ports comprising optical connector openings and connection port passageways formed in the first portion of the shell being formed as a portion of the shell and arranged in a linear array;
- a plurality of optical fiber being disposed within the cavity of the shell and routed from one the plurality of connection ports toward an input connection port within the shell; and
- a plurality of securing features associated with the plurality of connection ports for securing the external fiber optic connector received in the respective connection port and each one of the plurality of securing features comprises a cam surface, wherein each securing feature translates by rotating between the open position and the closed position, and the first portion of the shell comprises at least one bore for receiving a portion of the at least one securing feature.

19. The multiport of claim 18, further comprising an optical splitter disposed within the multiport.

20. The multiport of claim 18, wherein the at least one connection port comprises a keying feature.

21. The multiport of claim 18, wherein the shell defines a volume of 800 cubic centimeters or less.

22. The multiport of claim 18, further comprising a sealing element.

23. The multiport of claim 22, wherein the sealing element comprising one or more O-rings or gaskets.

24. The multiport of claim 22, wherein the sealing element comprises an adhesive, a sealant or a welded portion.

* * * * *